United States Patent
Nonaka et al.

(10) Patent No.: US 8,683,552 B2
(45) Date of Patent: Mar. 25, 2014

(54) INFORMATION DISTRIBUTION SYSTEM AND TERMINAL DEVICE

(75) Inventors: Masao Nonaka, Osaka (JP); Kaoru Yokota, Hyogo (JP); Natsume Matsuzaki, Osaka (JP); Shogo Hamasaki, Osaka (JP); Kenji Hisatomi, Osaka (JP)

(73) Assignee: Panasonic Corporation, Osaka (JP)

( * ) Notice: Subject to any disclaimer, the term of this patent is extended or adjusted under 35 U.S.C. 154(b) by 1549 days.

(21) Appl. No.: 11/884,710

(22) PCT Filed: Feb. 17, 2006

(86) PCT No.: PCT/JP2006/302852
§ 371 (c)(1),
(2), (4) Date: Aug. 20, 2007

(87) PCT Pub. No.: WO2006/088143
PCT Pub. Date: Aug. 24, 2006

(65) Prior Publication Data
US 2008/0263637 A1    Oct. 23, 2008

(30) Foreign Application Priority Data
Feb. 21, 2005 (JP) ................................. 2005-043702

(51) Int. Cl.
*G06F 21/00* (2013.01)

(52) U.S. Cl.
USPC ........ 726/4; 726/26; 726/27; 726/28; 726/29; 726/30

(58) Field of Classification Search
None
See application file for complete search history.

(56) References Cited

U.S. PATENT DOCUMENTS

| | | | | |
|---|---|---|---|---|
| 6,538,996 | B1 * | 3/2003 | West et al. | 370/238 |
| 6,697,944 | B1 * | 2/2004 | Jones et al. | 713/168 |
| 7,143,441 | B2 * | 11/2006 | Rygaard | 726/22 |
| 2003/0061165 | A1 | 3/2003 | Okamoto et al. | |
| 2003/0105720 | A1 | 6/2003 | Ishibashi | |

(Continued)

FOREIGN PATENT DOCUMENTS

| | | |
|---|---|---|
| JP | 2000-99477 | 4/2000 |
| JP | 2001-167016 | 6/2001 |

(Continued)

OTHER PUBLICATIONS

"P2P Computing: Technical Description and Application" by Naoki Ito, *Soft Research Center Inc.*, pp. 15-31, Nov. 25, 2001 (including English Translation).

*Primary Examiner* — Peter Poltorak
(74) *Attorney, Agent, or Firm* — Wenderoth, Lind & Ponack, L.L.P.

(57) ABSTRACT

A terminal device controls delivery of information from a primary delivery destination to a secondary delivery destination. The terminal device stores a primary delivery condition regarding whether delivery of the information to the primary delivery destination is prohibited or permitted, and a trustability value showing a degree of trust of a user in the primary delivery destination. The terminal device judges whether or not to deliver the information to the primary delivery destination, by using the primary delivery condition. When judging to deliver the information, the terminal device calculates a secondary delivery condition using the trustability value and the primary delivery condition, the secondary delivery condition regarding whether delivery of the information from the primary delivery destination to the secondary delivery destination is prohibited or permitted. The terminal device then sends the generated secondary delivery condition to the primary delivery destination.

25 Claims, 41 Drawing Sheets

CONTENT THRESHOLD VALUE DATA TABLE ,139

| CONTENT ID | CONTENT THRESHOLD VALUE DATA | | | | | |
|---|---|---|---|---|---|---|
| | DELIVERY TRUSTABILITY THRESHOLD VALUE | SAVING TRUSTABILITY THRESHOLD VALUE | ORIGINAL IMAGE DISPLAY TRUSTABILITY THRESHOLD VALUE | EDITING TRUSTABILITY THRESHOLD VALUE | COLOR DISPLAY TRUSTABILITY THRESHOLD VALUE | NUMBER OF DELIVERABLE GENERATIONS |
| 1000-100 | 0.3 | 99 | 0.4 | -99 | 0.4 | 3 | ~144
| 2100-200 | 0.8 | 99 | 0.8 | 99 | 0.8 | 1 | ~145
| 2300-300 | 99 | 99 | 99 | 99 | 99 | 1 | ~146
| 1000-400 | 0.3 | 0.5 | 0.4 | 0.7 | 0.4 | 5 | ~147

(56) References Cited

U.S. PATENT DOCUMENTS

| | | | |
|---|---|---|---|
| 2003/0125976 A1* | 7/2003 | Nguyen et al. | 705/1 |
| 2005/0044361 A1* | 2/2005 | Chang et al. | 713/167 |
| 2005/0254364 A1 | 11/2005 | Kuroda | |
| 2005/0273780 A1* | 12/2005 | Torvinen | 717/171 |
| 2006/0047957 A1* | 3/2006 | Helms et al. | 713/165 |
| 2007/0174921 A1* | 7/2007 | England et al. | 726/30 |
| 2009/0031413 A1* | 1/2009 | Chang et al. | 726/13 |

FOREIGN PATENT DOCUMENTS

| | | |
|---|---|---|
| JP | 2001-256413 | 9/2001 |
| JP | 2003-58660 | 2/2003 |
| JP | 2004-361996 | 12/2004 |
| WO | 2004/025955 | 3/2004 |

\* cited by examiner

FIG. 4

OTHER TERMINAL INFORMATION TABLE /131

| OTHER TERMINAL INFORMATION ||||
|---|---|---|---|
| OTHER TERMINAL ID | NAME | DELIVERY DESTINATION INFORMATION | TRUSTABILITY |
| 2200 | HANAKO | Hana@aaa.bbb.ccc | 0.9 |
| 2300 | JIRO | Ziro@aaa.bbb.ccc | 0.8 |
| 2100 | TARO | Taro@aaa.bbb.ccc | 0.1 |

CONTENT THRESHOLD VALUE DATA TABLE ~139

| CONTENT ID | CONTENT THRESHOLD VALUE DATA | | | | | |
|---|---|---|---|---|---|---|
| | DELIVERY TRUSTABILITY THRESHOLD VALUE | SAVING TRUSTABILITY THRESHOLD VALUE | ORIGINAL IMAGE DISPLAY TRUSTABILITY THRESHOLD VALUE | EDITING TRUSTABILITY THRESHOLD VALUE | COLOR DISPLAY TRUSTABILITY THRESHOLD VALUE | NUMBER OF DELIVERABLE GENERATIONS |
| 1000-100 | 0.3 | 99 | 0.4 | 99 | 0.4 | 3 |
| 2100-200 | 0.8 | 99 | 0.8 | 99 | 0.8 | 1 |
| 2300-300 | 99 | 99 | 99 | 99 | 99 | 1 |
| 1000-400 | 0.3 | 0.5 | 0.4 | 0.7 | 0.4 | 5 |

OTHER TERMINAL INFORMATION INPUT SCREEN

153

OTHER TERMINAL
INFORMATION REGISTRATION

NAME : [TARO] — 154
TERMINAL ID(TID) : [2100] — 155
DELIVERY DESTINATION
INFORMATION(ADR) : [Taro@aaa.bbb.ccc] — 156
TRUSTABILITY(TRS) : [0.1] (0~1)
— 157

[REGISTER] — 158    [CANCEL] — 159

FIG. 9

CONTENT DATA GENERATION SCREEN

160

SELECT CONTENT GENERATION
METHOD

1. GENERATE BY CAMERA

2. READ FROM MEMORY CARD

3. GENERATE BY CHARACTER
   INPUT

[SELECT] — 161

DELIVERY CONDITION INPUT SCREEN — 227

DELIVERY CONDITION INPUT

216

CONTENT ID                                   : 1000-400           228
DELIVERY TRUSTABILITY THRESHOLD VALUE: [ 0.3 ] (0~1)
SAVING TRUSTABILITY THRESHOLD VALUE: [ 0.5 ] (0~1)
ORIGINAL IMAGE DISPLAY                229   230
TRUSTABILITY THRESHOLD VALUE:         [ 0.4 ] (0~1)
EDITING TRUSTABILITY THRESHOLD VALUE: [ 0.7 ] (0~1)
COLOR DISPLAY TRUSTABILITY    231    232
THRESHOLD VALUE             :         [ 0.4 ] (0~1)
NUMBER OF DELIVERABLE GENERATIONS:    [  5  ] (1~)
                                                    233

234 — [REGISTER]              [CANCEL] — 235

FIG. 13

DELIVERY DESTINATION SELECTION SCREEN

SELECT DELIVERY DESTINATION

| NAME | DELIVERY DESTINATION | TRUSTABILITY |
|---|---|---|
| 1. HANAKO | Hana@aaa.bbb.ccc | 0.9 |
| 2. JIRO | Ziro@aaa.bbb.ccc | 0.8 |
| 3. TARO | Taro@aaa.bbb.ccc | 0.1 |
| ⋮ | ⋮ | ⋮ |

241 — O.K.   NEXT — 242

— 240

DELIVERY DESTINATION CONFIRMATION SCREEN

PLEASE CONFIRM
DELIVERY DESTINATION

1. HANAKO
2. JIRO
3. TARO

244 — O.K.   CANCEL — 245

DELIVERY TIME GENERATION DATA (246)

| TERMINAL ID | DELIVERY DESTINATION INFORMATION | CONTENT ID | SECONDARY DELIVERY TRUSTABILITY THRESHOLD VALUE | SECONDARY SAVING TRUSTABILITY THRESHOLD VALUE | SECONDARY ORIGINAL IMAGE DISPLAY TRUSTABILITY THRESHOLD VALUE | SECONDARY EDITING TRUSTABILITY THRESHOLD VALUE | SECONDARY COLOR DISPLAY TRUSTABILITY THRESHOLD VALUE | SECONDARY NUMBER OF DELIVERABLE GENERATIONS |
|---|---|---|---|---|---|---|---|---|
| 2200 | Hana@aaa.bbb.ccc | 1000-400 | 0.33 | 0.56 | 0.44 | 0.78 | 0.44 | 4 |
| 2300 | Ziro@aaa.bbb.ccc | 1000-400 | 0.38 | 0.63 | 0.5 | 0.88 | 0.5 | 4 |
| 2100 | Taro@aaa.bbb.ccc | 1000-400 | 99 | 99 | 99 | 99 | 99 | 99 |

SAVING TIME GENERATION DATA (250)

| TERMINAL ID | DELIVERY DESTINATION INFORMATION | CONTENT ID | SECONDARY DELIVERY TRUSTABILITY THRESHOLD VALUE | SECONDARY SAVING TRUSTABILITY THRESHOLD VALUE | SECONDARY ORIGINAL IMAGE DISPLAY TRUSTABILITY THRESHOLD VALUE | SECONDARY EDITING TRUSTABILITY THRESHOLD VALUE | SECONDARY COLOR DISPLAY TRUSTABILITY THRESHOLD VALUE | SECONDARY NUMBER OF DELIVERABLE GENERATIONS |
|---|---|---|---|---|---|---|---|---|
| | | 1000-400 | 0.3 | 0.5 | 0.4 | 0.7 | 0.4 | 5 |

TABLE T100

TERMINAL THRESHOLD VALUE DATA

| TERMINAL | TERMINAL ID | SECONDARY DELIVERY TRUSTABILITY THRESHOLD VALUE | SECONDARY EDITING TRUSTABILITY THRESHOLD VALUE | SECONDARY SAVING TRUSTABILITY THRESHOLD VALUE | SECONDARY ORIGINAL IMAGE DISPLAY TRUSTABILITY THRESHOLD VALUE | SECONDARY COLOR DISPLAY TRUSTABILITY THRESHOLD VALUE |
|---|---|---|---|---|---|---|
| 21 | 2100 | 99 | 99 | 99 | 99 | 99 |
| 22 | 2200 | 0.33 | 0.78 | 0.56 | 0.44 | 0.44 |
| 23 | 2300 | 0.38 | 0.88 | 0.63 | 0.5 | 0.5 |
| 24 | 2400 | 0.3 | 0.7 | 0.5 | 0.4 | 0.4 |
| 31 | 3100 | 0.37 | 0.87 | 0.62 | 0.49 | 0.49 |
| 32 | 3200 | 0.41 | 0.98 | 0.7 | 0.55 | 0.55 |
| 33 | 3300 | 0.66 | 99 | 99 | 0.88 | 0.88 |
| 34 | 3400 | 0.76 | 99 | 99 | 1 | 1 |
| 35 | 3500 | 0.63 | 99 | 99 | 0.83 | 0.83 |
| 36 | 3600 | 0.63 | 99 | 99 | 0.83 | 0.83 |
| 37 | 3700 | 99 | 99 | 99 | 99 | 99 |

FIG. 36

| CONTENT ID | CONTENT TRUSTABILITY / THRESHOLD VALUE DATA | | | | | NUMBER OF DELIVERABLE GENERATIONS |
|---|---|---|---|---|---|---|
| | DELIVERY TRUSTABILITY THRESHOLD VALUE | SAVING TRUSTABILITY THRESHOLD VALUE | ORIGINAL IMAGE DISPLAY TRUSTABILITY THRESHOLD VALUE | EDITING TRUSTABILITY THRESHOLD VALUE | COLOR DISPLAY TRUSTABILITY THRESHOLD VALUE | TRUSTABILITY |
| 1000-400 | 0.3 | 0.6 | 0.5 | 0.7 | 0.4 | 0.9 | 5 |

| CONTENT ID | CONTENT THRESHOLD VALUE DATA ||||| |
| --- | --- | --- | --- | --- | --- |
| | DELIVERY TRUSTABILITY THRESHOLD VALUE | SAVING TRUSTABILITY THRESHOLD VALUE | ORIGINAL IMAGE DISPLAY TRUSTABILITY THRESHOLD VALUE | EDITING TRUSTABILITY THRESHOLD VALUE | COLOR DISPLAY TRUSTABILITY THRESHOLD VALUE | NUMBER OF DELIVERABLE GENERATIONS |
| 1000-400 | 0.33 | 0.67 | 0.56 | 0.78 | 0.44 | 4 |

661

US 8,683,552 B2

INFORMATION DISTRIBUTION SYSTEM AND TERMINAL DEVICE

BACKGROUND OF THE INVENTION

1. Technical Field

The present invention relates to techniques of controlling distribution of information via a network and the like.

2. Background Art

In recent years, with the widespread use of digital cameras, camera mobile phones, and the like, individual users become able to create digital content such as a still image or a moving image easily, and an environment where personal content, i.e. digital content created by an individual user, can be transferred to a digital television, a hybrid recorder, a portable device, or the like and submitted for viewing is increasingly improved. This provides more opportunities for family members or friends to exchange personal content with each other. Hence the distribution of personal content is expected to be more actively performed in the future.

As one example of such personal content distribution systems, non-patent document 1 discloses a peer-to-peer file exchange system. In this file exchange system, users on a network exchange personal content. A user who requests personal content uses his/her own terminal to indicate desired personal content to a terminal of a user who possesses the personal content, and downloads the personal content via the network. In the peer-to-peer file exchange system, the user who receives the personal content can freely re-deliver that personal content to another user (secondary delivery). In this way, the personal content is actively distributed.

However, once the personal content is output to the network, it becomes difficult to restrict the use of the personal content.

To solve this problem, patent document 1 discloses the following technique, with the aim of ensuring profits of content writers, content providers, and the like. According to this technique, a secure container having sales condition information (UCP) that determines a sales condition of content between user devices is established. The UCP includes UCP secondary delivery permitted number information as information about an upper limit of the number of parallel content distributions between user devices. A user device that purchases the container generates use control information (UCS) including the UCS secondary delivery permitted number information which specifies the number of content distributions, and stores it on a memory. At the time of secondary delivery of the content, the user device executes a condition check process on the UCS secondary delivery permitted number information. The delivery of the content is permitted only when the condition is satisfied, and prohibited when the upper limit of the number of distributions is exceeded.

Non-patent document 1: Naoki Ito "P2P Computing—Technical Description and Application" Soft Research Center Inc., December 2001.

Patent document 1: Japanese patent application publication No. 2001-256413.

SUMMARY OF THE INVENTION

However, the technique disclosed in patent document 1 has the following problem. The technique enables to control the secondary delivery of the personal content. However, since the delivery of the content is prohibited once the upper limit of the number of distributions is exceeded, there are cases where the personal content is delivered to a secondary delivery destination not desired by the provider of the content or, on the other hand, the personal content is not delivered to a secondary delivery destination desired by the provider of the content. Thus, the technique cannot control which secondary delivery destination the content is delivered to.

To solve the above problem, the present invention aims to provide an information distribution system, a terminal device, a method, and a computer program that can, when delivering information to an other terminal device, control delivery of the information from a primary delivery destination to a secondary delivery destination.

The stated aim can be achieved by a terminal device that delivers information to an other terminal device, including: a condition storage unit operable to store a primary delivery condition relating to whether delivery of the information to a terminal device of a primary delivery destination is prohibited or permitted; a trustability storage unit operable to store delivery destination trustability showing a degree of trust of a user in the primary delivery destination; a judgment unit operable to judge whether or not to deliver the information to the terminal device of the primary delivery destination, by using the primary delivery condition; a generation unit operable to generate, when the judgment unit judges to deliver the information, a secondary delivery condition by performing calculation using the delivery destination trustability based on the primary delivery condition, the secondary delivery condition relating to whether delivery of the information from the terminal device of the primary delivery destination to a terminal device of a secondary delivery destination is prohibited or permitted; and a sending unit operable to send the generated secondary delivery condition to the terminal device of the primary delivery destination.

According to this construction, the secondary delivery condition relating to whether the delivery of the information from the primary delivery destination to the secondary delivery destination is prohibited or permitted is generated by performing the calculation using the delivery destination trustability based on the primary delivery condition, and sent to the terminal device of the primary delivery destination. As a result, the terminal device of the primary delivery destination can judge whether or not to deliver the information, by using the secondary delivery condition. In this way, the first provider of the information can control the secondary delivery.

Here, the primary delivery condition stored in the condition storage unit may include a trustability threshold value that defines a boundary between prohibition and permission of the delivery of the information according to the degree of trust in the primary delivery destination, wherein the generation unit calculates the secondary delivery condition by dividing the trustability threshold value by the delivery destination trustability.

According to this construction, the secondary delivery condition can be generated more reliably by dividing the trustability threshold value by the delivery destination trustability.

Here, the information may be content, wherein the terminal device delivers the content.

According to this construction, the secondary delivery in delivering the content can be controlled.

Here, the information may be a use right relating to use of a service, wherein the terminal device delivers the use right.

According to this construction, the secondary delivery in delivering the use right relating to the use of the service can be controlled.

Here, the service may be provision of content for viewing, editing, or saving, wherein the use right is a right to view, edit, or save the provided content, and the terminal device further delivers the content in correspondence with the use right.

According to this construction, the secondary delivery in delivering the use right to view, edit, or save the provided content can be controlled.

Here, the service may be provision of a computer resource in a computer system, wherein the use right is a right to use the computer resource. Here, the computer resource may be a computer program in a computer means, wherein the service is provision of an operation process by the computer program, and the use right is a right to use the computer program. Here, the computer resource may be a storage resource in the computer system, wherein the service is provision of the storage resource, and the use right is a right to use the storage resource.

According to these constructions, the secondary delivery in providing the content resource, providing the use of the computer program, or providing the use of the computer storage resource can be controlled.

Here, the terminal device may further include: an update unit operable to update the delivery destination trustability stored in the trustability storage unit, wherein the update unit includes: a judging unit operable to judge whether or not the terminal device of the primary delivery destination is authorized; and a trustability update unit operable to update the delivery destination trustability by decreasing the delivery destination trustability, when the judging unit judges that the terminal device of the primary delivery destination is not authorized.

According to this construction, when the terminal device of the primary delivery destination is not an authorized device, the delivery destination trustability is updated by decreasing it. This makes it possible to hold appropriate delivery destination trustability corresponding to the terminal device of the primary delivery destination.

Here, the terminal device may further include: an update unit operable to update the delivery destination trustability stored in the trustability storage unit, wherein the update unit includes: a judging unit operable to judge whether or not the terminal device is connected to the terminal device of the primary delivery destination via a network; and a trustability update unit operable to update the delivery destination trustability by decreasing the delivery destination trustability, when the judging unit judges that the terminal device is connected to the terminal device of the primary delivery destination via the network.

According to this construction, when the terminal device is connected to the terminal device of the primary delivery destination via the network, the delivery destination trustability is updated by decreasing it. This makes it possible to hold appropriate delivery destination trustability corresponding to the terminal device of the primary delivery-destination.

Here, the terminal device may further include: an update unit operable to update the delivery destination trustability stored in the trustability storage unit, wherein the update unit includes: a judging unit operable to judge whether or not the terminal device directly communicates with the terminal device of the primary delivery destination; and a trustability update unit operable to update the delivery destination trustability by increasing the delivery destination trustability, when the judging unit judges that the terminal device directly communicates with the terminal device of the primary delivery destination.

According to this construction, when the terminal device directly communicates with the terminal device of the primary delivery destination, the delivery destination trustability is updated by increasing it. This makes it possible to hold appropriate delivery destination trustability corresponding to the terminal device of the primary delivery destination.

Here, the primary delivery condition stored in the condition storage unit may include a trustability threshold value that defines a boundary between prohibition and permission of the delivery of the information according to the degree of trust in the primary delivery destination, wherein the terminal device further includes: an update unit operable to update the trustability threshold value included in the primary delivery condition stored in the condition storage unit, and the update unit includes: a judging unit operable to judge whether or not the terminal device of the primary delivery destination is authorized; and a trustability update unit operable to update the trustability threshold value by increasing the trustability threshold value, when the judging unit judges that the terminal device of the primary delivery destination is not authorized.

According to this construction, when the terminal device of the primary delivery destination is not an authorized device, the trustability threshold value is updated by increasing it. This makes it possible to hold an appropriate trustability threshold value corresponding to the terminal device of the primary delivery destination.

Here, the primary delivery condition stored in the condition storage unit may include a trustability threshold value that defines a boundary between prohibition and permission of the delivery of the information according to the degree of trust in the primary delivery destination, wherein the terminal device further includes: an update unit operable to update the trustability threshold value included in the primary delivery condition stored in the condition storage unit, and the update unit includes: a judging unit operable to judge whether or not the terminal device is connected to the terminal device of the primary delivery destination via a network; and a trustability update unit operable to update the trustability threshold value by increasing the trustability threshold value, when the judging unit judges that the terminal device is connected to the terminal device of the primary delivery destination via the network.

According to this construction, when the terminal device is connected to the terminal device of the primary delivery destination via the network, the trustability threshold value is updated by increasing it. This makes it possible to hold an appropriate trustability threshold value corresponding to the terminal device of the primary delivery destination.

Here, the primary delivery condition stored in the condition storage unit may include a trustability threshold value that defines a boundary between prohibition and permission of the delivery of the information according to the degree of trust in the primary delivery destination, wherein the terminal device further includes: an update unit operable to update the trustability threshold value included in the primary delivery condition stored in the condition storage unit, and the update unit includes: a judging unit operable to judge whether or not the terminal device directly communicates with the terminal device of the primary delivery destination; and a trustability update unit operable to update the trustability threshold value by decreasing the trustability threshold value, when the judging unit judges that the terminal device directly communicates with the terminal device of the primary delivery destination.

According to this construction, when the terminal device directly communicates with the terminal device of the primary delivery destination, the trustability threshold value is updated by decreasing it. This makes it possible to hold an appropriate trustability threshold value corresponding to the terminal device of the primary delivery destination.

The stated aim can also be achieved by a terminal device that delivers information to an other terminal device, including: a condition storage unit operable to store a primary delivery condition relating to whether delivery of the information to a terminal device of a primary delivery destination is prohibited or permitted; a trustability storage unit operable to store delivery destination trustability showing a degree of trust of a user in the primary delivery destination; a judgment unit operable to judge whether or not to deliver the information to the terminal device of the primary delivery destination, by using the primary delivery condition and the delivery destination trustability; a generation unit operable to generate, when the judgment unit judges to deliver the information, a secondary delivery condition by performing calculation using the delivery destination trustability based on the primary delivery condition, the secondary delivery condition relating to whether delivery of the information from the terminal device of the primary delivery destination to a terminal device of a secondary delivery destination is prohibited or permitted; and a sending unit operable to send the generated secondary delivery condition to the terminal device of the primary delivery destination.

According to this construction, the secondary delivery condition relating to whether the delivery of the information from the primary delivery destination to the secondary delivery destination is prohibited or permitted is generated by performing the calculation using the delivery destination trustability based on the primary delivery condition, and sent to the terminal device of the primary delivery destination. As a result, the terminal device of the primary delivery destination can judge whether or not to deliver the information, by using the secondary delivery condition. In this way, the first provider of the information can control the secondary delivery.

BRIEF DESCRIPTION OF THE DRAWINGS

FIG. 4 shows one example of a data structure of an other terminal information table 131.

FIG. 5 shows a content threshold value data table 139.

FIG. 8 shows one example of another terminal information input screen 153.

FIG. 9 shows one example of a content data generation screen 160.

FIG. 13 shows one example of a delivery destination selection screen 240 and a delivery destination confirmation screen 243.

FIG. 14A shows one example of a data structure of delivery time generation data, and FIG. 14B shows one example of a data structure of saving time generation data.

FIG. 28 shows one example of a data structure of a table T100.

FIG. 36 shows one example of a data structure of content, trustability/threshold value data.

FIG. 37 shows one example of a data structure of content threshold value data generated in the portable terminal 22b.

DESCRIPTION OF REFERENCE NUMERALS

Figure 1:
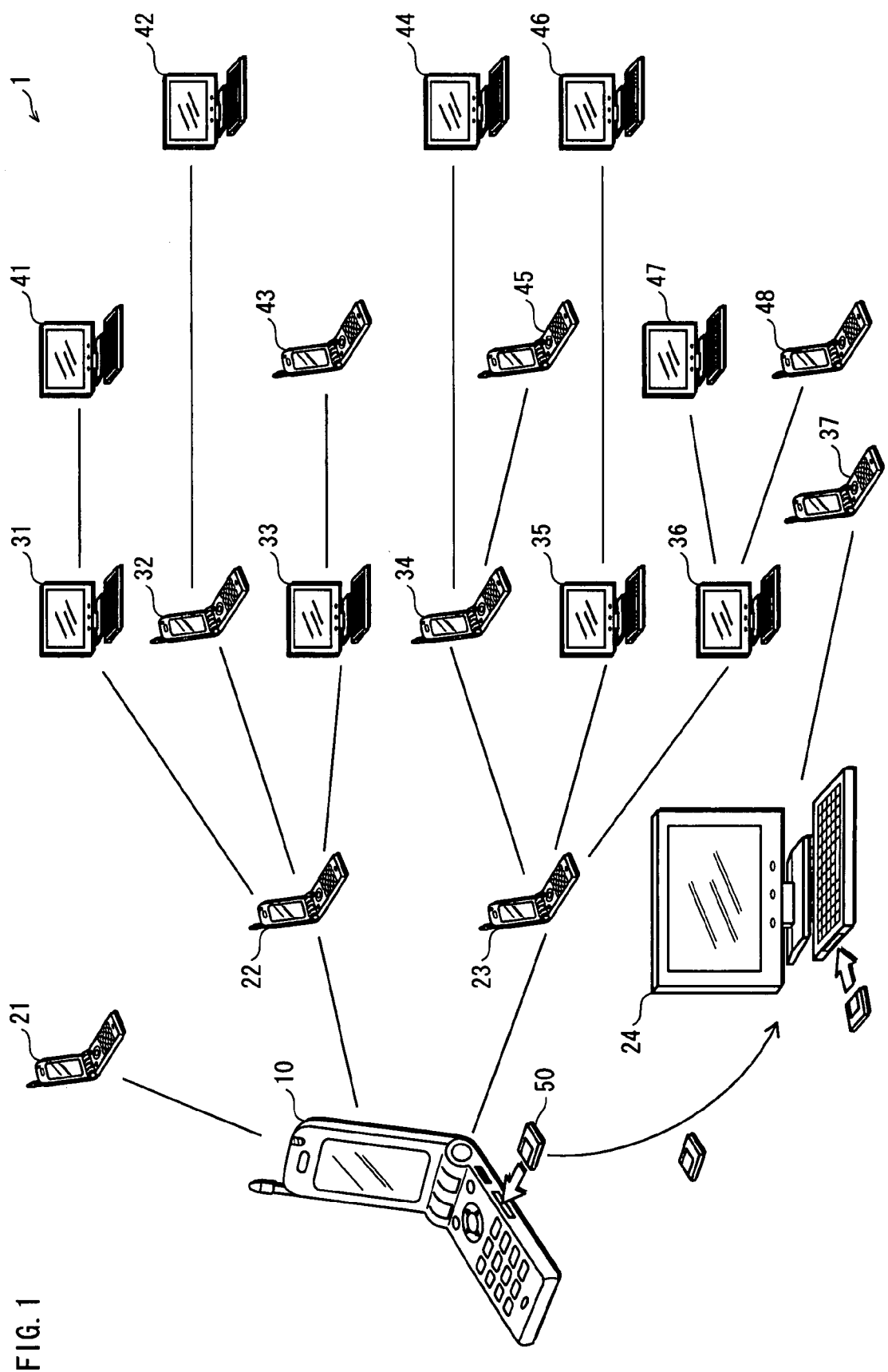
FIG. 1 shows an overall construction of an information distribution system 1.

1 . . . information distribution system
10 . . . portable terminal
22 . . . portable terminal
24 . . . PC terminal
50 . . . memory card
101 . . . input unit
102 . . . display unit
103 . . . camera
104 . . . speaker
105 . . . microphone 106 . . . image control unit
107 . . . content acquisition unit
108 . . . storage unit
110 . . . data processing unit
111 . . . delivery data generation unit
112 . . . delivery content selection unit
113 . . . delivery condition setting unit
114 . . . other terminal information setting unit
115 . . . processing selection unit
116 . . . delivery destination selection unit
117 . . . reception processing unit
118 . . . delivery processing unit
118b . . . delivery processing unit
119 . . . communication unit
120 . . . control unit
121 . . . antenna

DETAILED DESCRIPTION OF THE INVENTION

<1. First Embodiment>
<1.1 Overview of an Information Distribution System 1>

The following describes the information distribution system 1 according to the first embodiment, with reference to FIG. 1.

The information distribution system 1 includes a portable terminal 10, portable terminals 21, 22, 23, 32, 34, 37, 43, 45, and 48, and PC terminals 24, 31, 33, 35, 36, 41, 42, 44, 46, and 47.

Communication between the portable terminals is conducted via a communication network.

Information transfer between the portable terminal 10 and the PC terminal 24 is conducted via a memory card 50. Communication between the portable terminal 22 and the PC terminals 31 and 33 is conducted via an internet.

Communication between the portable terminal 23 and the PC terminals 35 and 36 is conducted via an internet.

Communication between the PC terminals 31 and 41, between the portable terminal 32 and the PC terminal 42, between the PC terminal 33 and the portable terminal 43, between the PC terminals 35 and 46, between the PC terminal 36 and the PC terminal 47 and the portable terminal 48, and between the PC terminal 24 and the portable terminal 37 is conducted via an internet.

Hereafter, when there is no need to distinguish a portable terminal and a PC terminal, they are collectively referred to as a user terminal.

The portable terminal 10 stores trustability of each of the portable terminals 21, 22, and 23, and a threshold value that relates to delivery of content data stored in the portable terminal 10. When delivering the content data stored thereinto, for example, the portable terminal 21, the portable terminal 10 uses the trustability of the portable terminal 21 and the threshold value for the delivery target content data, to calculate a threshold value relating to secondary delivery of the delivery target content data. The portable terminal 10 delivers the calculated threshold value and the content data to the portable terminal 21.

In the same manner, when delivering content data, the other user terminals calculate a threshold value relating to secondary delivery, and delivers the calculated threshold value and the content data.

The secondary delivery mentioned here is to deliver content which has been delivered from a user terminal, to another user terminal.

Also, the trustability indicates a degree of trust which a user of a user terminal itself has in a primary delivery destination.

For instance, the content data is JPEG image data, an MPEG moving image, or character data.

<1.2 Construction of the Portable Terminal 10>

Figure 2:
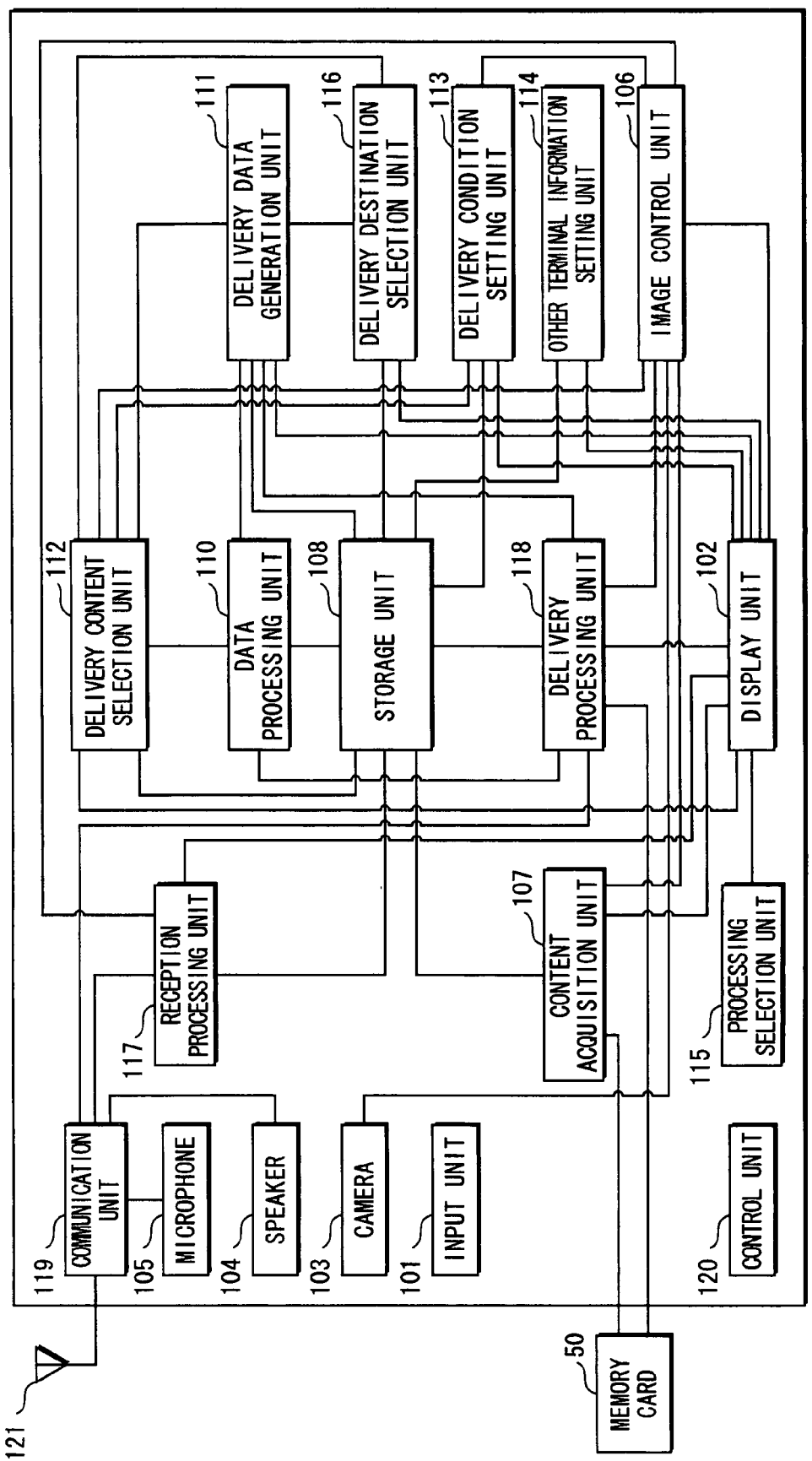
FIG. 2 is a block diagram showing a construction of a portable terminal 10.

The following describes a construction of the portable terminal 10, with reference to FIG. 2.

The portable terminal 10 includes an input unit 101, a display unit 102, a camera 103, a speaker 104, a microphone 105, an image control unit 106, a content acquisition unit 107, a storage unit 108, a data processing unit 100, a delivery data generation unit 111, a delivery content selection unit 112, a delivery condition setting unit 113, an other terminal information setting unit 114, a processing selection unit 115, a delivery destination selection unit 116, a reception processing unit 117, a delivery processing unit 118, a communication unit 119, a control unit 120, an antenna 121, and the memory card 50.

The portable terminal 10 is actually realized by a computer system that includes a microprocessor, a ROM, a RAM, a hard disk unit, a display unit, a keyboard, and the like. A computer program is stored on the RAM or the hard disk unit. Functions of the portable terminal 10 are realized by the microprocessor operating in accordance with this computer program. The computer program is structured by combining a plurality of instruction codes showing commands to a computer, in order to achieve predetermined functions.

Note here that connecting lines between each of the control unit 120 and the input unit 101 and the other construction elements are omitted for simplicity's sake.

(1) Storage Unit 108

Figure 3:
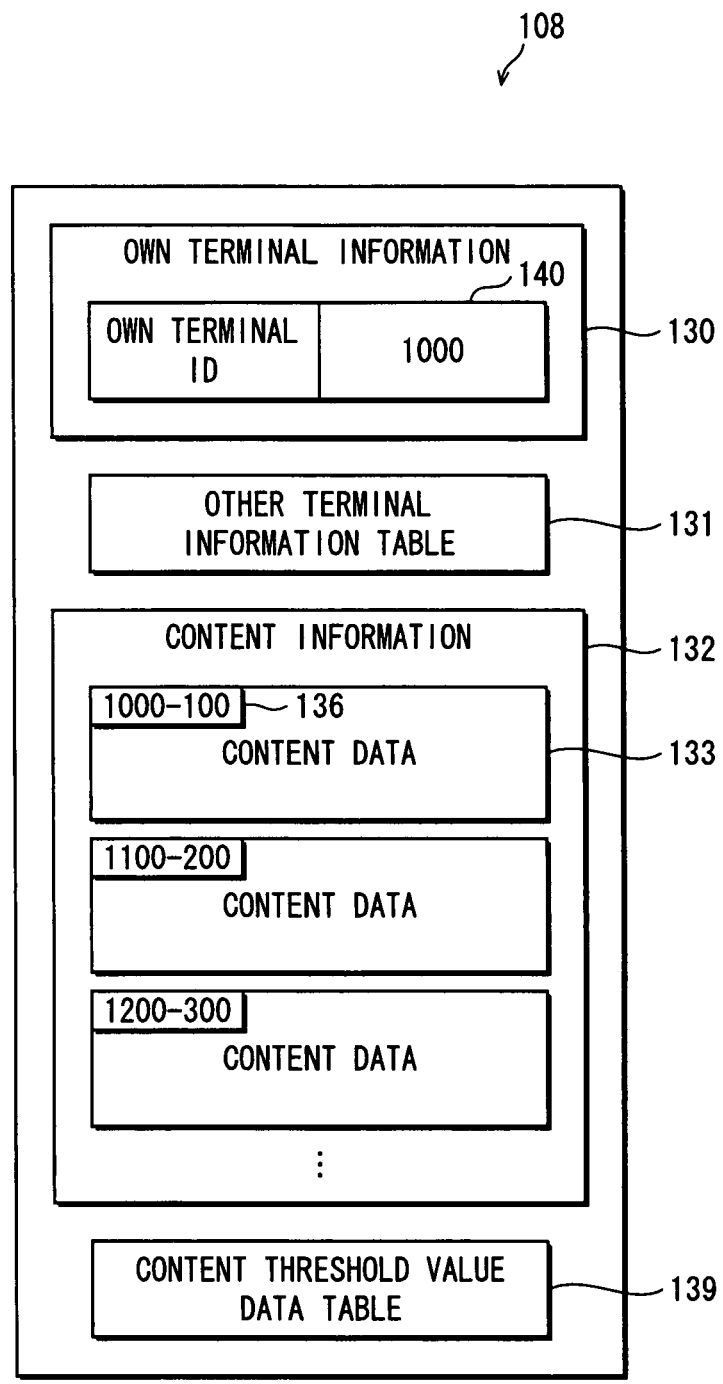
FIG. 3 shows information stored in a storage unit 108.

The storage unit 108 is a storage device (e.g. a hard disk), and includes own terminal information 130, an other terminal information table 131, content information 132, and a content threshold value data table 139, as shown in FIG. 3.

(Own Terminal Information 130)

The own terminal information 130 has an own terminal ID 140, i.e. an identifier for identifying the user terminal itself, registered therein.

As one example, FIG. 3 shows that the own terminal ID 140 of the portable terminal 10 is "1000".

(Other Terminal Information Table 131)

As shown in FIG. 4, the other terminal information table 131 has fields for storing at least one set of other terminal information made up of an other terminal ID, a name, delivery destination information, and trustability. The other terminal ID is an identifier for identifying an other user terminal. The name shows a user who owns the user terminal corresponding to the other terminal ID. The delivery destination information shows a destination (a mail address in this example) when delivering content to the user. The trustability is a value indicating trust in the user who owns the user terminal corresponding to the other terminal ID. The trustability is expressed by a value from 0 to 1, where 0 represents lowest trustability and 1 represents highest trustability.

For example, in the other terminal information table 131 shown in FIG. 4, other terminal information 141 shows an other terminal ID "2200", a name "Hanako", delivery destination information "Hana@aaa.bbb.ccc", and trustability of Hanako "0.9".

Also, other terminal information 142 shows a terminal ID "2300", a name "Jiro", delivery destination information "Ziro@aaa.bbb.ccc", and trustability of Jiro "0.8". Other terminal information 143 shows a terminal ID "2100", a name "Taro", delivery destination information "Taro@aaa.bbb.ccc", and trustability of Taro "0.1".

(Content Information 132)

The content information 132 has a field for storing at least one pair of a content ID and content data.

The content data is, for instance, still image data, moving image data, character data, and the like.

The content ID is made up of a terminal ID and a serial number that is issued when generating the content data. The terminal ID is any of the own terminal ID and an other terminal ID.

In the example of FIG. 3, a content ID "1000-100" 136 and content data 133 are associated with each other.

(Content Threshold Value Data Table 139)

The content threshold value data table 139 has a field for storing at least one set of content threshold value data made up of a content ID, a delivery trustability threshold value, a saving trustability threshold value, an original image display trustability threshold value, an editing trustability threshold value, a color display trustability threshold value, and a number of deliverable generations, as shown in FIG. 5.

The content ID is the same as a content ID corresponding to content data. The content ID associates content threshold value data with content data.

The delivery trustability threshold value is a value that indicates a lower limit at which delivery of content is allowed. When the delivery trustability threshold value is "99", the content data corresponding to the content ID cannot be delivered to an other user terminal.

The saving trustability threshold value indicates a lower limit of trustability at which the content data delivered to an other user terminal is allowed to be saved.

The original image display trustability threshold value indicates a lower limit of trustability at which the content data delivered to an other user terminal is allowed to be displayed in full size. If the full-size display is not permitted, the content data is displayed in a reduced size.

The editing trustability threshold value indicates a lower limit of trustability at which the content data received at an other user terminal is allowed to be edited. If this threshold value is not met, the editing of the content data cannot be performed.

The color display trustability threshold value indicates a lower limit of trustability at which the content data delivered to an other user terminal is allowed to be displayed in color. If this threshold value is not met, the content data on which binary image processing has been performed is displayed.

The number of deliverable generations shows the number of times the content data can be delivered. Here, the user terminal that generates the content data is set as a first generation, and the number of deliverable generations is counted starting from this user terminal.

The above threshold values are expressed in a range of 0 to 1, where a larger value corresponds to higher trustability. The value "99" indicates that the display, saving, delivery, or editing is prohibited, and the value "−99" indicates that no setting has been made.

The delivery trustability threshold value is a value that defines a boundary between prohibition and permission of delivering information (e.g. content), depending on a degree of trust in a primary delivery destination.

As one example, content threshold value data 144 is made up of a content ID "1000-100", a delivery trustability threshold value "0.3", a saving trustability threshold value "99", an original image display trustability threshold value "0.4", an editing trustability threshold value "−99", a color display trustability threshold value "0.4", and a number of deliverable generations "3". Content threshold value data 145 is made up of a content ID "2100-200", a delivery trustability threshold value "0.8", a saving trustability threshold value "99", an original image display trustability threshold value "0.8", an editing trustability threshold value "99", a color display trustability threshold value "0.8", and a number of deliverable generations "1".

Content threshold value data 146 is made up of a content ID "2300-300", a delivery trustability threshold value "99", a saving trustability threshold value "99", an original image display trustability threshold value "99", an editing trustability threshold value "99", a color display trustability threshold value "99", and a number of deliverable generations "1".

Content threshold value data 147 is made up of a content ID "1000-400", a delivery trustability threshold value "0.3", a saving trustability threshold value "0.5", an original image display trustability threshold value "0.4", an editing trustability threshold value "0.7", a color display trustability threshold value "0.4", and a number of deliverable generations "5".

(2) Processing Selection Unit 115

Figure 6:
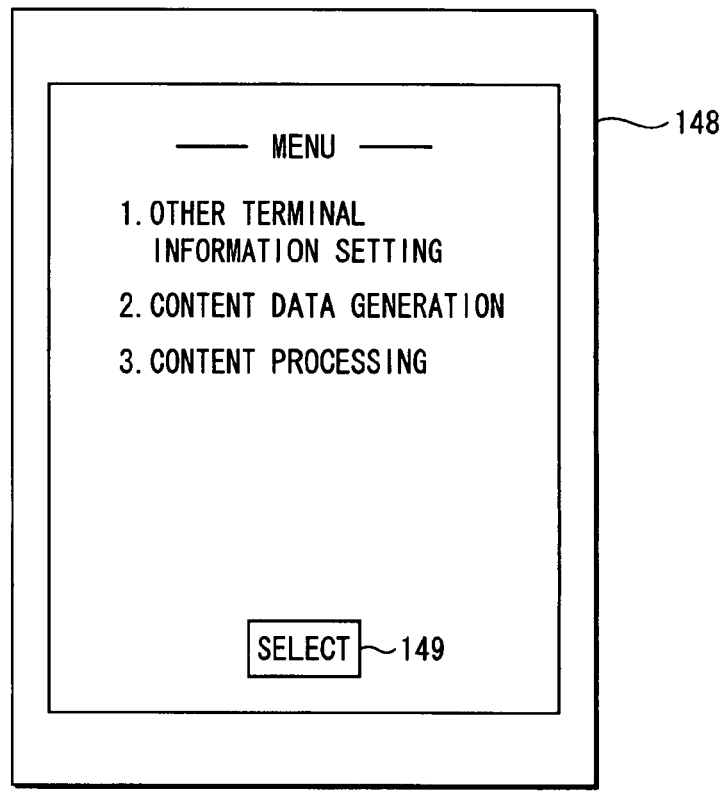
FIG. 6 shows one example of a menu selection screen 148.

The processing selection unit 115, upon receiving a menu selection screen display instruction from the control unit 120, has the display unit 102 display a menu selection screen 148 shown in FIG. 6.

Figure 7:
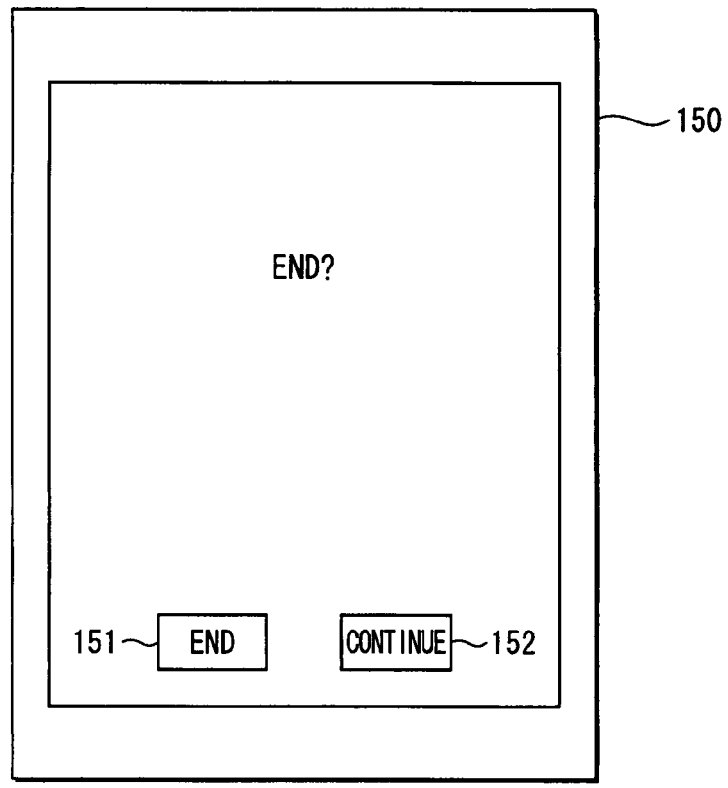
FIG. 7 shows one example of a menu ending screen 150.

Also, upon receiving a menu ending screen display instruction from the control unit 120, the processing selection unit 115 has the display unit 102 display a menu ending screen 150 shown in FIG. 7, and receives a user input via the input unit 101.

For example, in FIG. 6, the processing selection unit 115 has the display unit 102 display the menu selection screen 148 upon receiving the menu selection screen display instruction from the control unit 120. At this time, the control unit 120 receives a selection of one of other terminal information setting, content data generation, and content processing, via the input unit 101.

Also, in FIG. 7, the processing selection unit 115 has the display unit 102 display the menu ending screen 150 upon receiving the menu ending screen display instruction from the control unit 120. The processing selection unit 115 then receives a selection of ending or continuation from the user via the input unit 101. When an end button 151 is selected, the processing selection unit 115 ends the menu selection. When a continue button 152 is selected, the processing selection unit 115 has the display unit 102 display the menu selection screen 148 shown in FIG. 6 again.

(3) Other Terminal Information Setting Unit 114

The other terminal information setting unit 114, upon receiving a setting instruction to set other terminal information from the control unit 120, has the display unit 102 display an other terminal information input screen 153 for registering/updating other terminal information. FIG. 8 shows one example of the other terminal information input screen 153. The other terminal information input screen 153 is composed of fields for inputting other terminal information, including a name 154, a terminal ID 155, delivery destination information 156, and trustability 157, and a register button 158 and a cancel button 159. The name 154 is a field for inputting a name of a user of an other terminal. The terminal ID 155 is a field for inputting an other terminal ID. The delivery destination information is a field for inputting a destination (e.g. a mail address). The trustability is a field for inputting trustability of the user who owns the user terminal identified by the other terminal ID. The register button 158 is a button selected by the user when registering the input information. The cancel button 159 is a button selected by the user when canceling the registration of the input information.

The other terminal information setting unit 114 receives other terminal information (an other terminal ID, a name, delivery destination information, and trustability) input by the user on the other terminal information input screen 153, via the input unit 101. The other terminal information setting unit 114 temporarily stores the received other terminal information.

When the register button 158 is selected on the other terminal information input screen 153, the other terminal information setting unit 114 receives an information register instruction to register the other terminal information input by the user, from the input unit 101.

The other terminal information setting unit 114 writes the received other terminal information to the other terminal information table 131 in the storage unit 108, and outputs a setting end instruction indicating that the other terminal information setting ends, to the control unit 120.

When the cancel button 159 is selected on the other terminal information input screen 153, the other terminal information setting unit 114 receives an information cancel instruction to cancel the registration from the input unit 101, abandons the other terminal information input by the user, and has the display unit 102 display the other terminal information input screen 153 again.

As one example, if "other terminal information setting" is selected on the menu selection screen 148 shown in FIG. 6, the other terminal information setting unit 114 has the display unit 102 display the other terminal information input screen 153 shown in FIG. 8.

When "Taro", "2100", "Taro@aaa.bbb.ccc", and "0.1" are input respectively in the name 154, the terminal ID 155, the delivery destination information 156, and the trustability 157 and then the register button is selected on the other terminal information input screen 153, the other terminal information setting unit 114 writes other terminal information made up of the name "Taro", the terminal ID "2100", the delivery destination information "Taro@aaa.bbb.ccc", and the trust ability "0.1" to the other terminal information table 131 in the storage unit 108.

Here, the user can undo the input by selecting the cancel button 159 instead of the register button 158.

(4) Content Acquisition Unit 107

The content acquisition unit 107, upon receiving a generation instruction to generate content data from the control unit 120, has the display unit 102 display a content data generation screen 160 shown in FIG. 9. The content acquisition unit 107 generates or acquires content data based on a selection made on the content data generation screen 160. The content acquisition unit 107 reads the own terminal ID from the storage unit 108, and generates a serial number. The content acquisition unit 107 generates a content ID using the read own terminal ID and the generated serial number, and writes the generated or acquired content data and the generated content ID to the content information 132 in the storage unit 108 in correspondence with each other.

The content acquisition unit 107 outputs a generation end instruction indicating that the content data generation ends, to the control unit 120.

Here, upon receiving the selection of "generate by camera", the content acquisition unit 107 receives an image photographed by the camera 103 via the image control unit 106 as content data, generates a content ID, and writes the received content data and the generated content ID to the content information 132.

Upon receiving the selection of "generate by character input", the content acquisition unit 107 receives character data received by the input unit 101 as content data, and performs the same operation as above.

Upon receiving the selection of "read from memory card", the content acquisition unit 107 reads content data from the memory card 50, and performs the same operation as above.

For example, when the user selects "content data generation" and presses the select button 149 on the menu selection screen 148 shown in FIG. 6, the content acquisition unit 107 has the display unit 102 display the content data generation screen 160 shown in FIG. 9.

The menu of "generate by camera", "read from memory card", and "generate by character input" is displayed on the content data generation screen 160. The user selects a content generation method by the select button 161, via the input unit 101. Subsequently, the content acquisition unit 107 generates content data and a content ID based on the user selection, and writes the generated content data and content ID to the content information 132 in the storage unit 108.

(5) Delivery Content Selection Unit 112

The delivery content selection unit 112, upon receiving a selection instruction relating to selection of content data from the control unit 120, reads each pair of content data and content ID from the content information 132 in the storage unit 108 until one set of content data is selected.

The delivery content selection unit 112 acquires a delivery trustability threshold value corresponding to the read content ID from the content threshold value data, and has the display unit 102 display a content selection screen including the read content data and content ID, based on the acquired delivery trustability threshold value. The content selection screen is composed of content data, a content ID, a select button, a selection prohibition display, a previous button, and a next button. The select button is displayed when the delivery trustability threshold value corresponding to the displayed content data is in a range of 0 to 1. The selection prohibition display is displayed when the delivery trustability threshold value corresponding to the displayed content data is 99. Note here that the displayed content data is content data decompressed by the image control unit 106. The previous button is not displayed on the content selection screen when the content data is the first read content data. The next button is not displayed on the content selection screen when the content data is the last read content data.

Upon receiving a previous move instruction indicating that the previous button is selected on the content selection screen from the input unit 101, the delivery content selection unit 112 reads an immediately preceding pair of content data and content ID from the content information 132, and has the display unit 102 display the content selection screen including the read content data and content ID. Upon receiving a next move instruction indicating that the next button is selected on the content selection screen from the input unit 101, the delivery content selection unit 112 reads a next pair of content data and content ID from the content information 132, and has the display unit 102 display the content selection screen including the read content data and content ID.

Upon receiving a selection determination instruction indicating that the select button is selected on the content selection screen from the input unit 101, the delivery content selection unit 112 has the display unit 102 display a sending/saving/setting selection screen including the currently displayed content data and content ID. The sending/saving/setting selection screen is composed of the selected content data and content ID, a send button, a save button, and a set button.

When the send button is pressed by the user, the delivery content selection unit 112 receives a sending selection instruction indicating that the send button is pressed, from the input unit 101. After this, the delivery content selection unit 112 outputs a delivery destination setting instruction to start setting a delivery destination, to the delivery destination selection unit 116. Also, the delivery content selection unit 112 outputs the content ID selected by the user, to the data processing unit 110 and the delivery data generation unit 111.

When the save button is pressed by the user, the delivery content selection unit 112 receives a saving selection instruction indicating that the save button is pressed, from the input unit 101. After this, the delivery content selection unit 112 outputs the content ID selected by the user and a saving data generation instruction to generate saving time generation data, which is data relating to saving of the content data, to the delivery data generation unit 111. The saving time generation data will be described in detail later.

When the set button is pressed by the user, the delivery content selection unit 112 receives a setting selection instruction indicating that the set button is pressed, from the input unit 101. After this, the delivery content selection unit 112 outputs the content ID selected by the user and a threshold value data generation instruction to generate content threshold value data, to the delivery condition setting unit 113.

Figure 10:
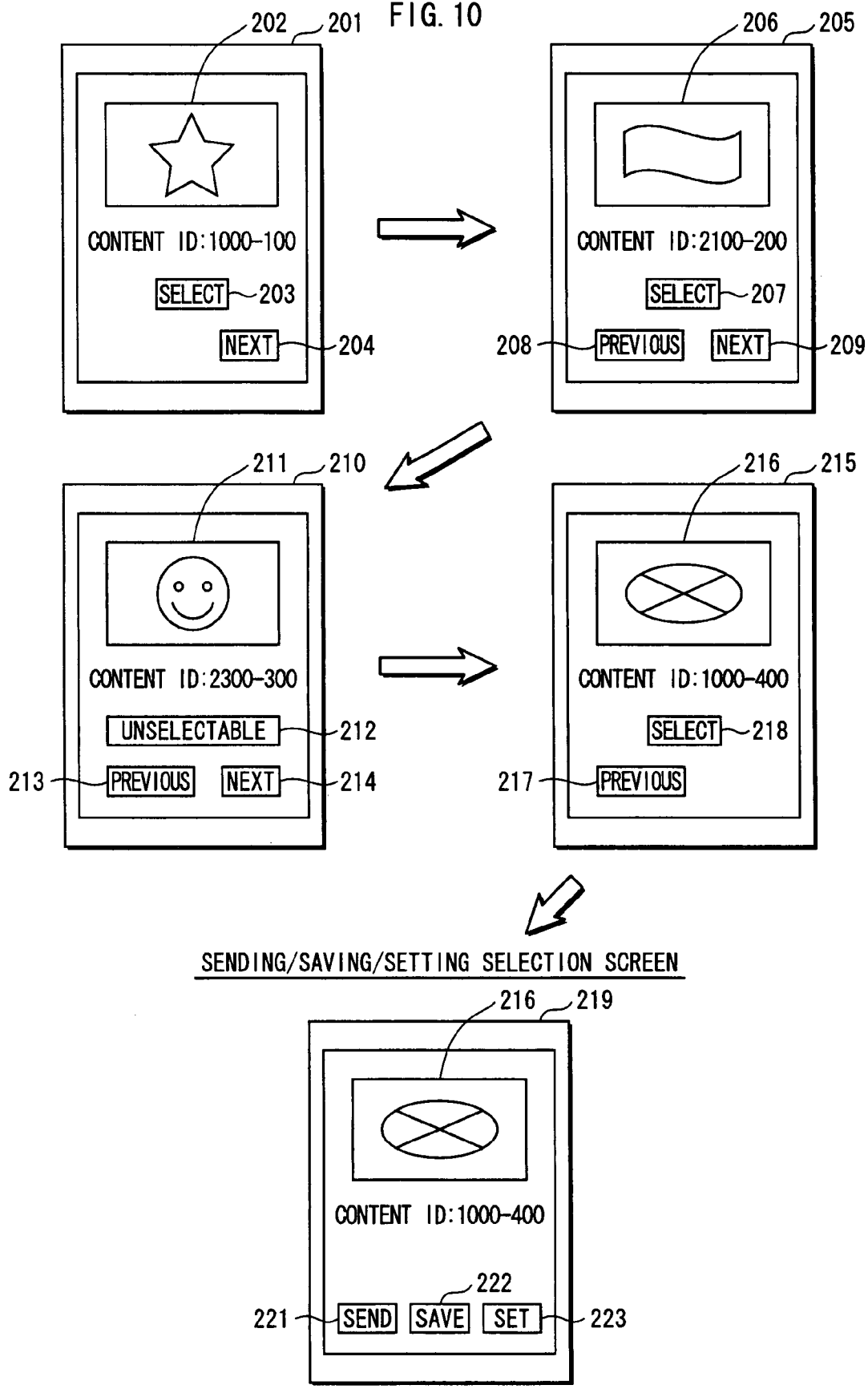
FIG. 10 shows one example of a change from a content selection screen to a sending/saving/setting selection screen.

FIG. 10 shows one example of a change from the content selection screen to the sending/saving/setting selection screen.

The change is explained below.

Suppose the content processing is selected on the menu selection screen 148 in FIG. 6. The delivery content selection unit 112 acquires the content ID "1000-100" from the storage unit 108, has the image control unit 106 decompress the content data corresponding to the content ID "1000-100", and has the display unit 102 display a content selection screen 201 including the decompressed content data. Since this content data is the first read content data, the previous button is not displayed.

To select content data 202 on the content selection screen 201, a select button 203 is selected. Otherwise, a next button 204 is selected.

When the next button 204 is selected, the delivery content selection unit 112 acquires the next content ID "2100-200" from the storage unit 108, has the image control unit 106 decompress the content data corresponding to this content ID, and has the display unit 102 display a content selection screen 205 including the decompressed content data.

To select content data 206 on the content selection screen 205, a select button 207 is selected. Otherwise, a previous button 208 or a next button 209 is selected. When the previous button 208 is selected, the display returns to the content selection screen 201. When the next button 209 is selected, the display proceeds to a next content selection screen 210.

When the next button 209 is selected, the content selection screen 210 including content data 211 is displayed. This content data 211 has the content ID "2300-300", and a delivery trustability threshold value corresponding to the content ID is 99. Accordingly, a selection prohibition display 212 is displayed. In this way, the content data 211 is set to be unselectable.

Since the content 211 cannot be selected on the content selection screen 210, a pervious button 213 or a next button 214 is selected.

When the next button 214 is selected, a content selection screen 215 including content data 216 is displayed. To select the content data 216, a select button 218 is selected. To display the previous content selection screen 210, a previous button 217 is selected. No next button is displayed since there is no more content data registered in the content information 132.

When the content data 216 is selected, the content data 216 is displayed on a sending/saving/setting selection screen 219. Subsequently, the delivery content selection unit 112 performs the above operation.

(6) Delivery Condition Setting Unit 113

The delivery condition setting unit 113 receives a content ID selected by the user and a threshold value data generation instruction from the delivery content selection unit 112.

The delivery condition setting unit 113 judges whether the content data selected on the sending/saving/setting selection screen 219 was generated by the terminal 10 itself or by another terminal, using a terminal ID included in the received content ID.

Figure 11:
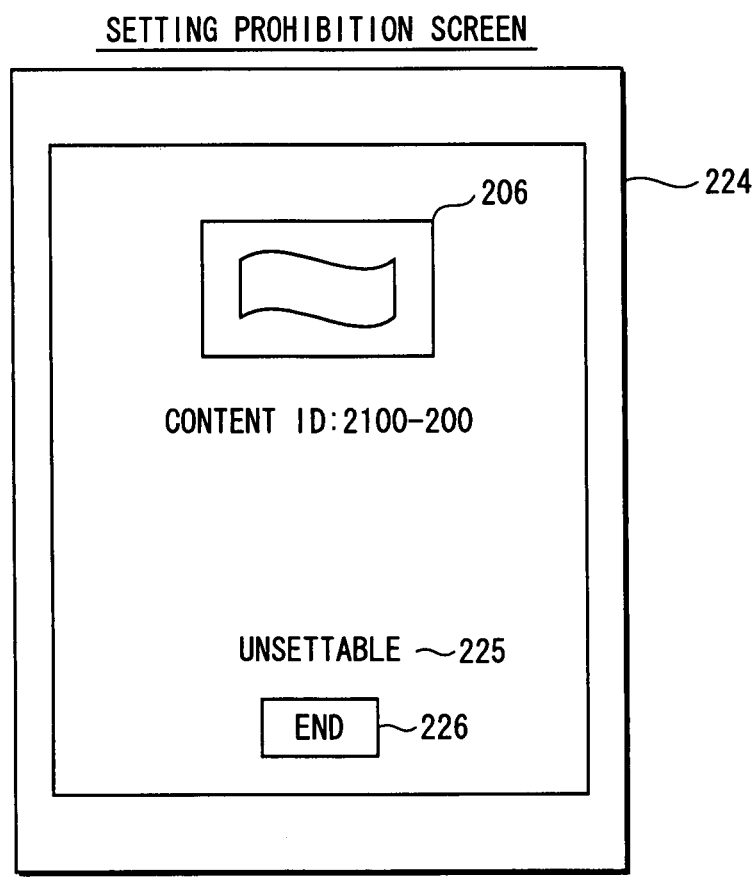
FIG. 11 shows one example of a setting prohibition screen 224.

When judging that the selected content was not generated by the terminal 10 itself, the delivery condition setting unit 113 has the display unit 102 display a setting prohibition screen 224. The setting prohibition screen 224 is composed of items for displaying selected content data 206, its content ID "2100-200", and a message "unsettable" 225 indicating setting prohibition, and an end button 226, as shown in FIG. 11. When the end button 226 is selected on the setting prohibition screen 224, the delivery condition setting unit 113 receives a display end instruction to end the screen display from the input unit 101, and outputs a processing end instruction indicating that the content processing ends, to the control unit 120. Note here that the content data displayed on the setting prohibition screen 224 has been decompressed by the image control unit 106.

When judging that the selected content was generated by the terminal 10 itself, the delivery condition setting unit 113 reads the content data corresponding to the selected content ID from the content information 132.

The delivery condition setting unit 113 has the display unit 102 display a delivery condition input screen 227 including the read content data.

Figure 12:
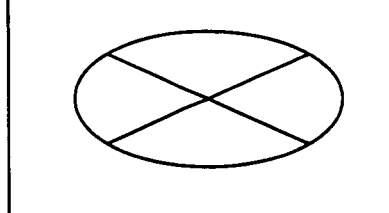
FIG. 12 shows one example of a delivery condition input screen 227.

As shown in FIG. 12, the delivery condition input screen 227 is composed of items for displaying the content data 216 and its content ID, items for receiving inputs of a delivery trustability threshold value, a saving trust ability threshold value, an original image display trustability threshold value, an editing trustability threshold value, a color display trustability threshold value, and a number of deliverable generations, a register button 234, and a cancel button 235. The content data displayed on the delivery condition input screen 227 has been decompressed by the image control unit 106.

On the delivery condition input screen 227, the delivery condition setting unit 113 receives a delivery trustability threshold value, a saving trustability threshold value, an original image display trustability threshold value, an editing trustability threshold value, a color display trustability threshold value, and a number of deliverable generations input by the user via the input unit 101. The delivery condition setting unit 113 temporarily stores the received values.

When the register button 234 is selected on the delivery condition input screen 227, the delivery condition setting unit 113 receives a condition register instruction indicating that the register button 234 is selected, from the input unit 101. The delivery condition setting unit 113 generates content threshold value data using the received values and the content ID, and writes the generated content threshold value data to the content threshold value data table 139 in the storage unit 108. The delivery condition setting unit 113 then outputs a processing end instruction to the control unit 120.

Upon receiving a condition cancel instruction indicating that the cancel button is selected from the input unit 101, the delivery condition setting unit 113 deletes the values input by the user, and has the display unit 102 redisplay the delivery condition input screen 227 using the terminal ID included in the received content ID.

For instance, when the set button 223 is selected on the sending/saving/setting selection screen 219 in FIG. 10, the delivery condition setting unit 113 judges whether the selected content data was generated by the terminal 10 itself or by an other terminal. In this case, the delivery condition setting unit 113 judges that the content data was generated by the terminal 10 itself, has the display unit 102 display the delivery condition input screen 227, and receives a delivery trustability threshold value, a saving trustability threshold value, an original image display trustability threshold value, an editing trustability threshold value, a color display trustability threshold value, and a number of deliverable generations for the content data 216, via the input unit 101.

Here, the delivery condition setting unit 113 receives a delivery trustability threshold value 228 "0.3", a saving trustability threshold value 229 "0.5", an original image display trustability threshold value 230 "0.4", an editing trustability threshold value 231 "0.7", a color display trustability threshold value 232 "0.4", and a number of deliverable generations 233 "5". When the register button 234 is selected, the delivery condition setting unit 113 generates content threshold value data using the input values and the content ID "1000-400". The delivery condition setting unit 113 writes the generated content threshold value data to the content threshold value data table 139.

When the cancel button 235 is selected on the delivery condition input screen 227, the input values are deleted to receive an input again.

(7) Delivery Destination Selection Unit 116

The delivery destination selection unit 116 has an ID storage area for storing at least one other terminal ID selected as the destination of the content data.

Upon receiving a delivery destination setting instruction from the delivery content selection unit 112, the delivery destination selection unit 116 acquires all other terminal IDs from the other terminal information table 131 in the storage unit 108. The delivery destination selection unit 116 has the display unit 102 display a combination of delivery destination information, name, and trustability corresponding to each of the acquired other terminal IDs using a delivery destination selection screen 240, where a predetermined number of combinations are displayed at one time. As shown in FIG. 13, the delivery destination selection screen 240 has an area for displaying the predetermined number of combinations of delivery destination information, name, and trustability, an OK button 241, and a next button 242.

The delivery destination selection unit 116 receives a delivery destination selected by the user on the delivery destination selection screen 240 via the input unit 101, and temporarily stores the received delivery destination and an other terminal ID corresponding to the delivery destination in the ID storage area. Here, the user can select a plurality of delivery destinations. The delivery destination selection unit 116 temporarily stores one or more pairs of selected delivery destination and corresponding other terminal ID in the ID storage area. The delivery destination temporarily stored here is information including a name of the delivery destination.

When the OK button 241 is selected on the delivery destination selection screen 240, the delivery destination selection unit 116 receives a delivery selection instruction indicating that the delivery destination is selected, from the input unit 101. The delivery destination selection unit 116 has the display unit 102 display a delivery destination confirmation screen 243 including a name of each of the selected one or more delivery destinations. As shown in FIG. 13, the delivery destination confirmation screen 243 is composed of an area for displaying a name of each selected delivery destination, and an OK button 244 and a cancel button 245.

When the next button 242 is selected on the delivery destination selection screen 240, the delivery destination selection unit 116 receives a next display instruction to display next information from the input unit 101, and has the display unit 102 display the predetermined number of combinations of delivery destination information, name, and trustability which have not been displayed yet, using the delivery destination selection screen 240.

When the OK button 244 is selected on the delivery destination confirmation screen 243, the delivery destination selection unit 116 receives a sending destination determination instruction indicating that the sending destination is determined, from the input unit 101. The delivery destination selection unit 116 outputs the one or more other terminal IDs stored in the ID storage area, i.e., the one or more other terminal IDs selected by the user, to the delivery data generation unit 111. When the cancel button 245 is selected on the delivery destination 'confirmation' screen 243, the delivery destination selection unit 116 abandons the temporarily stored one or more other terminal IDs, receives a delivery destination cancel instruction to cancel the processing from the input unit 101, outputs a processing end instruction to the control unit 120, and terminates the processing.

For example, when the send button 221 is selected on the sending/saving/setting selection screen 219 in FIG. 10, the delivery destination selection unit 116 acquires all other terminal IDs stored in the other terminal information table 131 in the storage unit 108, and has the display unit 102 display the predetermined number of combinations of name, delivery destination information, and trustability corresponding to each acquired terminal ID, using the delivery destination selection screen 240. Hereafter, the predetermined number of combinations of name, delivery destination information, and trustability displayed by the delivery destination selection unit 116 are referred to as a delivery destination list. When the next button 242 is selected on the delivery destination selection screen 240, a next delivery destination list is displayed on the delivery destination selection screen.

When "Hanako", "Jiro", and "Taro" are selected and then the OK button 241 is selected, the delivery destination confirmation screen 243 is displayed. When the cancel button 245 is selected, the display returns to the delivery destination selection screen 240 to allow the user to reselect a delivery destination.

When the OK button 244 is selected on the delivery destination confirmation screen, the delivery destination selection unit 116 outputs the selected one or more other terminal IDs to the delivery data generation unit 111.

(8) Delivery Data Generation Unit 111

The delivery data generation unit 111 generates delivery time generation data and saving time generation data.

The delivery time generation data is data which, when delivering content data to an other user terminal, is delivered to the other user terminal as a delivery destination, together with the content data. As shown in FIG. 14A, the delivery time generation data is made up of a terminal ID, delivery destination information, a content ID, a secondary delivery trustability threshold value, a secondary saving trustability threshold value, a secondary original image display trustability threshold value, a secondary editing trustability threshold value, a secondary color display trustability threshold value, and a secondary number of deliverable generations.

The terminal ID is an identifier for identifying the delivery destination user terminal, and is the same as an other terminal ID. The delivery destination information shows a destination (a mail address in this example) of the delivery destination user terminal. The content ID is an identifier corresponding to the content data to be delivered.

The secondary delivery trustability threshold value is a delivery trustability threshold value used when the delivery destination user terminal further delivers the delivered content data to an other user terminal.

The secondary saving trustability threshold value is a saving trustability threshold value used when the delivery destination user terminal further delivers the delivered content data to an other user terminal.

The secondary original image display trustability threshold value is an original image display trustability threshold value used when the delivery destination user terminal further delivers the delivered content data to an other user terminal.

The secondary editing trustability threshold value is an editing trustability threshold value used when the delivery destination user terminal further delivers the delivered content data to an other user terminal.

The secondary color display trustability threshold value is a color display trustability threshold value used when the delivery destination user terminal further delivers the delivered content data to another user terminal.

The secondary number of deliverable generations is a number of deliverable generations used when the delivery destination user terminal further delivers the delivered content data to an other user terminal.

The saving time generation data is data which, when saving the content data onto the memory card 50, is saved on the memory card 50 together with the content data. As shown in FIG. 14B, the saving time generation data is made up of a terminal ID, delivery destination information, a content ID, a secondary delivery trustability threshold value, a secondary saving trustability threshold value, a secondary original image display trustability threshold value, a secondary editing trustability threshold value, a secondary color display trustability threshold value, and a secondary number of deliverable generations.

The elements of the saving time generation data are the same as those of the delivery time generation data, and so their explanation has been omitted here.

It should be noted that no information is set in the terminal ID and the delivery destination information of the saving time generation data. Also, each trustability threshold value is used when a user terminal (e.g. the PC terminal 24) to which the memory card 50 is inserted delivers the content data.

The following describes each of an operation of generating the delivery time generation data and an operation of generating the saving time generation data.

(Generation of the Delivery Time Generation Data)

The operation of generating the delivery time generation data is described below.

Upon receiving a content ID selected by the user from the delivery content selection unit 112, the delivery data generation unit 111 reads content threshold value data corresponding to the received content ID from the content threshold value data table 139 in the storage unit 108.

Upon receiving selected one or more other terminal IDs from the delivery destination selection unit 116, the delivery data generation unit 111 acquires one other terminal ID from the received one or more other terminal IDs.

The delivery data generation unit 111 acquires trustability included in other terminal information corresponding to the acquired other terminal ID, from the other terminal information table 131.

The delivery data generation unit 111 sets a result of subtracting "1" from a number of deliverable generations included in the read content threshold value data as a value F, and judges whether or not F is no less than 1.

When judging that F is no less than 1, the delivery data generation unit 111 judges whether or not a delivery trustability threshold value included in the read content threshold value data is "99".

When judging that the delivery trustability threshold value is not "99", the delivery data generation unit 111 judges whether or not the trustability acquired from the other terminal information table 131 is no less than the delivery trustability threshold value.

When judging that the trustability is no less than the delivery trustability threshold value, the delivery data generation unit 111 calculates a value A (=(delivery trustability threshold value)/(trustability)) using the delivery trustability threshold value and the trustability. When judging that the trustability is less than the delivery trustability threshold-value, the delivery data generation unit 111 sets A to "99".

Further, the delivery data generation unit 111 calculates a value B (=(color display trustability threshold value)/(trustability)) using a color display trustability threshold value and the trustability, and judges whether or not B is no more than 1.

When judging that B is more than 1, the delivery data generation unit 11 sets B to "99", and outputs a binary image processing instruction to perform binary image processing on the content data, to the data processing unit 110.

When judging that B is no more than 1, the delivery data generation unit 111 calculates a value C (=(editing trustability threshold value)/(trustability)) using an editing trustability threshold value and the trustability, and judges whether or not C is no more than 1.

When judging that C is more than 1, the delivery data generation unit 111 sets C to "99", and outputs an editing prohibition setting instruction to prohibit editing of the content data, to the data processing unit 110.

When judging that C is no more than 1, the delivery data generation unit 111 calculates a value D (=(original image display trustability threshold value)/(trustability)) using an original image display trustability threshold value and the trustability, and judges whether or not D is no more than When judging that D is more than 1, the delivery data generation unit 111 sets D to "99", and outputs an image reduction instruction to reduce the content data in size, to the data processing unit 110.

When judging that D is no more than 1, the delivery data generation unit 111 calculates a value E (=(saving trustability threshold value)/(trustability)) using a saving trustability threshold value and the trustability, and judges whether or not E is no more than 1.

When judging that E is more than 1, the delivery data generation unit 111 sets E to "99", and outputs a saving prohibition setting instruction to prohibit saving of the content data, to the data processing unit 110.

When judging that E is no more than 1, the delivery data generation unit 111 acquires delivery destination information included in the other terminal information corresponding to the acquired other terminal ID from the other terminal information table 131, and generates delivery time generation data using the calculated values (A, B, C, D, E, and F), the selected content ID, the other terminal ID, and the delivery destination information. Here, A is set as the secondary delivery trustability threshold value, B is set as the secondary color display trustability threshold value, and C is set as the secondary editing trustability threshold value. Also, D is set as the secondary original image display trustability threshold value, E is set as the secondary saving trustability threshold value, and F is set as the secondary number of deliverable generations.

The delivery data generation unit 111 outputs a data generation completion instruction indicating that the generation of the delivery time generation data is completed, to the data processing unit 110.

The delivery data generation unit 111 outputs the generated delivery time generation data and a delivery instruction to deliver the content data, to the delivery processing unit 118. Upon receiving a next data generation instruction to generate next delivery time generation data from the delivery processing unit 118, the delivery data generation unit 111 judges whether or not any of the selected one or more other terminal IDs has not been acquired yet. If any unacquired other terminal ID exists, the delivery data generation unit 111 acquires one other terminal ID from the unacquired other terminal ID, and repeats the above operation. If no unacquired other terminal ID exists, the delivery data generation unit 111 outputs a processing end instruction to the control unit 120, and ends the operation.

Figure 15:
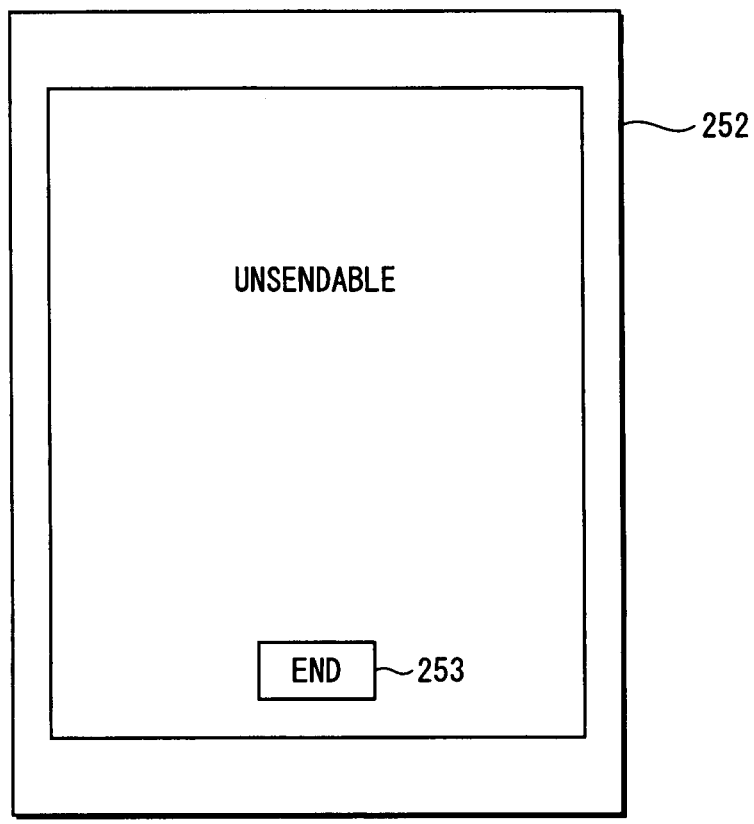
FIG. 15 shows one example of a sending prohibition screen 252.

When judging that F is less than 1 or when judging that the delivery trustability threshold value is "99", the delivery data generation unit 111 has the display unit 102 display a sending prohibition screen 252. As shown in FIG. 15, the sending prohibition screen 252 is composed of a message "unsendable" indicating that the content data cannot be sent, and an end button 253. Upon receiving a display end instruction indicating that the end button 253 is pressed from the input unit 101, the delivery data generation unit 111 outputs a processing end instruction to the control unit 120, and ends the operation.

As one example, an operation performed when "Hanako", "Jiro", and "Taro" are selected as sending destinations on the delivery destination confirmation screen 243 in FIG. 13 is explained below.

The delivery data generation unit 111 acquires the other terminal ID "2200" of "Hanako" from among the selected three other terminal IDs, and acquires the content threshold value data 147 corresponding to the selected content ID "1000-400".

The delivery data generation unit 111 calculates F from the number of deliverable generations, and also calculates A, B, C, D, and E using the trustability corresponding to the other terminal ID "2200" and the delivery trustability threshold value, the saving trustability threshold value, the original image display trustability threshold value, the editing trustability threshold value, and the color display trustability threshold value. The delivery data generation unit 111 generates delivery time generation data 247 shown in FIG. 14, using the other terminal ID, the delivery destination information, the content ID, and the calculated values.

Next, the delivery data generation unit 111 acquires the other terminal ID "2300" of "Jiro" from among the two unacquired other terminal IDs, and generates delivery time generation data 248 shown in FIG. 14.

Next, the delivery data generation unit 111 acquires the other terminal ID "2100" of "Taro" which is the unacquired other terminal ID, and generates delivery time generation data 249 shown in FIG. 14. Here, since the trustability corresponding to the other terminal ID "2100" is "0.1" while the delivery trustability threshold value corresponding to the content ID "1000-400" is "0.3", A is set to "99". As a result, after receiving the content data corresponding to the content ID "1000-400", the user terminal of Taro cannot deliver the received content data to an other user terminal.

(Generation of the Saving Time Generation Data)

Upon receiving a selected content ID and a saving data generation instruction from the delivery content selection unit 112, the delivery data generation unit 111 acquires content threshold value data corresponding to the received content ID from the content threshold value data table 139.

The delivery data generation unit 111 generates saving time generation data using the acquired content threshold value data and the received content ID.

The delivery data generation unit 111 outputs the generated saving time generation data and a saving instruction to save the content data, to the delivery processing unit 118.

(9) Delivery Processing Unit 118

(Operation Relating to Saving)

Upon receiving a saving instruction and saving time generation data from the delivery data generation unit 111, the delivery processing unit 118 reads content data corresponding to a content ID included in the received saving time generation data, i.e. a content ID selected by the user, from the content information 132. The delivery processing unit 118 writes the read content data and the received saving time generation data to the memory card 50.

The delivery processing unit 118 outputs a processing end instruction to the control unit 120.

(Operation Relating to Delivery)

The delivery processing unit 118 receives unprocessed content data or processed content data (hereafter simply referred to as content data) from the data processing unit 110.

Upon receiving a delivery instruction and delivery time generation data from the delivery data generation unit 111, the delivery processing unit 118 acquires a name included in other terminal information corresponding to a terminal ID included in the received delivery time generation data, from the other terminal information table 131.

Figure 16:
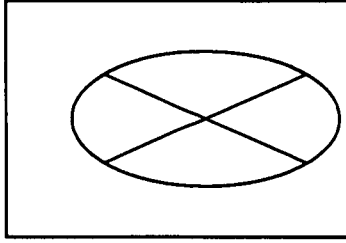
FIG. 16 shows one example of delivery time confirmation screen 258.

The delivery processing unit 118 has the display unit 102 display a delivery time confirmation screen 258 that includes the content data received from the data processing unit 110, the delivery time generation data received from the delivery data generation unit 111, and the acquired name. As shown in FIG. 16, the delivery time confirmation screen 258 is made up of the selected content data 216, a content ID 259, a delivery destination 260, a name 261, a secondary delivery trustability threshold value 262, a secondary saving trustability threshold value 263, a secondary original image display trustability threshold value 264, a secondary editing trustability threshold value 265, a secondary color display trustability threshold value 266, a secondary number of deliverable generations 267, a send button 268, and a cancel button 269. The content data displayed on the delivery time confirmation screen 258 has been decompressed by the image control unit 106.

The send button 268 is pressed when sending the content data. The cancel button 269 is pressed when cancelling the sending. The other display items are the same as the items of the delivery time generation data and the other terminal information, and so their explanation has been omitted here.

When the send button 268 is selected on the delivery time confirmation screen 258, the delivery processing unit 118 receives a delivery execution instruction to execute the delivery from the input unit 101, and sends the content data received from the data processing unit 110 and the delivery time generation data received from the delivery data generation unit 111, to the delivery destination. Having done so, the delivery processing unit 118 outputs a next data generation instruction to the delivery data generation unit 111.

When the cancel button 269 is selected on the delivery time confirmation screen 258, the delivery processing unit 118 receives a delivery cancel instruction to cancel the delivery from the input unit 101, and outputs a next data generation instruction to the delivery data generation unit 111.

As one example, the delivery processing unit 118 acquires the content data whose content ID is "1000-400" from the data processing unit 110, and receives the delivery time generation data 247 from the delivery data generation unit 111. The delivery data generation unit 111 has the display unit 102 display the delivery time confirmation screen 258. The content data 216 to be sent, its content ID "1000-400", the delivery destination information "Hana@aaa.bbb.ccc", the name "Hanako", the secondary delivery trustability threshold value "0.33", the secondary saving trustability threshold value "0.56", the secondary original image display trustability threshold value "0.44", the secondary editing trustability threshold value "0.78", the secondary color display trustability threshold value "0.44", and the secondary number of deliverable generations "4" are displayed on the delivery time confirmation screen 258.

When the send button 268 is pressed, the content data 216 whose content ID is "1000-400" and the delivery time generation data 247 are sent via the antenna 121. When the cancel button 269 is pressed, the sending is canceled.

(10) Data Processing Unit 110

The data processing unit 110, upon receiving a content ID selected by the user from the delivery content selection unit 112, acquires content data corresponding to the received content ID from the content information, and temporarily stores the acquired content data.

Upon receiving a binary image processing instruction from the delivery data generation unit 111, the data processing unit 110 performs binary image processing on the temporarily stored content data, and temporarily stores the content data on which the binary image processing has been performed.

Upon receiving an editing prohibition setting instruction from the delivery data generation unit 111, the data processing unit 110 sets the temporarily stored content data to be uneditable, and temporarily stores the content data which has been set as uneditable.

Upon receiving an image reduction instruction from the delivery data generation unit 111, the data processing unit 110 reduces the temporarily stored content data in size, and temporarily stores the content data which has been reduced in size.

Upon receiving a saving prohibition setting instruction from the delivery data generation unit 11, the data processing unit 110 sets the temporarily stored content data to be unsavable, and temporarily stores the content data which has been set as unsavable.

Upon receiving a data generation completion instruction from the delivery data generation unit 111, the data processing unit 110 outputs the temporarily stored content data to the delivery processing unit 118.

(11) Reception Processing Unit 117

The reception processing unit 117 receives content data and delivery time generation data from an other user terminal via the communication unit 119, and has the display unit 102 display the received content data. Here, when the received content data is set to be uneditable or the like, the reception processing unit 117 has the display unit 102 display the received content data based on the set information. The content data displayed by the display unit 102 has been decompressed by the image control unit 106.

After the display of the content data ends, if the content data is not set to be unsavable, the reception processing unit 117 generates content threshold value data from the received delivery time generation data, and writes the generated content threshold value data to the content threshold value data table 139. The reception processing unit 117 also writes the received content data and its content ID to the content information 132 in correspondence with each other. If the content data is set to be unsavable, the reception processing unit 117 abandons the received content data and delivery time generation data.

(12) Communication Unit 119

The communication unit 119 receives content data and delivery time generation data from an other user terminal on the network using a communication protocol via the antenna 121. The communication unit 119 outputs the received content data and delivery time generation data to the reception processing unit 117.

The communication unit 119 receives content data and delivery time generation data from the delivery processing unit 118, and delivers the received content data and delivery time generation data to an other user terminal of a delivery destination, via the antenna 121.

(13) Image Control Unit 106

The image control unit 106, upon receiving an image from the camera 103, compresses the received image, and outputs the compressed image to the content acquisition unit 107 as content data.

When the delivery content selection unit 112 displays a content selection screen including content data, the image control unit 106 decompresses the content data to be displayed.

When the delivery condition setting unit 113 displays a setting prohibition screen and a delivery condition input screen, the image control unit 106 decompresses content data to be displayed.

When the delivery processing unit 118 displays a delivery time confirmation screen including content data, the image control unit 106 decompresses the content data to be displayed.

When the reception processing unit 117 displays content data received from an other user terminal, the image control unit 106 decompresses the content data to be displayed.

(14) Display Unit 102

The display unit 102 displays a menu selection screen and a menu ending screen when instructed by the processing selection unit 115.

The display unit 102 displays an other terminal information input screen when instructed by the other terminal information setting unit 114.

The display unit 102 displays a content data generation screen when instructed by the content acquisition unit 107.

The display unit 102 displays a content selection screen and a sending/saving/setting selection screen when instructed by the delivery content selection unit 112.

The display unit 102 displays a setting prohibition screen and a delivery condition input screen when instructed by the delivery condition setting unit 113.

The display unit 102 displays a delivery destination selection screen and a delivery destination confirmation screen when instructed by the delivery destination selection unit 116.

The display unit 102 displays a sending prohibition screen when instructed by the delivery data generation unit 111.

The display unit 102 displays a delivery time confirmation screen when instructed by the delivery processing unit 118.

The display unit 102 displays received content data when instructed by the reception processing unit 117.

(15) Control Unit 120

The control unit 120 exercises controls on the entire portable terminal 10.

The control unit 120 outputs a menu selection screen display instruction to the processing selection unit 115.

Upon receiving a first selection instruction indicating that the other terminal information setting is selected from the input unit 101 while the menu selection screen 148 is displayed, the control unit 120 outputs a setting instruction to the other terminal information setting unit 114.

Upon receiving a second selection instruction indicating that the content data generation is selected from the input unit 101 while the menu selection screen 148 is displayed, the control unit 120 outputs a generation instruction to the content acquisition unit 107.

Upon receiving a third selection instruction indicating that the content processing is selected from the input unit 101 while the menu selection screen 148 is displayed, the control unit 120 outputs a selection instruction to the delivery content selection unit 112.

Upon receiving a setting end instruction from the other terminal information setting unit 114, the control unit 120 outputs a menu ending screen display instruction to the processing selection unit 115.

Upon receiving a generation end instruction from the content acquisition unit 107, the control unit 120 outputs a menu ending screen display instruction to the processing selection unit 115.

Upon receiving a processing end instruction from the delivery data generation unit 111, the control unit 120 outputs a menu ending screen display instruction to the processing selection unit 115.

Upon receiving a processing end instruction from the delivery condition setting unit 113, the control unit 120 outputs a menu ending screen display instruction to the processing selection unit 115.

Upon receiving a processing end instruction from the delivery processing unit 118, the control unit 120 outputs a menu ending screen display instruction to the processing selection unit 115.

(16) Input Unit 101

The input unit 101 receives a data input and a button selection from the user in accordance with a screen displayed on the display unit 102.

When the user selects the other terminal information setting and presses the select button 149 while the menu selection screen 148 is displayed, the input unit 101 outputs a first selection instruction to the control unit 120.

When the user selects the content data generation and presses the select button 149 while the menu selection screen 148 is displayed, the input unit 101 outputs a second selection instruction to the control unit 120.

When the user selects the content processing and presses the select button 149 while the menu selection screen 148 is displayed, the input unit 101 outputs a third selection instruction to the control unit 120.

While the menu ending screen 150 is displayed, the input unit 101 notifies the processing selection unit 115 that the end is selected when the end button 151 is selected, and that the continuation is selected when the continue button 152 is selected.

Upon receiving other terminal information while the other terminal information input screen 153 is displayed, the input unit 101 outputs the received other terminal information to the other terminal information setting unit 114. Also, the input unit 101 outputs an information register instruction to the other terminal information setting unit 114 upon receiving the selection of the register button 158, and outputs an information cancel instruction to the other terminal information setting unit 114 upon receiving the selection of the cancel button 159.

While the content data generation screen is displayed, when "generate by camera" is selected and the select button 161 is pressed, the input unit 101 notifies the content acquisition unit 107 of the selection. Also, when "read from memory card" is selected and the select button 161 is pressed, the input unit 101 notifies the content acquisition unit 106 of the selection. Also, when "generate by character input" is selected and the select button 161 is pressed, the input unit 101 notifies the content acquisition unit 107 of the selection.

While the content selection screen is displayed, the input unit 101 outputs a previous move instruction to the delivery content selection unit 112 when the previous button is selected, and outputs a next move instruction to the delivery content selection unit 112 when the next button is selected. Also, the input unit 101 outputs a selection determination instruction to the delivery content selection unit 112 when the select button is selected.

While the sending/saving/setting selection screen is displayed, the input unit 101 outputs a sending selection instruction to the delivery content selection unit 112 when the send button is selected, outputs a saving selection instruction to the delivery content selection unit 112 when the save button is selected, and outputs a setting selection instruction to the delivery content selection unit 112 when the set button is selected.

When the end button 226 is selected while the setting prohibition screen 224 is displayed, the input unit 101 outputs a display end instruction to the delivery condition setting unit 113.

Upon receiving a delivery trustability threshold value, a saving trustability threshold value, an original image display trustability threshold value, an editing trustability threshold value, a color display trustability threshold value, and a number of deliverable generations while the delivery condition input screen 227 is displayed, the input unit 101 outputs the received values to the delivery condition setting unit 113. Also, when the register button 234 is selected, the input unit 101 outputs a condition register instruction to the delivery condition setting unit 113. When the cancel button 235 is selected, the input unit 101 outputs a condition cancel instruction to the delivery condition setting unit 113.

While the delivery destination selection screen 240 is displayed, upon receiving a selection of a delivery destination, the input unit 101 outputs the selected delivery destination to the delivery destination selection unit 116. Also, when the OK button 241 is selected, the input unit 101 outputs a delivery selection instruction to the delivery destination selection unit 116. When the next button 242 is selected, the input unit 101 outputs a next display instruction to the delivery destination selection unit 116.

While the delivery destination confirmation screen 243 is displayed, the input unit 101 outputs a sending destination determination instruction to the delivery destination selection unit 116 when the OK button 244 is selected, and outputs a delivery destination cancel instruction to the delivery destination selection unit 116 when the cancel button 245 is selected.

While the sending prohibition screen 252 is displayed, the input unit 101 outputs a display end instruction to the delivery data generation unit 111 when the end button 253 is selected.

While the delivery time confirmation screen 258 is displayed, the input unit 101 outputs a delivery execution instruction to the delivery processing unit 118 when the send button 268 is selected, and outputs a delivery cancel instruction to the delivery processing unit 118 when the cancel button 269 is selected.

(17) Memory Card 50

The memory card 50 is formed by enclosing an IC chip unit in a resin that is shaped like a plate of 32 mm in length, 24 mm in width, and 2.1 mm in thickness.

The memory card 50 is actually realized by a computer system including a microprocessor, a ROM, a RAM, and the like.

The memory card 50 has an area for storing content data and saving time generation data.

(18) Microphone 105

The microphone 105, when performing a telephone call, receives an audio input from the user, converts the received audio to a signal, and outputs it to the communication unit 119.

(19) Speaker 104

The speaker 104, when performing a telephone call, converts an audio signal received via the communication unit to audio, and outputs it.

(20) Camera 103

The camera 103 is a digital camera as one example, and outputs a photographed image to the image control unit 106.

(21) Antenna 121

The antenna 121 sends/receives an electric wave.

<1.3 Operations of the Portable Terminal 10>

The following describes operations of the portable terminal 10.

(1) Operation at the time of Menu Selection

An operation at the time of menu selection is described below, with reference to a flowchart shown in FIG. 17.

The control unit 120 outputs a menu selection screen display instruction to the processing selection unit 115 (step S5).

The processing selection unit 115 has the display unit 102 display the menu selection screen 148 (step S10), and the input unit 101 receives a menu selection (step S15).

When "other terminal information setting" is selected on the menu selection screen 148 (step S20: "other terminal information setting"), the control unit 120 outputs a setting instruction to the other terminal information setting unit 114 (step S30), and the other terminal information setting unit 114 starts the other terminal information setting (step 35).

When "content generation" is selected on the menu selection screen 148 (step S20: "content data generation"), the control unit 120 outputs a generation instruction to the content acquisition unit 107 (step S40), and the content acquisition unit 107 starts the content data generation (step S45).

When "content processing" is selected on the menu selection screen 148 (step S20: "content processing"), the control unit 120 outputs a selection instruction to the delivery content selection unit 112 (step S50), and the delivery content selection unit 112 starts the content processing (step S55).

After "other terminal information setting", "content data generation", or "content processing" ends, the control unit 120 outputs a menu ending screen display instruction to the processing selection unit 115. Upon receiving the menu ending screen display instruction, the processing selection unit 115 has the display unit 102 display the menu ending screen 150 (step S60), and receives a button (step S65). When the continue button 152 is selected (step S70: "continue"), the processing selection unit 115 returns to step S10. When the end button 151 is selected (step S70: "end"), the processing selection unit 115 ends the processing.

(2) Operation at the time of Other Terminal Information Setting

Figure 17:
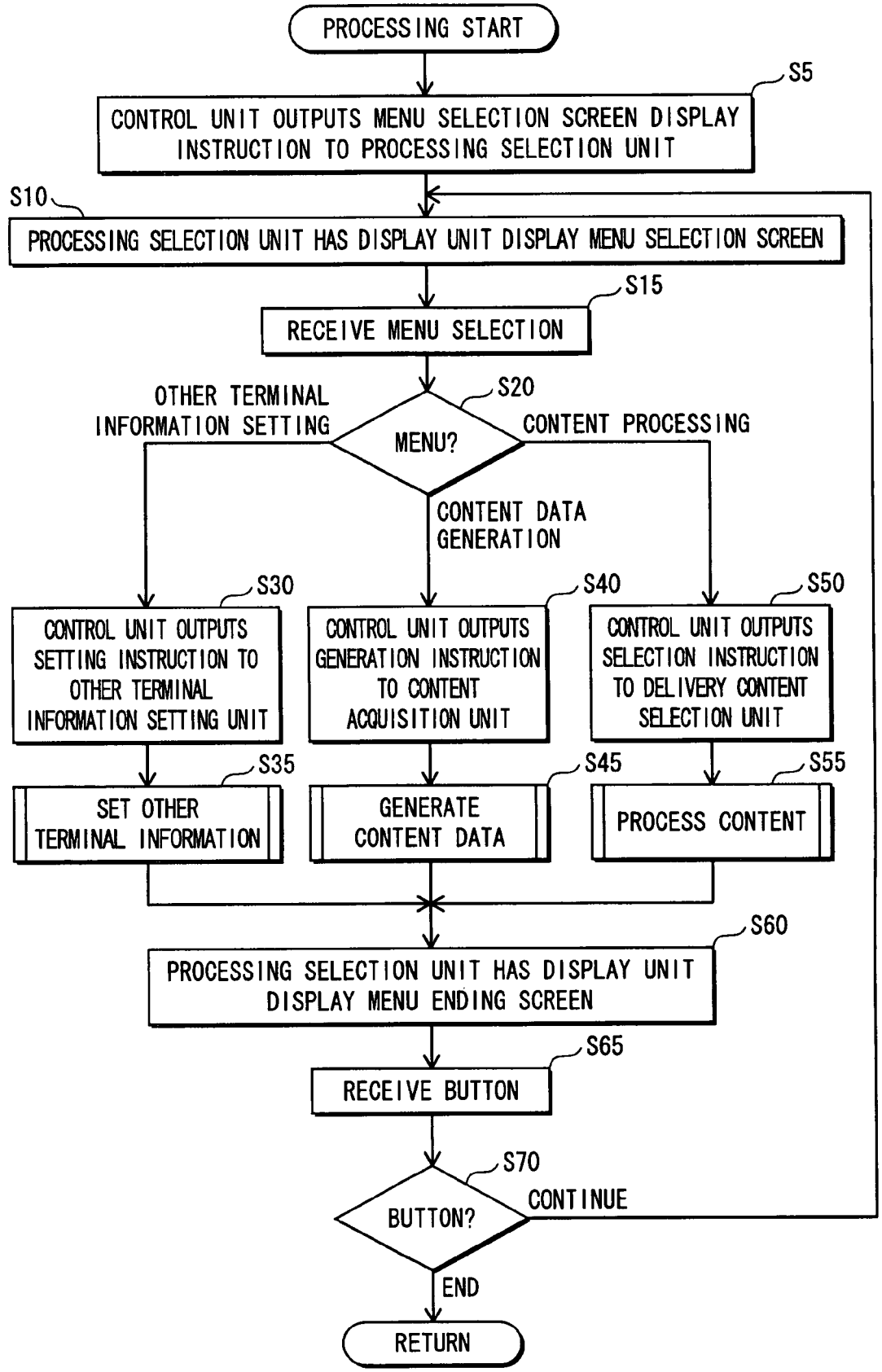
FIG. 17 is a flowchart showing an operation of the portable terminal 10.
Figure 18:
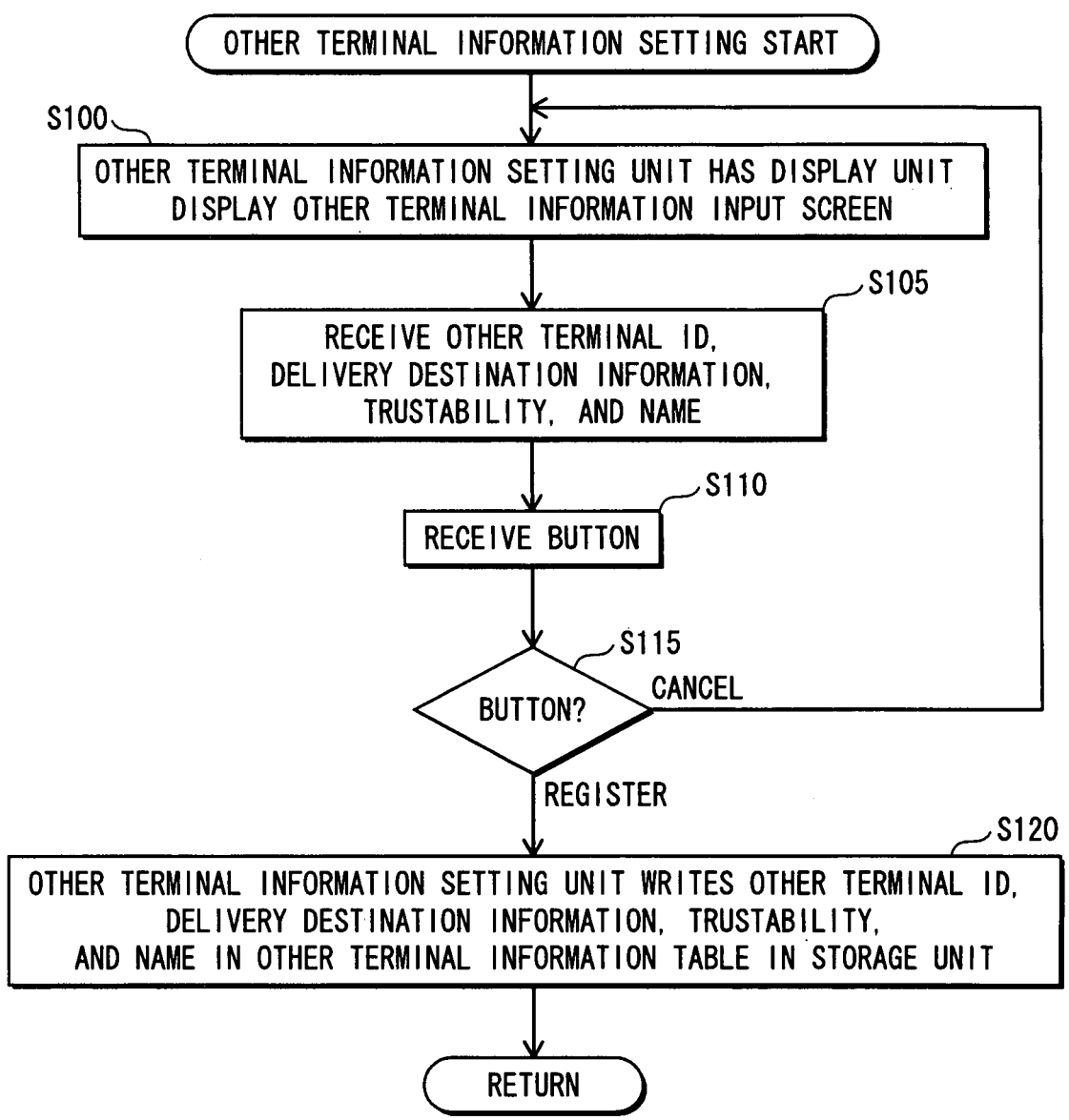
FIG. 18 is a flowchart showing an operation when setting other terminal information.

An operation at the time of other terminal information setting in step S35 shown in FIG. 17 is described below, with reference to a flowchart shown in FIG. 18.

The other terminal information setting unit 114 has the display unit 102 display the other terminal information input screen 153 (step S100). On the other terminal information input screen 153, the other terminal information setting unit 114 receives another terminal ID, a name, delivery destination information, and trustability via the input unit 101 (step S105). The input unit 101 receives a button (step S110).

When the register button 158 is selected (step S115: "register"), the other terminal information setting unit 114 receives the other terminal information (the other terminal ID, the name, the delivery destination information, and the trustability) input by the user and an information register instruction to register the information, from the input unit 101. The other terminal information setting unit 114 writes the received other terminal information to the other terminal information table 131 in the storage unit 108 (step S120). The other terminal information setting unit 114 also outputs a setting end instruction indicating that the other terminal information setting ends, to the control unit 120.

When the cancel button 159 is selected (step S115: "cancel"), the other terminal information setting unit 114 receives an information cancel instruction to cancel the registration from the input unit 101, abandons the other terminal information input by the user, and returns to step S100.

(3) Operation at the time of Content Data Generation

Figure 19:
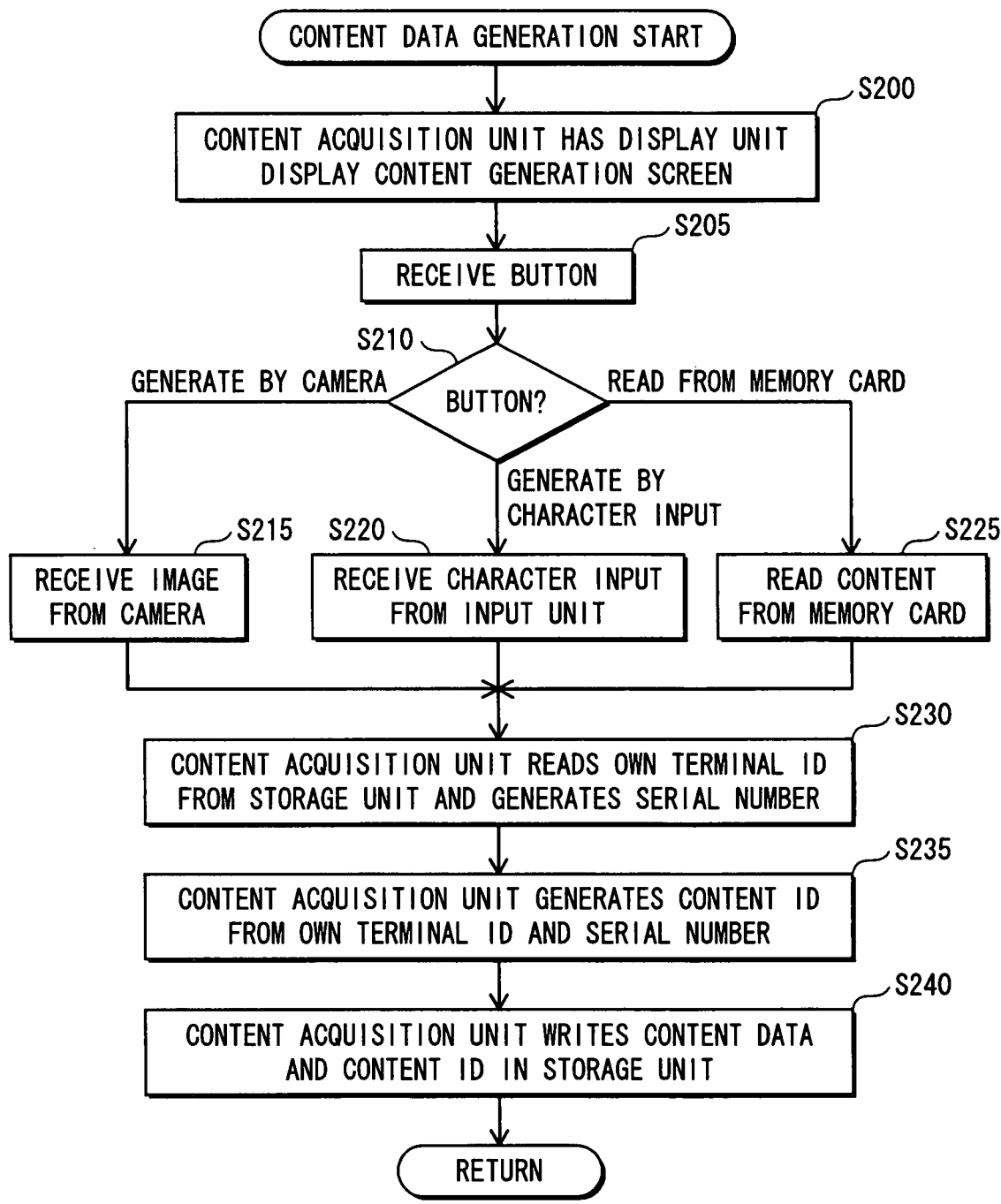
FIG. 19 is a flowchart showing an operation when generating content data.

An operation of content data generation in step S45 shown in FIG. 17 is described below, with reference to a flowchart shown in FIG. 19.

The content acquisition unit 107 has the display unit 102 display the content data generation screen 160 (step S200), and receives a button selection via the input unit 101 (step S205).

When "generate by camera" is selected (step S210: "generate by camera"), the content acquisition unit 107 receives an image photographed by the camera 103 and compressed by the image control unit 106, from the image control unit 106 as content data (step S215). The content acquisition unit 107 reads the own terminal ID from the storage unit 108 and generates a serial number (step S230). The content acquisition unit 107 then generates a content ID from the read own terminal ID and the generated serial number (step S235), and writes the received content data and the content ID to the content information 132 in the storage unit 108 in correspondence with each other (step S240).

When "generate by character input" is selected (step S210: "generate by character input"), the content acquisition unit 107 receives character data from the input unit 101 as content data (step S220). The content acquisition unit 107 reads the own terminal ID from the storage unit 108 and generates a serial number (step S230). The content acquisition unit 107 generates a content ID from the read own terminal ID and the generated serial number (step S235), and writes the received content data and the content ID to the content information 132 in the storage unit 108 in correspondence with each other (step S240).

When "read from memory card" is selected (step S210: "read from memory card"), the content acquisition unit 107 reads content data from the memory card 50 (step S225). The content acquisition unit 107 reads the own terminal ID from the storage unit 108 and generates a serial number (step S230).

The content acquisition unit 107 generates a content ID from the read own terminal ID and the generated serial number (step S235), and writes the read content data and the content ID to the content information 132 in the storage unit 108 in correspondence with each other (step S240).

(4) Operation at the time of Content Processing

An operation of content processing in step S55 shown in FIG. 17 is described below, with reference to a flowchart shown in FIG. 20.

The delivery content selection unit 112 acquires first content data and its content ID stored in the content information 132 in the storage unit 108, or acquires content data and its content ID based on an instruction corresponding to a received button (step S300).

The delivery content selection unit 112 acquires a delivery trustability threshold value corresponding to the acquired content ID from the content threshold value data table 139 (step S305).

The delivery content selection unit 112 has the display unit 102 display the content selection screen based on the acquired delivery trustability threshold value (step S310) The input unit 101 receives a button (step S315).

When the previous button or the next button is selected (step S320: "previous" or "next"), the input unit 101 outputs a previous move instruction or a next move instruction to the delivery content selection unit 112. Upon receiving the previous move instruction or the next move instruction from the input unit 101, the delivery content selection unit 112 returns to step S300.

When the select button is selected (step S320: "select"), the delivery content selection unit 112 receives a selection determination instruction from the input unit 101, and has the display unit 102 display the sending/saving/setting selection screen (step S325). The input unit 101 receives a button (step S330).

When the save button is selected (step S335: "save"), the delivery content selection unit 112 receives a saving selection instruction from the input unit 101, and performs a saving process (step S340).

When the set button is selected (step S335: "set"), the delivery content selection unit 112 receives a setting selection instruction from the input unit 101, and performs a setting process (step S345).

When the send button is selected (step S335: "send"), the delivery content selection unit 112 receives a sending selection instruction indicating that the send button is pressed from the input unit 101, and performs a sending process (step S350).

(5) Operation of the Saving Process

Figure 20:
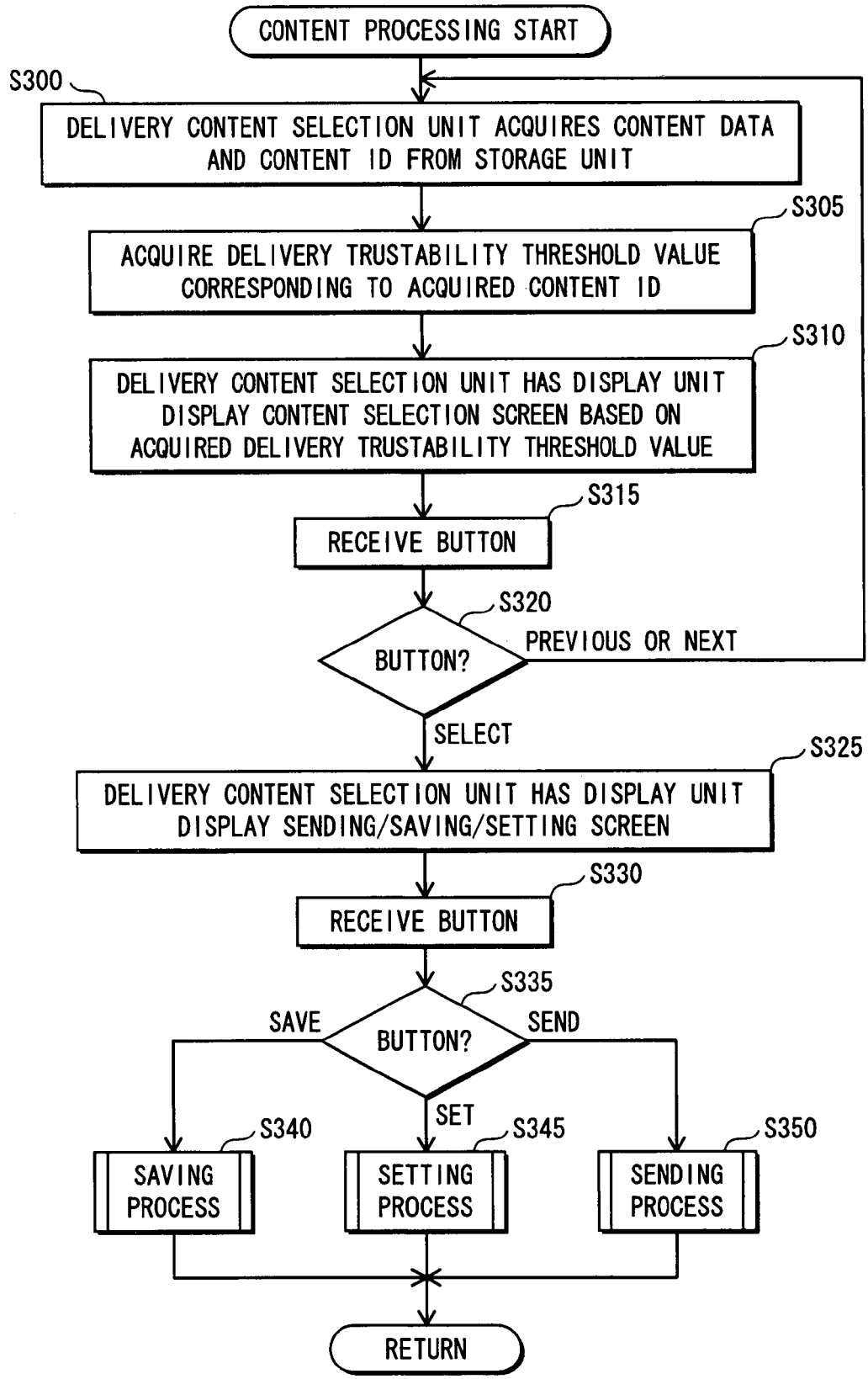
FIG. 20 is a flowchart showing an operation when processing content.
Figure 21:
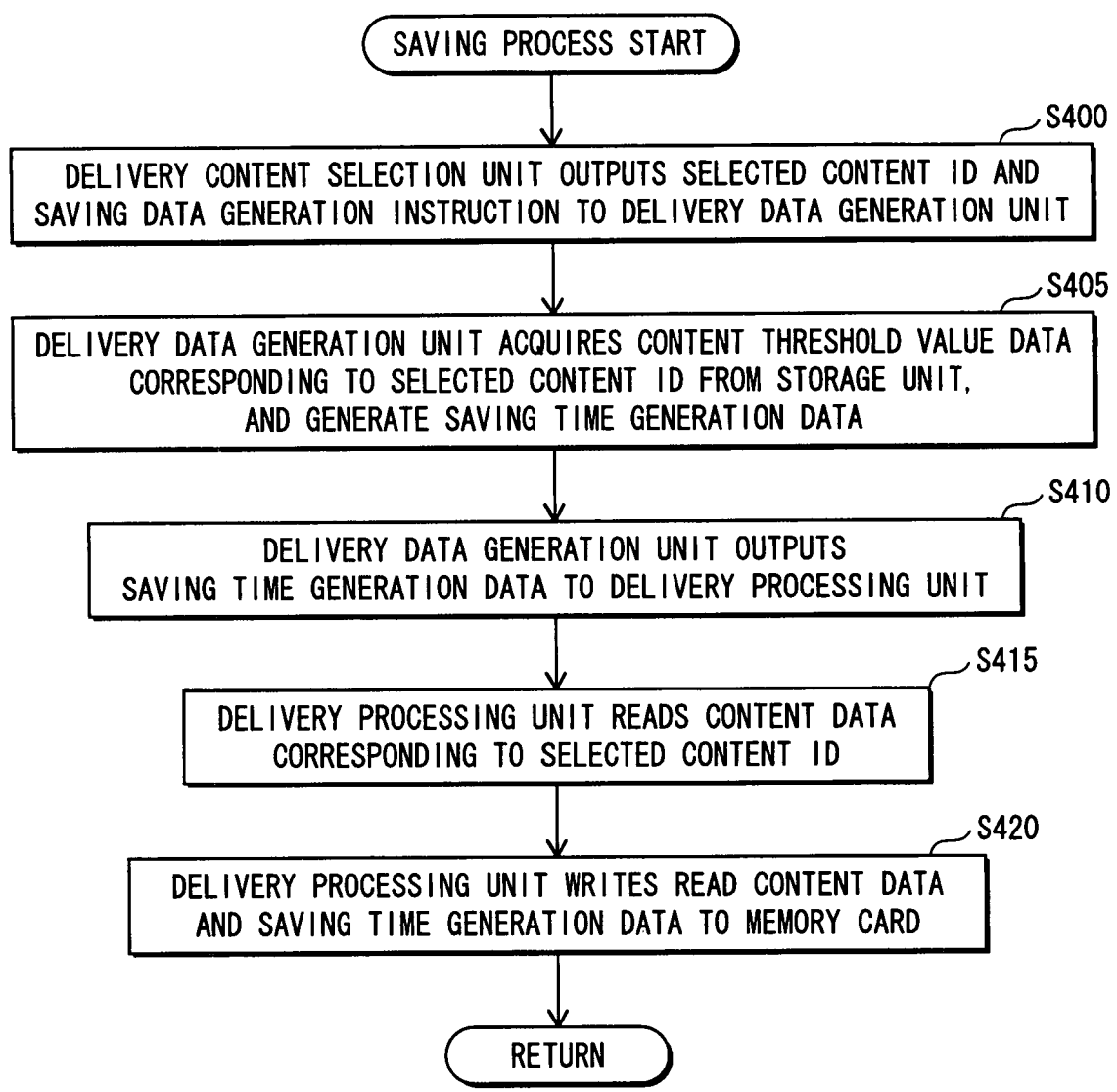
FIG. 21 is a flowchart showing an operation of a saving process.

An operation of the saving process in step S340 shown in FIG. 20 is described below, with reference to a flowchart shown in FIG. 21.

The delivery content selection unit 112 outputs a selected content ID and a saving data generation instruction to the delivery data generation unit 111 (step S400).

Upon receiving the content ID and the saving data generation instruction, the delivery data generation unit 111 acquires content threshold value data corresponding to the received content ID from the content threshold value data table 139, and generates saving time delivery data using the acquired content threshold value data (step S405). The delivery data generation unit 111 outputs the generated saving time generation data to the delivery processing unit 118 (step S410).

Upon receiving the saving time generation data from the delivery data generation unit 111, the delivery processing unit 118 reads content data corresponding to the content ID included in the received saving time generation data, i.e. the content ID selected by the user, from the content information 132 (step S415).

The delivery processing unit 118 writes the read content data and the received saving time generation data to the memory card 50 (step S420). After writing to the memory card 50, the delivery processing unit 118 outputs a processing end instruction to the control unit 120.

(6) Operation of the Setting Process

Figure 22:
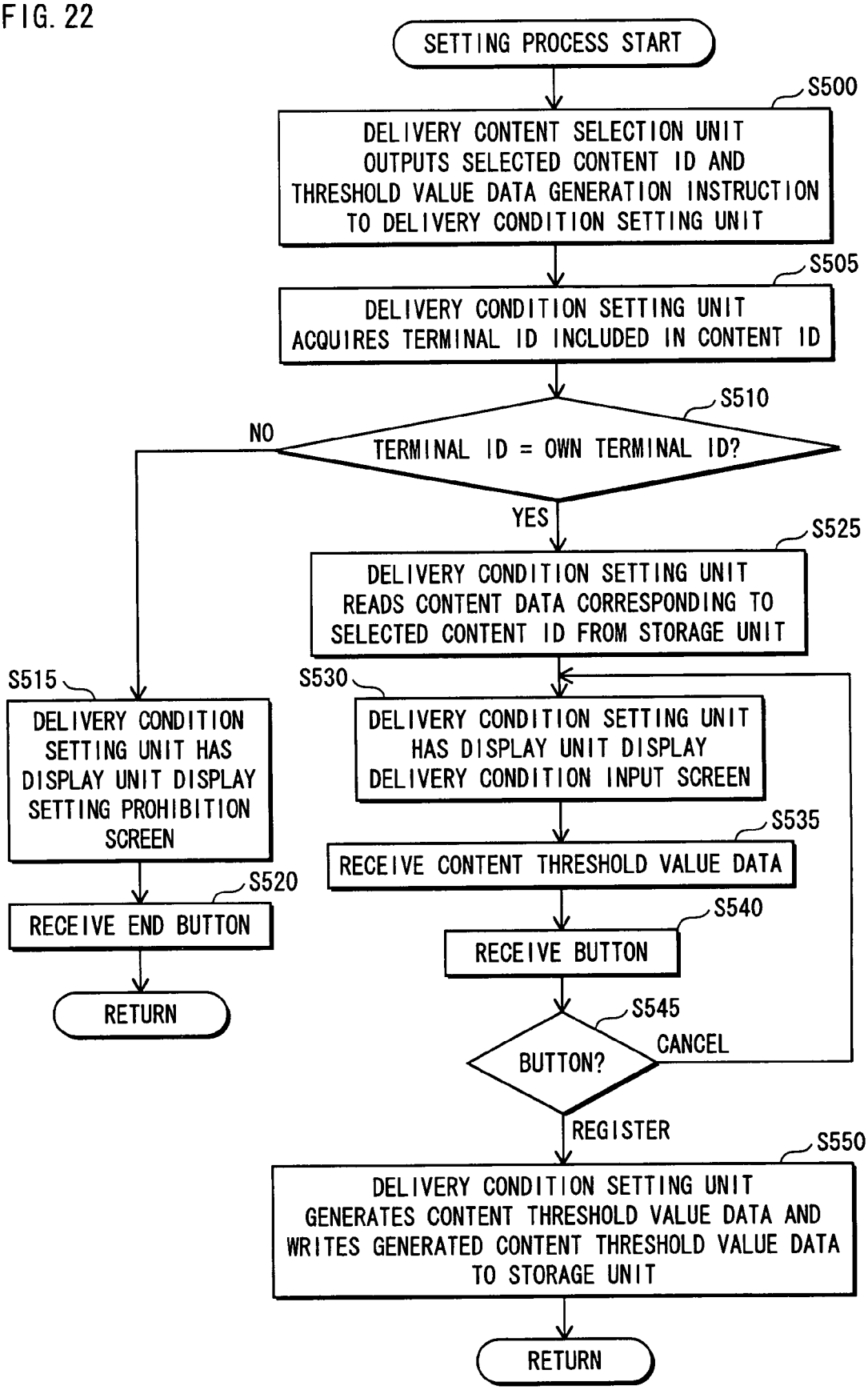
FIG. 22 is a flowchart showing an operation of a setting process.
Figure 23:
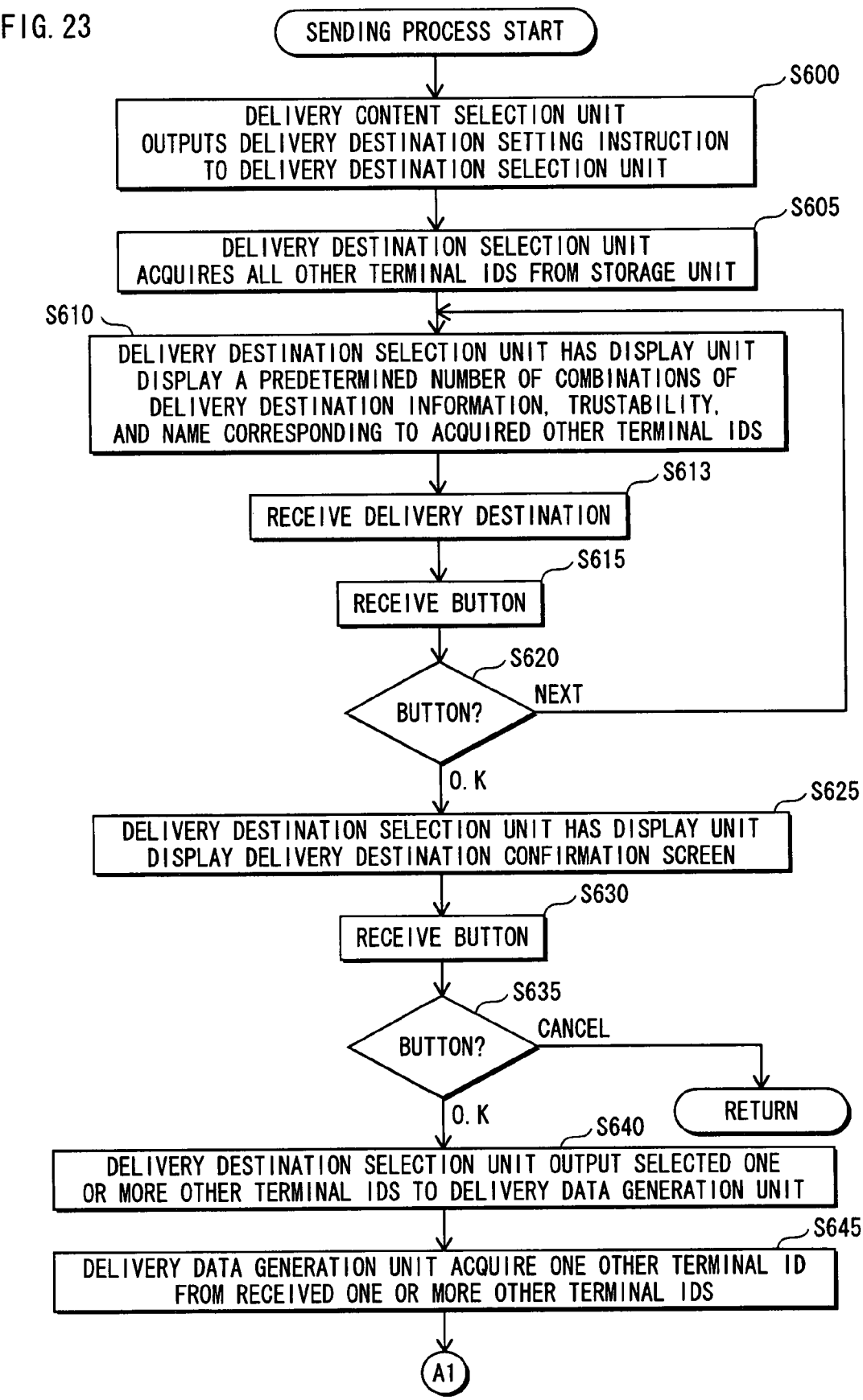
FIG. 23 is a flowchart showing an operation of a sending process, continuing to FIG. 24.
Figure 24:
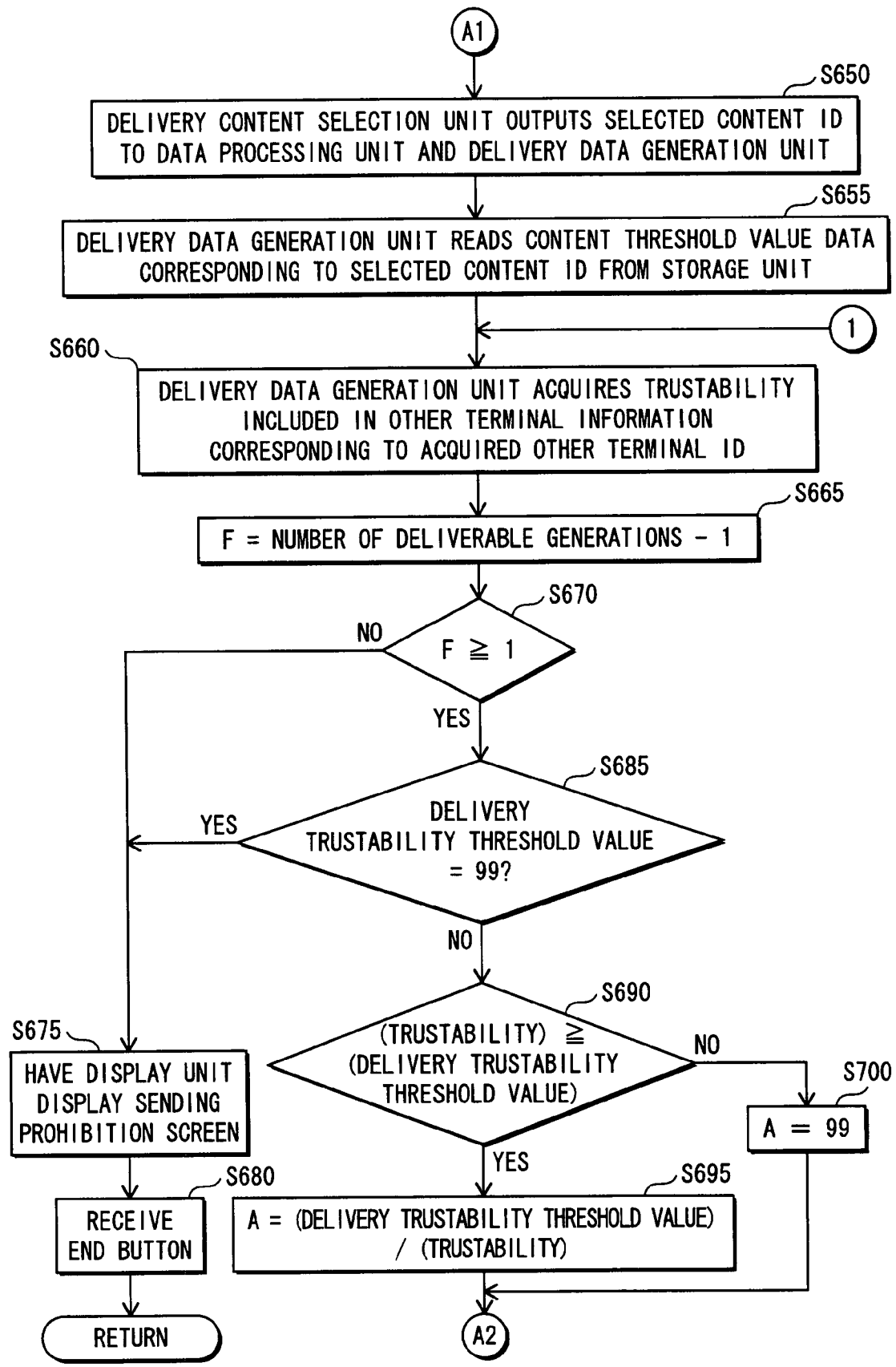
FIG. 24 is a flowchart showing the operation of the sending process, continuing from FIG. 23 to FIG. 25.
Figure 25:
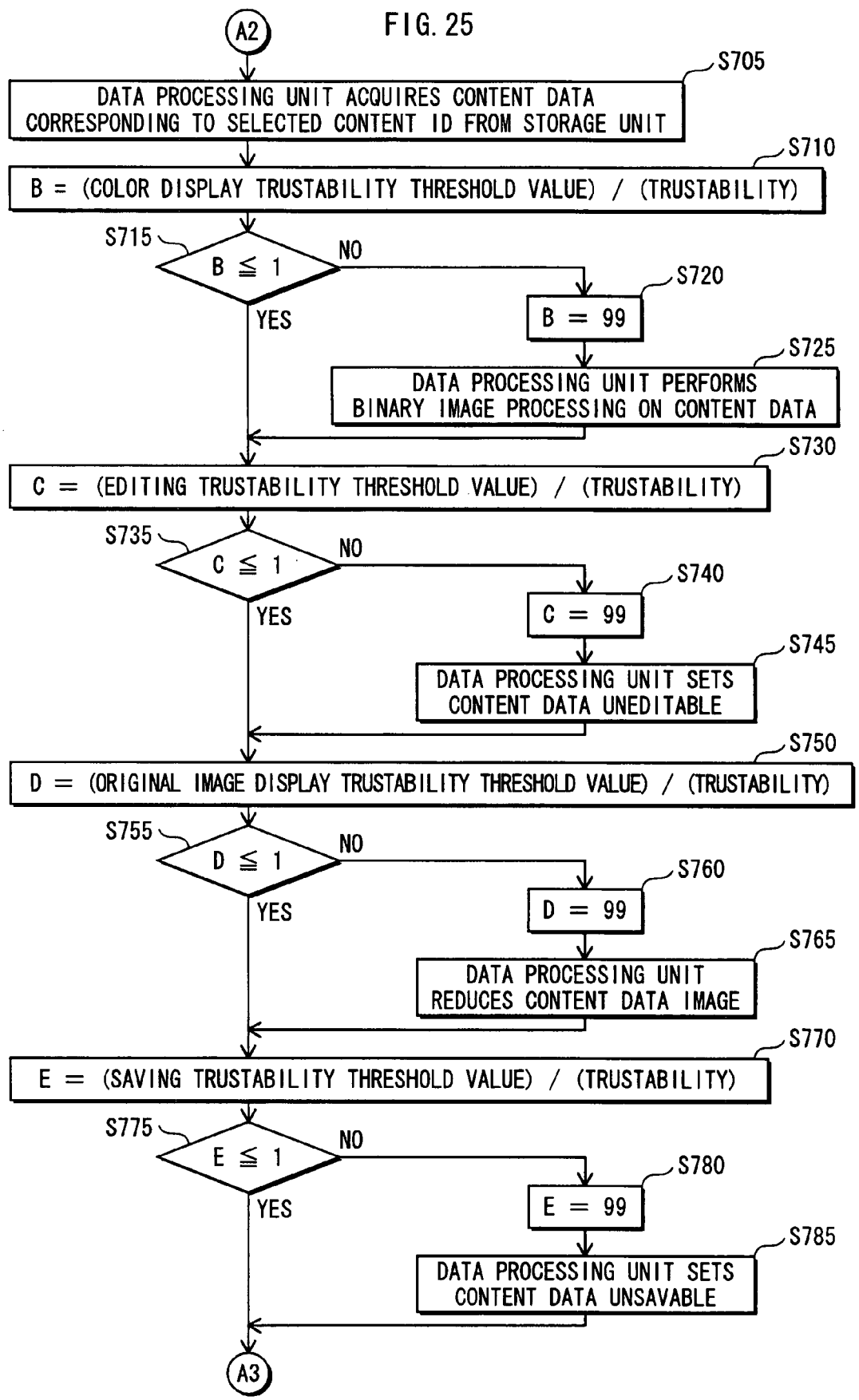
FIG. 25 is a flowchart showing the operation of the sending process, continuing from FIG. 24 to FIG. 26.
Figure 26:
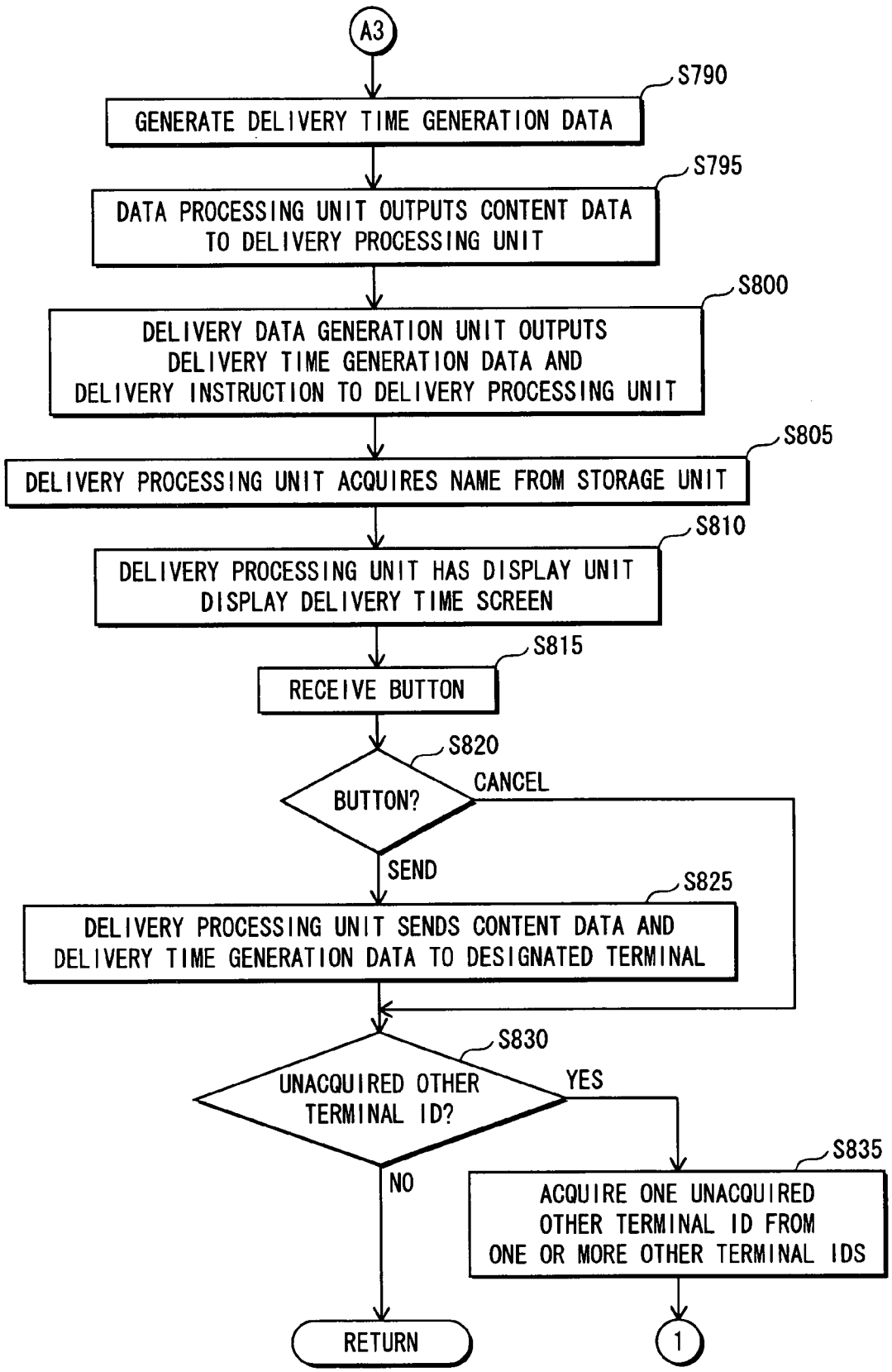
FIG. 26 is a flowchart showing the operation of the sending process, continuing from FIG. 25.

An operation of the setting process in step S345 shown in FIG. 20 is described below, with reference to a flowchart shown in FIG. 22.

The delivery content selection unit 112 outputs a selected content ID and a threshold value data generation instruction to the delivery condition setting unit 113 (step S500).

Upon receiving the selected content ID and the threshold value data generation instruction from the delivery content selection unit 112, the delivery condition setting unit 113 acquires a terminal ID included in the received content ID (step S505). The delivery condition setting unit 113 judges whether or not the acquired terminal ID matches the own terminal ID (step S510).

When judging that the acquired terminal ID does not match the own terminal ID (step S510: "NO"), the delivery condition setting unit 113 has the display unit 102 display the setting prohibition screen 224 (step S515). When the input unit 101 receives an end button, the delivery condition setting unit 113 ends the display of the setting prohibition screen 224, and outputs a processing end instruction to the control unit 120 (step S520).

When judging that the acquired terminal ID matches the own terminal ID (step S510: "YES"), the delivery condition setting unit 113 reads content data corresponding to the selected content ID from the content information 132 in the storage unit 108 (step S525), and has the display unit 102 display the delivery condition input screen 227 including the read content data (step S530).

The delivery condition setting unit 113 receives content threshold value data via the input unit 101 (step S535). The input unit 101 receives a button (step S540).

When the register button 234 is selected (step 545: "register"), the delivery condition setting unit 113 writes the received content threshold value data to the content threshold value data table 139 in the storage unit 108 (step S550). After writing to the content threshold value data table 139, the delivery condition setting unit 113 outputs a processing end instruction to the control unit 120.

When the cancel button 235 is selected (step S545: "cancel"), the delivery condition setting unit 113 receives a condition cancel instruction indicating that the cancel button is selected from the input unit 101, deletes each value input by the user, and returns to step S530.

(7) Operation of the Sending Process

An operation of the sending process in step S350 shown in FIG. 20 is described below, with reference to a flowchart shown in FIGS. 23 to 26.

The delivery content selection unit 112 sends a delivery destination setting instruction to the delivery destination selection unit 116 (step S600).

The delivery destination selection unit 116 acquires all other terminal IDs from the other terminal information table 131 in the storage unit 108 (step S605). The delivery destination selection unit 116 has the display unit 102 display the predetermined number of combinations of delivery destination information, trustability, and name corresponding to the acquired terminal IDs (step S610).

The delivery destination selection unit 116 receives a delivery destination selected by the user via the input unit 101, and temporarily stores the received delivery destination and its corresponding other terminal ID in the ID storage area (step S613). The input unit 101 receives a button (step S615).

When the next button 242 is selected (step S620: "next."), the delivery destination selection unit 116 receives a next display instruction from the input unit 101, returns to step S610, and has the display unit 102 display the predetermined number of combinations of delivery destination information, name, and trustability which have not been displayed yet, using the delivery destination selection screen 240.

When the OK button 241 is selected (step S620: "OK"), the delivery destination selection unit 116 has the display unit 102 display the delivery destination confirmation screen 243 that includes a name included in each of one or more delivery destinations stored in the ID storage area (step S625). The input unit 101 receives a button (step S630).

When the cancel button 245 is selected (step S635: "cancel"), the delivery destination selection unit 116 receives a delivery destination cancel instruction from the input unit 101, outputs a processing end instruction to the control unit 120, and ends the sending process.

When the OK button 244 is selected (step S635: "OK"), the delivery destination selection unit 116 receives a sending destination determination instruction from the input unit 101, and outputs the selected one or more other terminal IDs to the delivery data generation unit 111 (step S640).

The delivery data generation unit 111 acquires one other terminal ID from the received one or more other terminal IDs (step S645).

The delivery content selection unit 112 outputs a selected content ID to the data processing unit 110 and the delivery data generation unit 111 (step S650).

The delivery data generation unit 111 reads content threshold value data corresponding to the selected content ID from the content threshold value data table 139 in the storage unit 108 (step S655).

The delivery data generation unit 111 acquires trustability included in other terminal information corresponding to the acquired other terminal ID, from the other terminal information table 131 (step S660).

The delivery data generation unit 111 subtracts 1 from a number of deliverable generations included in the read content threshold value data, and sets a result of the subtraction as F (step S665).

The delivery data generation unit 111 judges whether or not F is no less than 1 (step S670).

When judging that F is less than 1 (step S670: "NO"), the delivery data generation unit 111 has the display unit 102 display the sending prohibition screen 252 (step S675). After this, the end button 253 is received (step S680). When the input unit 101 receives the end button 253, the delivery data generation unit 111 outputs a processing end instruction to the control unit 120, and ends the operation of the sending process.

When judging that F is no less than 1 (step S670: "YES"), the delivery data generation unit 111 judges whether or not a delivery trustability threshold value included in the read content threshold value data is "99" (step S685).

When judging that the delivery trustability threshold value is "99" (step S685: "YES"), the delivery data generation unit 111 has the display unit 102 display the sending prohibition screen 252 (step S675). The input unit 101 receives the end button 253 (step S680). When the input unit 101 receives the end button 253, the delivery data generation unit 111 outputs a processing end instruction to the control unit 120, and ends the operation of the sending process.

When judging that the delivery trustability threshold value is not "99" (step S685: "NO"), the delivery data generation unit 111 judges whether or not the acquired trustability is no less than the delivery trustability threshold value (step S690).

When judging that the trustability is no less than the delivery trustability threshold value (step S690: "YES"), the delivery data generation unit 111 calculates A (=(delivery trustability threshold value)/(trustability)) (step S695). When judging that the trustability is less than the delivery trustability threshold value (step S690: "NO"), the delivery data generation unit 111 sets A to "99" (step S700).

The data processing unit 110 acquires content data corresponding to the selected content ID from the content information 132 in the storage unit 108 (step S705). The data processing unit 110 temporarily stores the acquired content data.

The delivery data generation unit 111 calculates B (=(color display trustability threshold value)/(trustability)) (step S710), and judges whether or not B is no more than 1 (step S715). When judging that B is no more than 1 (step S715: "YES"), the delivery data generation unit 111 calculates C (=(editing trustability threshold value)/(trustability)) (step S730). When judging that B is more than 1 (step S715: "NO"), the delivery data generation unit 111 sets B to "99" (step S720). Next, the delivery data generation unit 111 outputs a binary image processing instruction to the data processing unit 110. Upon receiving the binary image processing instruction from the delivery data generation unit 111, the data processing unit 110 performs binary image processing on the temporarily stored content data, and temporarily stores the content data on which the binary image processing has been performed (step S725). After this, the delivery data generation unit 111 performs step S730.

The delivery data generation unit 111 judges whether or not C is no more than 1 (step S735). When judging that C is no more than 1 (step S735: "YES"), the delivery data generation unit 111 calculates D (=(original image display trustability threshold value)/(trustability)) (step S750) When judging that C is more than 1 (step S735: "NO"), the delivery data generation unit 111 sets C to "99" (step S740) The delivery data generation unit 111 then outputs an editing prohibition instruction to the data processing unit 110. Upon receiving the editing prohibition instruction from the delivery data generation unit 111, the data processing unit 110 sets the temporarily stored content data as uneditable, and temporarily stores the content data which has been set as uneditable (step S745). After this, the delivery data generation unit 111 performs step S750.

The delivery data generation unit 111 judges whether or not D is no more than 1 (step S755). When judging that D is no more than 1 (step S755: "YES"), the delivery data generation unit 111 calculates E (=(saving trustability threshold value)/(trustability)) (step S770). When judging that D is more than 1 (step S755: "NO"), the delivery data generation unit 111 sets D to "99" (step S760). The delivery data generation unit 111 then outputs an image reduction instruction to the data processing unit 110. Upon receiving the image reduction instruction from the delivery data generation unit 111, the data processing unit 110 reduces the temporarily stored content data in size, and temporarily stores the content data which has been reduced in size (step S765). After this, the delivery data generation unit 111 performs step S770.

The delivery data generation unit 111 judges whether or not E is no more than 1 (step S775).

When judging that E is no more than 1 (step S775: "YES"), the delivery data generation unit 111 acquires delivery destination information included in other terminal information corresponding to the acquired other terminal ID, and generates delivery time generation data using the values A, B, C, D, E, and F, the selected content ID, the other terminal ID, and the acquired delivery destination information (step S790).

The delivery data generation unit 111 outputs a data generation completion instruction to the data processing unit 110. Upon receiving the data generation completion instruction from the delivery data generation unit 111, the data processing unit 110 outputs the temporarily stored content data to the delivery processing unit 118 (step S795).

The delivery data generation unit 111 outputs the generated delivery time generation data and a delivery instruction to the delivery processing unit 118 (step S800).

The delivery processing unit 118 receives the content data from the data processing unit 110, and the delivery time generation data and the delivery instruction from the delivery data generation unit 111. The delivery processing unit 118 acquires a name included in other terminal information corresponding to the terminal ID included in the received delivery time generation data (step S805).

The delivery processing unit 118 has the display unit 102 display the delivery time confirmation screen 258 including the received content data and delivery time generation data and the acquired name (step S810). The input unit 101 receives a button (step S815).

When the send button 268 is selected (step S820: "send"), the delivery processing unit 118 receives a delivery execution instruction from the input unit 101, and sends the content data and the delivery time generation data based on delivery destination information (step S825).

Following this, the delivery processing unit 118 outputs a next data generation instruction to the delivery data generation unit 111. Upon receiving the next data generation instruction from the delivery processing unit 118, the delivery data generation unit 111 judges whether or not any of the one or more other terminal IDs received from the delivery destination selection unit 116 has not been acquired yet (step S830). When judging that any of the one or more other terminal IDs has not been acquired yet (step S830: "YES"), the delivery data generation unit 111 acquires one unacquired other terminal ID from the one or more other terminal IDs (step S835), and returns to step S660. Otherwise (step S830: "NO"), the delivery data generation unit 111 outputs a processing end instruction to the control unit 120, and ends the operation of the sending process.

When the cancel button 269 is selected (step S820: "cancel"), the delivery processing unit 118 receives a delivery cancel instruction from the input unit 101, outputs a next data generation instruction to the delivery data generation unit 111, and moves to step S830.

When judging that E is more than 1 (step S775: "NO"), the delivery data generation unit 111 sets E to "99" (step S780). The delivery data generation unit 111 then outputs a saving prohibition setting instruction to the data processing unit 110. Upon receiving the saving prohibition setting instruction from the delivery data generation unit 111, the data processing unit 110 sets the temporarily stored content data as unsavable, and temporarily stores the content data which has been set as unsavable (step S785). After this, the delivery data generation unit 111 performs step S790 onward.

(8) Modification Example of the Sending Process

In the sending process shown in FIGS. 23 to 26, the delivery trustability threshold value and the trustability are compared with each other in step S690, and A is calculated in step S695 or set to "99" in step S700 based on a result of the comparison. However, the present invention is not limited to this.

After calculating A, a judgment as to whether or not to set A to "99" may be performed based on the calculated A.

Figure 27:
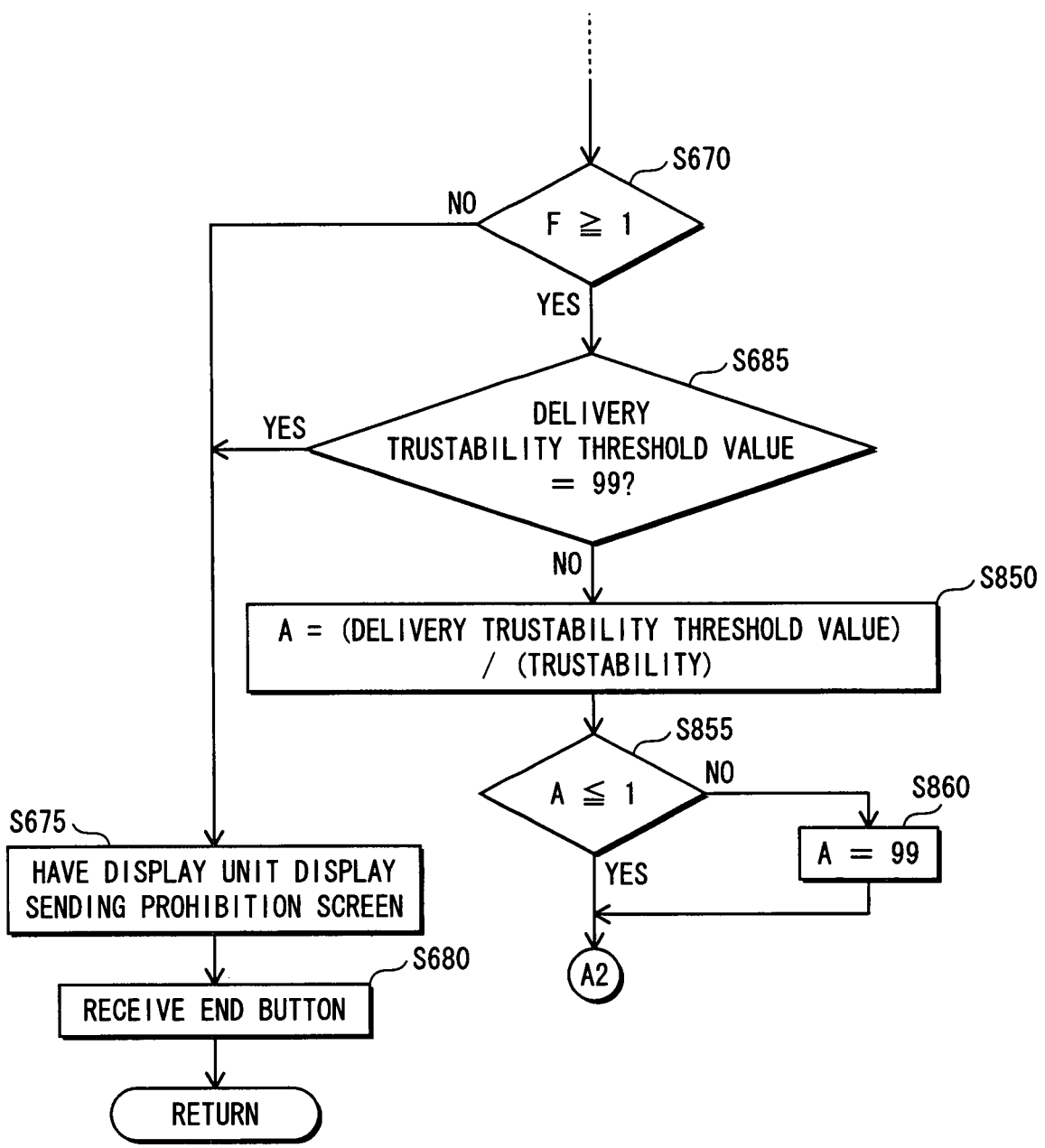
FIG. 27 is a flowchart showing a modification example of the sending process.

The following describes this operation with reference to a flowchart shown in FIG. 27.

When judging that the delivery trustability threshold value is "99" after executing step S685 (step S685: "YES"), the delivery data generation unit 111 has the display unit 102 display the sending prohibition screen 252 (step S675). The input unit 101 receives the end button 253 (step S680). When the input unit 101 receives the end button 253, the delivery data generation unit 111 outputs a processing end instruction to the control unit 120, and ends the operation of the sending process.

When judging that the delivery trustability threshold value is not "99" (step S685: "NO"), the delivery data generation unit 111 calculates A (=(delivery trustability threshold value)/(trustability)) (step S850), and judges whether or not A is no more than 1 (step S855).

When judging that A is no more than 1 (step S855: "YES"), step S705 onward is performed.

When judging that A is more than 1 (step S855: "NO"), the delivery data generation unit 111 sets A to "99" (step S860). After this, step S705 onward is performed.

<1.4 Specific Example of Delivery Time Generation Data>

Consider a case where the portable terminal 10 delivers the content data whose content ID is "1000-400", based on the network diagram shown in FIG. 1. Specific examples of threshold values included in delivery time generation data or saving time generation data generated for the user terminals 21 to 24 and 31 to 37 are shown in a table T100 shown in FIG. 28.

Here, the portable terminal 22 stores trustability "0.9", "0.8", and "0.5" respectively for the PC terminal 31, the portable terminal 32, and the PC terminal 33. The portable terminal 23 stores trustability "0.5", "0.6", and "0.6" respectively for the portable terminal 34, the PC terminal 35, and the PC terminal 36. The PC terminal 24 stores trustability "0.2" for the portable terminal 37.

As one example, the portable terminal 10 stores the trustability "0.1" of the portable terminal 21. In this case, each value (A, B, C, D, and E) calculated using each threshold value included in the content threshold value data 147 corresponding to the content ID "1000-400" and the trustability "0.1" is "99", and so each threshold value included in delivery time generation data is "99".

The PC terminal 24 acquires the content data whose content ID is "1000-400" via the memory card 50 as described above. Therefore, each threshold value included in saving time generation data for the PC terminal 24 is the same as each threshold value included in the content threshold value data.

Figure 29:
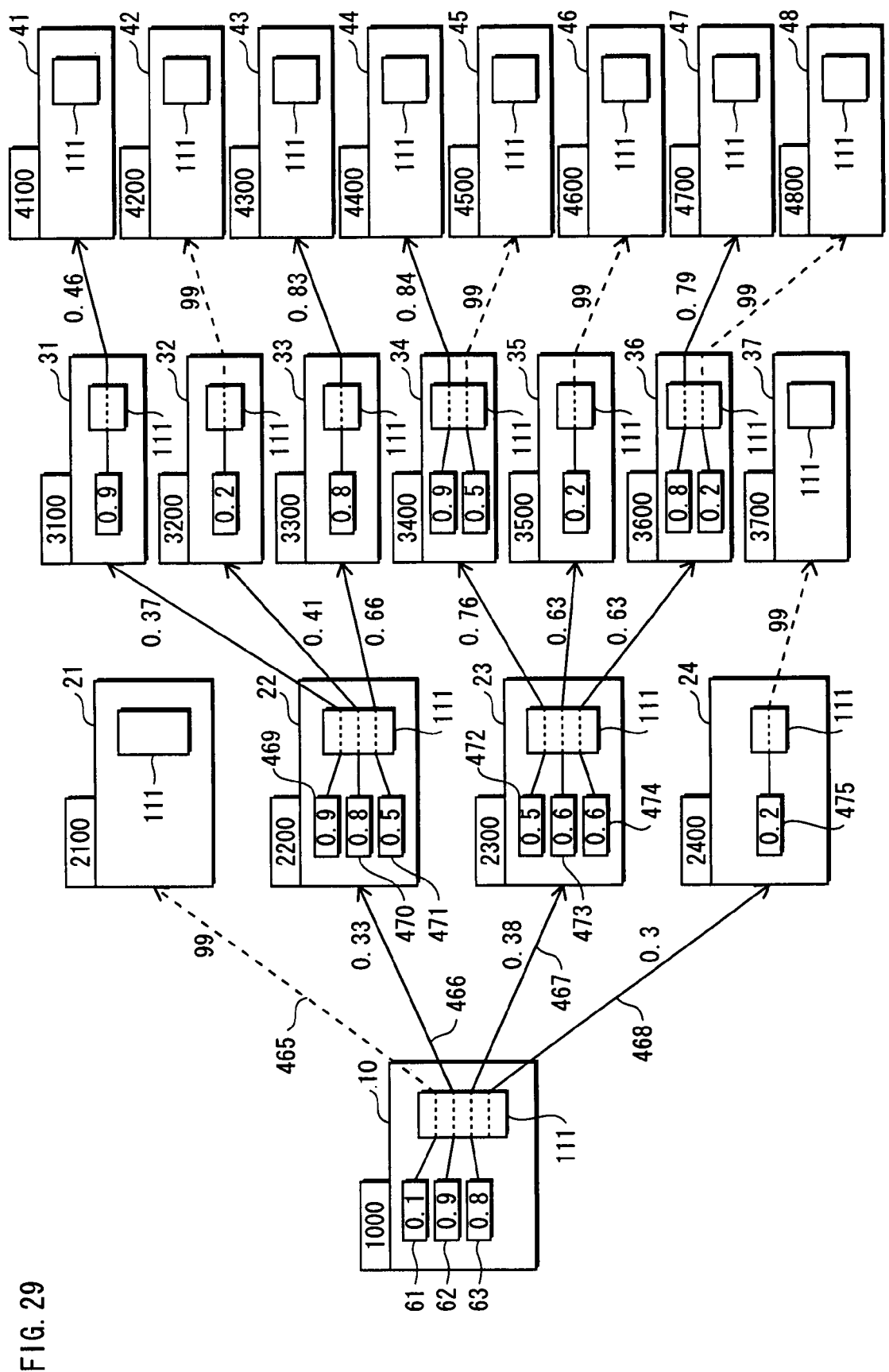
FIG. 29 shows a change of a delivery trustability threshold value.

FIG. 29 shows a change in delivery trustability threshold value for the content data whose content ID is "1000-400". Note here that the user terminals other than the portable terminal 10 include the delivery data generation unit 111 included in the portable terminal 10, and stores trustability of a delivery destination user terminal. A construction of the other user terminals will be described later.

As one example, the portable terminal 10 stores trustability "0.1" of the portable terminal 21. In this case, A calculated using each threshold value included in the content threshold value data 147 corresponding to the content ID "1000-400" and the trustability "0.1" is "99". Accordingly, when the content data whose content ID is "1000-400" is delivered to the portable terminal 21, "99" is delivered as the secondary delivery trustability threshold value. The portable terminal 21 sets this secondary delivery trustability threshold value "99" in the content threshold value data 147 corresponding to the content ID "1000-400", as a delivery trustability threshold value. As a result, the portable terminal 21 cannot deliver the content data whose content ID is "1000-400" to an other user terminal.

It can be understood from FIG. 29 that the delivery trustability threshold value increases when the content data is delivered via the network. Accordingly, if the delivery via the network is repeated, the delivery trustability threshold value will eventually be set to "99". This makes it possible to prevent an unlimited repetition of the secondary delivery of the content data.

Figure 30:
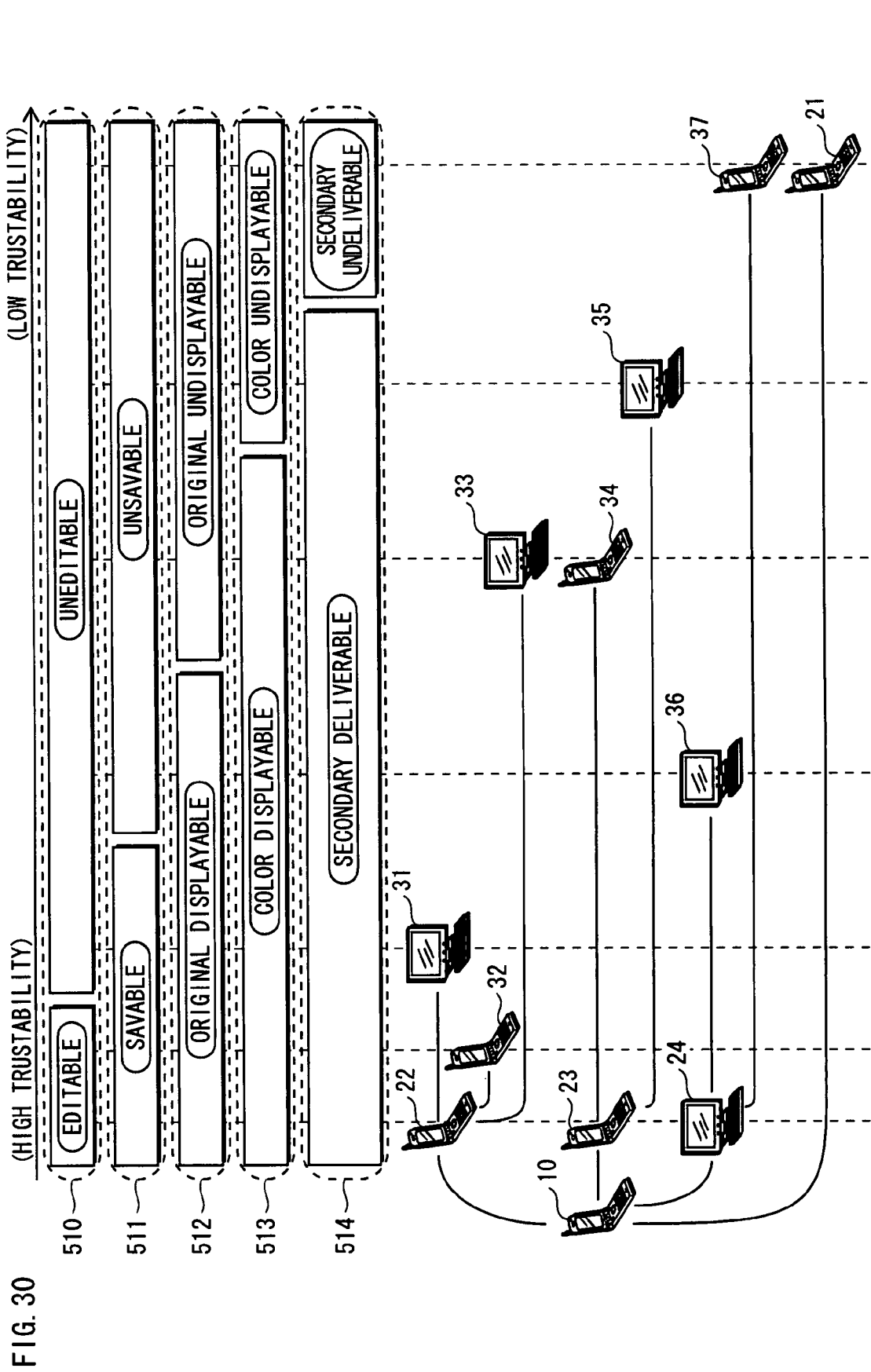
FIG. 30 shows relations between user terminals and settings of delivered content data.

FIG. 30 shows, when the content data whose content ID is "1000-400" is delivered, a relationship between user terminals and settings of the delivered content data.

For instance, when the content data whose content ID is "1000-400" is delivered to the PC terminal 36, it is possible to perform secondary delivery, color display, and original image display of the delivered content data, but it is impossible to save or edit the delivered content data.

Meanwhile, all items are set to be prohibited in the case of the portable terminal 37. That is, each threshold value included in the content threshold value data is set to "99".

<1.5 Construction of the Portable Terminal 22>

A construction of the portable terminal 22 is described below.

The portable terminal 22 differs from the portable terminal 10 in that it does not include a camera and a memory card.

Figure 31:
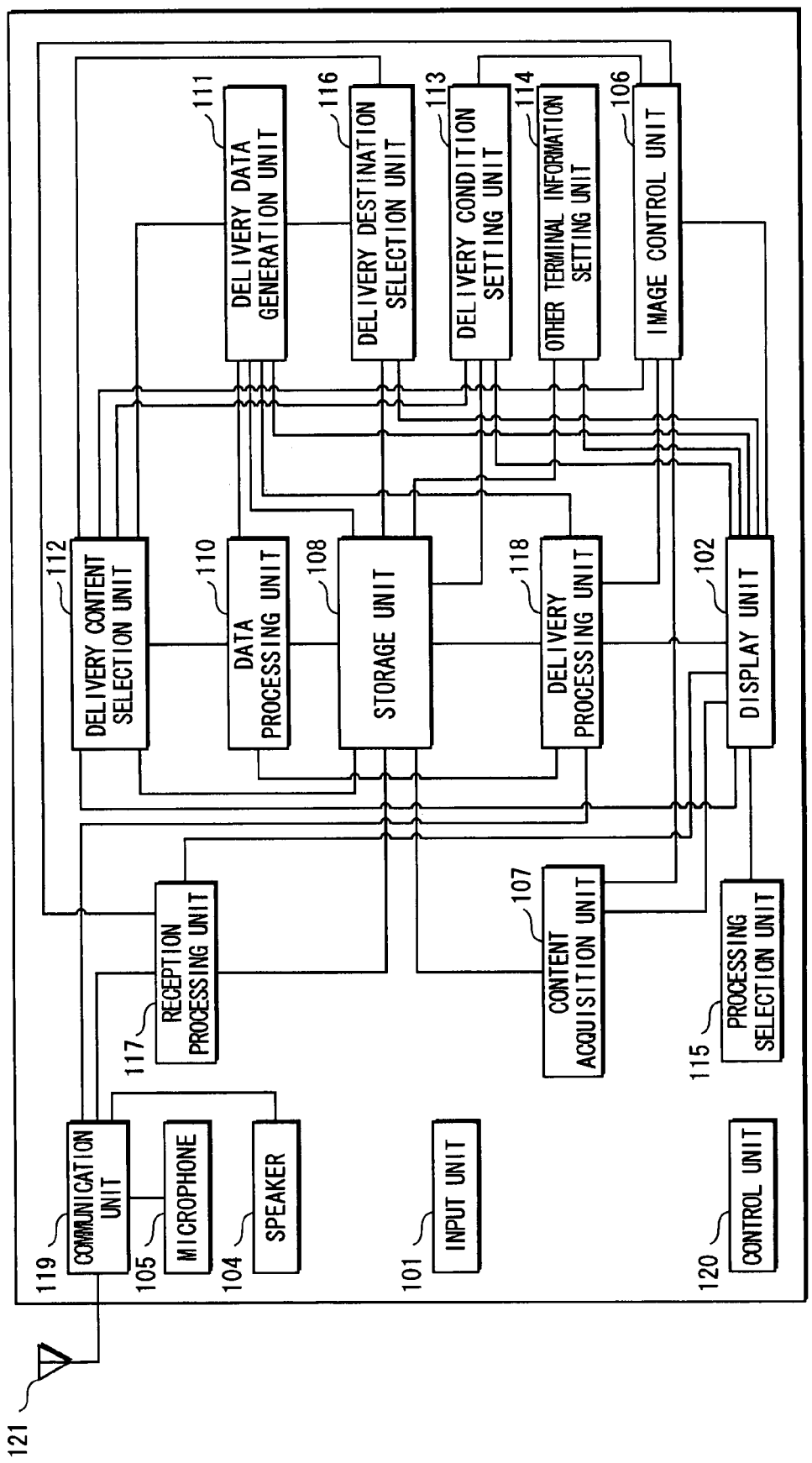
FIG. 31 is a block diagram showing a construction of a portable terminal 22.

FIG. 31 shows construction elements of the portable terminal 22, using the reference signs of the construction elements of the portable terminal 10.

As shown in FIG. 31, the portable terminal 22 includes the input unit 101, the display unit 102, the speaker 104, the microphone 105, the image control unit 106, the content acquisition unit 107, the storage unit 108, the data processing unit 110, the delivery data generation unit 111, the delivery content selection unit 112, the delivery condition setting unit 113, the other terminal information setting unit 114, the processing selection unit 115, the delivery destination selection unit 116, the reception processing unit 117, the delivery processing unit 118, the communication unit 119, the control unit 120, and the antenna 121.

The portable terminal 22 is actually realized by a computer system that includes a microprocessor, a ROM, a RAM, a hard disk unit, a display unit, a keyboard, and the like. A computer program is stored on the RAM or the hard disk unit. Functions of the portable terminal 22 are realized by the microprocessor operating in accordance with this computer program. The computer program is structured by combining a plurality of instruction codes showing commands to a computer, in order to achieve predetermined functions.

Note here that connecting lines between each of the control unit 120 and the input unit 101 and the other construction elements are omitted for simplicity's sake.

Each construction element has already been explained with regard to the construction of the portable terminal 10, and so their explanation has been omitted here. Since the portable terminal 22 does not have a camera and a memory card, the generation by camera and the memory card reading cannot be performed when generating content data. Also, the portable terminal 22 cannot save stored content data to a memory card.

Construction elements of the other portable terminals 21, 23, 32, 34, 43, 45, and 48 are the same as any of the construction elements of the portable terminal 10 and the construction elements of the portable terminal 22, and so their explanation has been omitted here.

<1.6 PC Terminal 24>

A construction of the PC terminal 24 is described below.

The PC terminal 24 differs from the portable terminal 10 in that it does not include an antenna, and in the operations of the delivery content selection unit and the communication unit.

Figure 32:
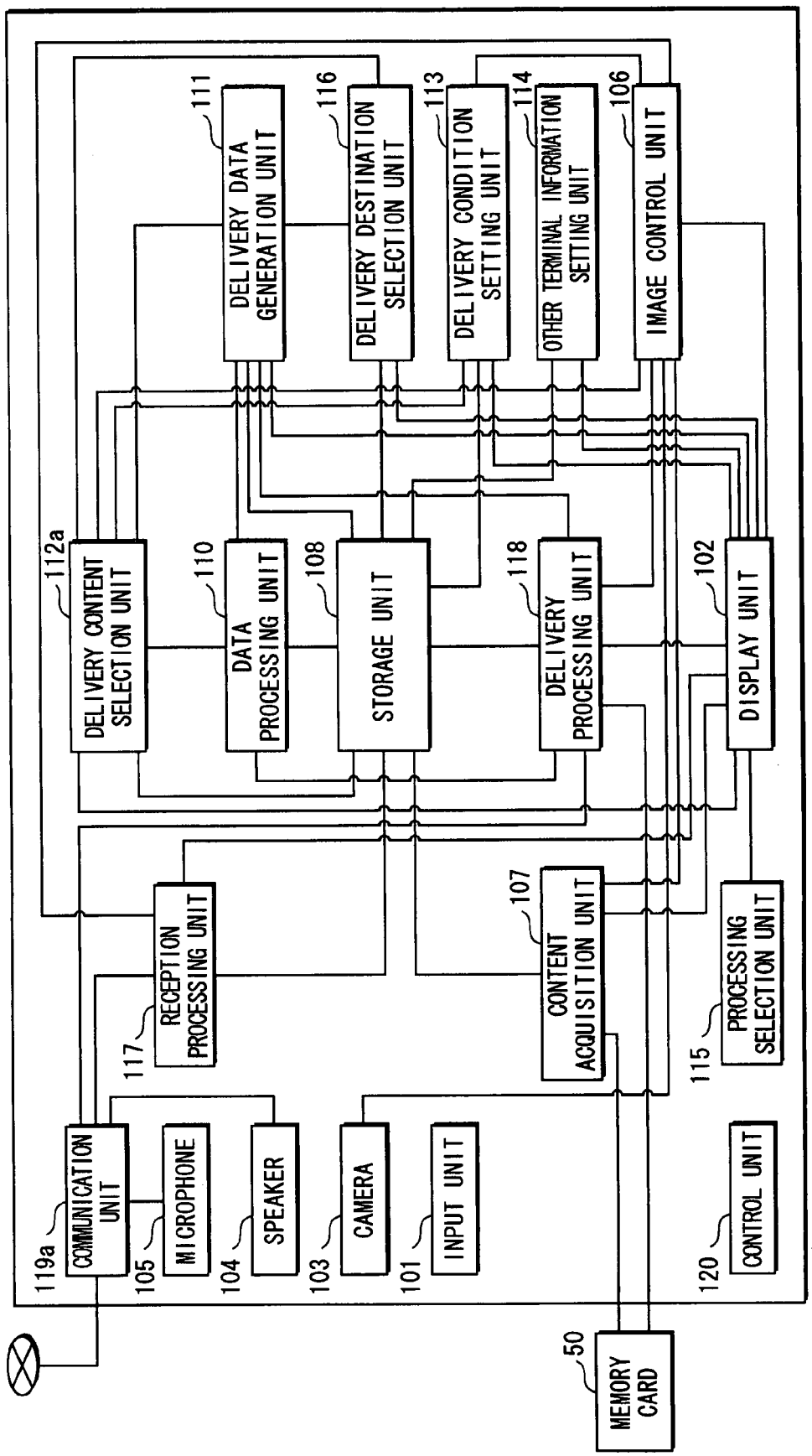
FIG. 32 is a block diagram showing a construction of a PC terminal 24.

FIG. 32 shows construction elements of the PC terminal 24, using the reference signs of the construction elements of the portable terminal 10.

The PC terminal 24 includes the input unit 101, the display unit 102, the camera 103, the speaker 104, the microphone 105, the image control unit 106, the content acquisition unit 107, the storage unit 108, the data processing unit 110, the delivery data generation unit 111, a delivery content selection unit 112a, the delivery condition setting unit 113, the other terminal information setting unit 114, the processing selection unit 115, the delivery destination selection unit 116, the reception processing unit 117, the delivery processing unit 118, a communication unit 119a, the control unit 120, and the memory card 50.

The PC terminal 24 is actually realized by a computer system that includes a microprocessor, a ROM, a RAM, a hard disk unit, a display unit, a keyboard, a mouse, and the like. A computer program is stored on the RAM or the hard disk unit. Functions of the PC terminal 24 are realized by the microprocessor operating in accordance with this computer program. The computer program is structured by combining a plurality of instruction codes showing commands to a computer, in order to achieve predetermined functions.

Note here that connecting lines between each of the control unit 120 and the input unit 101 and the other construction elements are omitted for simplicity's sake.

An explanation of the construction elements which are the same as those in the portable terminal 10 has been omitted here.

Suppose the storage unit 108 stores content data corresponding to each of content IDs "2400-100", "3700-100", "2400-200", and "1000-400", and a delivery trustability threshold value included in content threshold value data corresponding to each of the content IDs "3700-100" and "2400-200" is set to "0.99".

(1) Delivery Content Selection Unit 112a

The following mainly describes the difference from the delivery content selection unit 112.

The difference from the delivery content selection unit 112 lies in the content selection screen displayed on the display unit 102.

Figure 33:
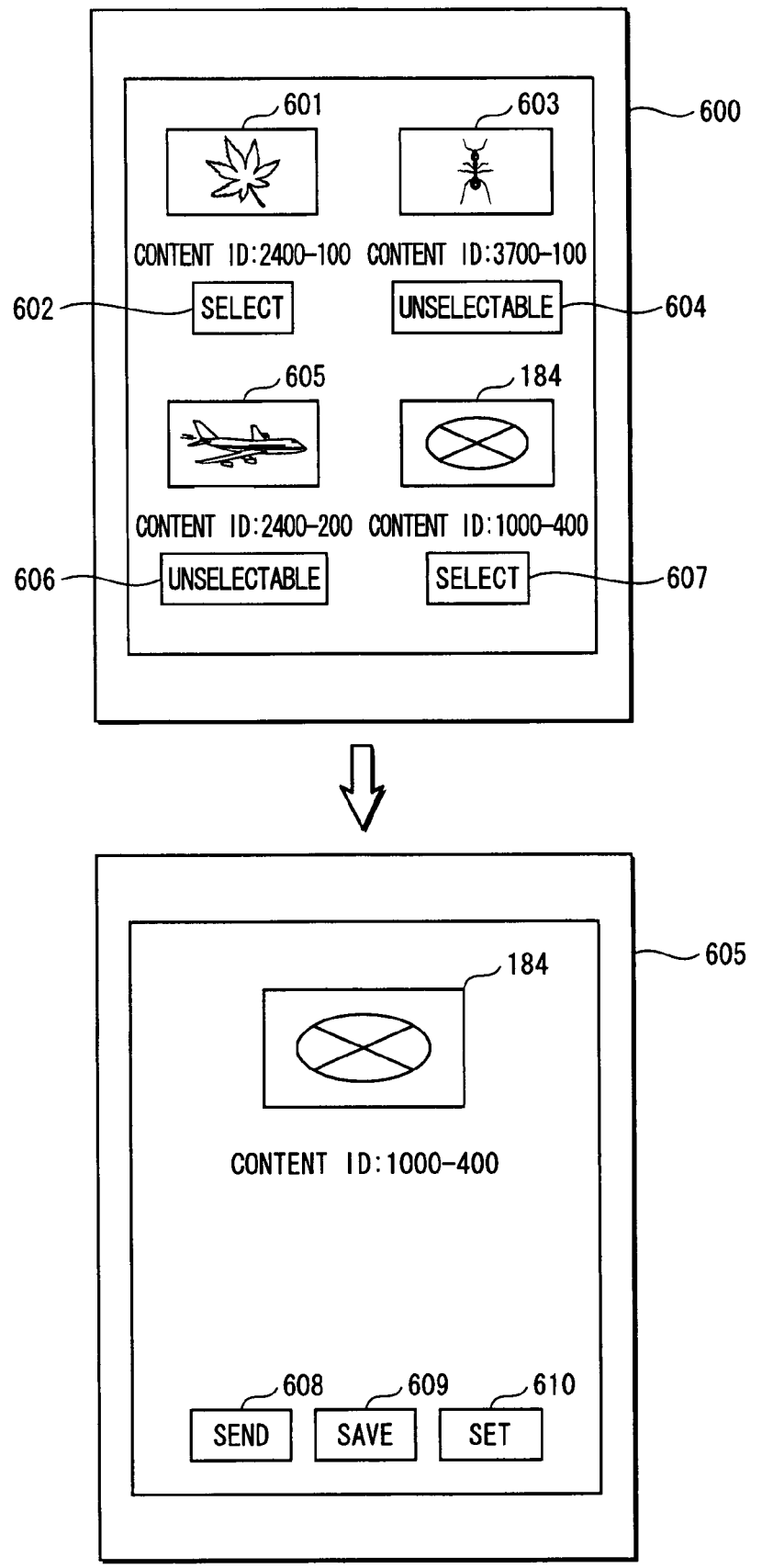
FIG. 33 shows one example of a content selection screen 600 and a sending/saving/setting selection screen 605.

The delivery content selection unit 112a has the display unit 102 display a content selection screen 600 shown in FIG. 33.

The content selection screen 600 includes a predetermined number of combinations of content data, content ID, and select button or selection prohibition display. The select button is displayed when a delivery trustability threshold value of the displayed content data is in a range of 0 to 1. The selection prohibition display is displayed when the delivery trustability threshold value of the displayed content data is 99. Since the delivery trustability threshold value included in the content threshold value data corresponding to each of the content IDs "3700-100" and "2400-200" is set to "99", the corresponding content data is displayed as unselectable.

When one set of content data is selected on the content selection screen 600, the delivery content selection unit 112a has the display unit 102 display a sending/saving/setting selection screen 605 including the selected content data and its content ID. The sending/saving/setting selection screen 605 is the same as the sending/saving/setting selection screen 219 displayed in the portable terminal 10, and so its explanation has been omitted here.

The subsequent operation is the same as that of the delivery content selection unit 112, and so its explanation has been omitted here.

(2) Communication Unit 119a

The communication unit 119a communicates with other user terminals via a network (e.g. an internet).

<2. Second Embodiment>
<2.1 Overview of an Information Distribution System 2>

The following describes the information distribution system 2 (not illustrated), mainly focusing on the difference from the information distribution system 1.

The information distribution system 2 has the same construction as the information distribution system 1.

In the information distribution system 1, when delivering content data, the delivery source user terminal calculates threshold values relating to secondary delivery, and sends the content data and the calculated threshold values to the delivery destination user terminal. In the information distribution system 2, on the other hand, the delivery destination user terminal calculates threshold values relating to secondary delivery.

This is the difference between the information distribution system 2 and the information distribution system 1.

The following describes a construction and operation of a portable terminal 22b as a representative user terminal in the information distribution system 2.

Since other user terminals in the information distribution system 2 have the same construction elements as the portable terminal 22b, their explanation has been omitted here.

<2.2 Construction of the Portable Terminal 22b>

The following describes the portable terminal 22b, mainly focusing on the difference from the portable terminal 10 in the first embodiment.

Figure 34:
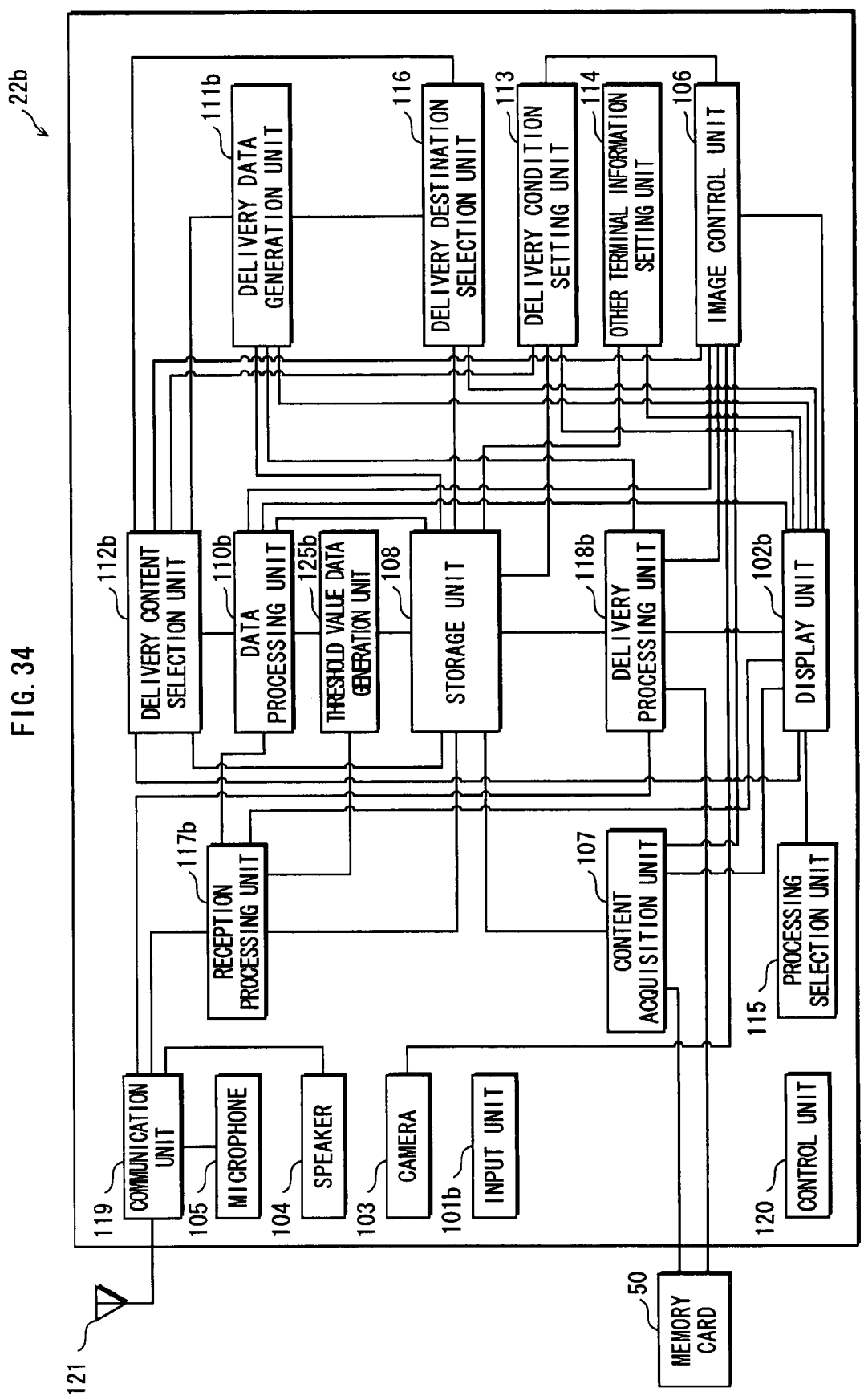
FIG. 34 is a block diagram showing a construction of a portable terminal 22b.

FIG. 34 shows construction elements of the portable terminal 22b, using the reference signs of the construction elements of the portable terminal 10.

The portable terminal 22b includes an input unit 101b, a display unit 102b, the camera 103, the speaker 104, the microphone 105, the image control unit 106, the content acquisition unit 107, the storage unit 108, a data processing unit 110b, a delivery data generation unit 111b, a delivery content selection unit 112b, the delivery condition setting unit 113, the other terminal information setting unit 114, the processing selection unit 115, the delivery destination selection unit 116, a reception processing unit 117b, a delivery processing unit 118b, the communication unit 119, the control unit 120, a threshold value data generation unit 125b, the antenna 121, and the memory card 50.

The portable terminal 22b is actually realized by a computer system that includes a microprocessor, a ROM, a RAM, a hard disk unit, a display unit, a keyboard, and the like. A computer program is stored on the RAM or the hard disk unit. Functions of the portable terminal 22b are realized by the microprocessor operating in accordance with this computer program. The computer program is structured by combining a plurality of instruction codes showing commands to a computer, in order to achieve predetermined functions.

Note here that connecting lines between each of the control unit 120 and the input unit 101b and the other construction elements are omitted for simplicity's sake.

The input unit 101b, the display unit 102b, the data processing unit 101b, the delivery data generation unit 111b, the delivery content selection unit 112b, the reception processing unit 117b, the delivery processing unit 118b, and the threshold value data generation unit 125b, which are the difference from the portable terminal 10, are described below.

In the following description, the reference signs used in the first embodiment are used according to need.

(1) Reception Processing Unit 117b

Figure 35:
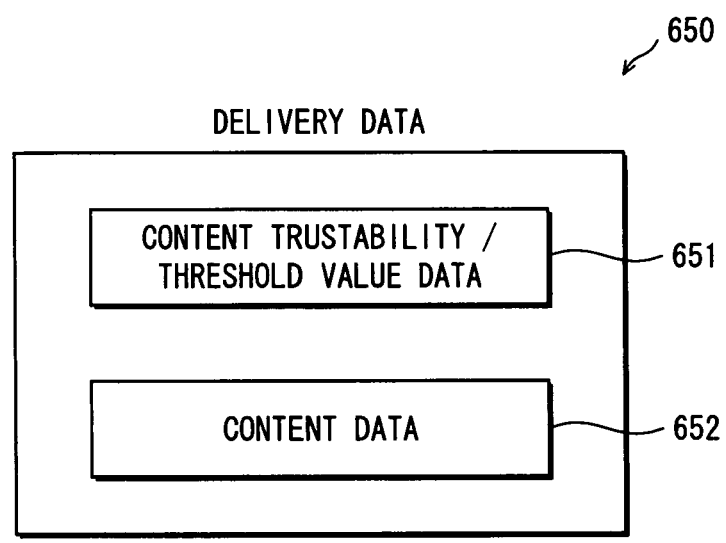
FIG. 35 shows one example of a data structure of delivery data 650.

The reception processing unit 117b receives delivery data 650 made up of content trustability/threshold value data 651 and content data 652 as shown in FIG. 35, from an other user terminal via the communication unit 119.

The reception processing unit 117b divides the received delivery data 650 into the content trustability/threshold value data 651 and the content data 652, and outputs the content trustability/threshold value data 651 to the threshold value data generation unit 125b. The reception processing unit 117b outputs the content data 652 and a content ID included in the content trustability/threshold value data 651 to the data processing unit 110b.

FIG. 36 shows one example of the content trustability/threshold value data 651.

As shown in FIG. 36, the content trustability/threshold value data 651 is composed of a content ID, a delivery trustability threshold value, a saving trustability threshold value, an original image display trustability threshold value, an editing trustability threshold value, a color display trustability threshold value, trustability, and a number of deliverable generations.

The content ID is an identifier corresponding to the received content data.

The delivery trustability threshold value, the saving trustability threshold value, the original image display trustability threshold value, the editing trustability threshold value, the color display trustability threshold value, and the number of deliverable generations are the same as those included in the content threshold value data in the first embodiment, so that their explanation has been omitted here.

The trustability is a value indicating a degree of trust in the portable terminal 22b itself, the value being stored in the user terminal that delivers the content data to the portable terminal 22b.

For example, the content trustability/threshold value data 653 shown in FIG. 36 corresponds to the content ID "1000-400" and shows that the trustability of the portable terminal 22b is "0.9".

(2) Threshold Value Data Generation Unit 125b

The threshold value data generation unit 125b receives the content trustability/threshold value data from the reception processing unit 117b.

The threshold value data generation unit 125b acquires the number of deliverable generations included in the content trustability/threshold value data, and calculates a value F (=(number of deliverable generations)−1) using the acquired number of deliverable generations. The threshold value data generation unit 125b judges whether or not F is no less than 1.

When judging that F is less than 1, the threshold value data generation unit 125b outputs a display prohibition instruction to prohibit from displaying the content data, to the data processing unit 110b.

When judging that F is no less than 1, the threshold value data generation unit 125b calculates a value A (=(delivery trustability threshold value)/(trustability)) using the delivery trustability threshold value and the trustability included in the content trustability/threshold value data, and judges whether or not A is no more than 1.

When judging that A is more than 1, the threshold value data generation unit 125b sets A to "99". When judging that A is no more than 1, the threshold value data generation unit 125b does not change A.

Furthermore, the threshold value data generation unit 125b calculates a value B (=(color display trustability threshold value)/(trustability)) using the color display trustability threshold value and the trustability, and judges whether or not B is no more than 1.

When judging that B is more than 1, the threshold value data generation unit 125b sets B to "99", and outputs a binary image processing instruction to the data processing unit 110b.

When judging that B is no more than 1, the threshold value data generation unit 125b calculates a value C (=(editing trustability threshold value)/(trustability)) using the editing trustability threshold value and the trustability, and judges whether or not C is no more than 1.

When judging that C is more than 1, the threshold value data generation unit 125b sets C to "99", and outputs an editing prohibition setting instruction to the data processing unit 110b.

When judging that C is no more than 1, the threshold value data generation unit 125b calculates a value D (=(original image display trustability threshold value)/(trustability)) using the original image display trustability threshold value and the trustability, and judges whether or not D is no more than 1.

When judging that D is more than 1, the threshold value data generation unit 125b sets D to "99", and outputs an image reduction instruction to the data processing unit 110b.

When judging that D is no more than 1, the threshold value data generation unit 125b calculates a value E (=(saving trustability threshold value)/(trustability)) using the saving trustability threshold value and the trustability, and judges whether or not E is no more than 1.

When judging that E is more than 1, the threshold value data generation unit 125b sets E to "99", and outputs a saving prohibition setting instruction to the data processing unit 110b.

When judging that E is no more than 1, the threshold value data generation unit 125b generates content threshold value data using the calculated values (A, B, C, D, E, and F) and the content ID included in the content trustability/threshold value data. This content threshold value data has already been described in the first embodiment, and so its explanation has been omitted here.

The threshold value data generation unit 125b outputs a threshold value data generation completion instruction indicating that the content threshold value data generation is completed, to the data processing unit 110b.

Upon receiving a write instruction to write the content threshold value data from the data processing unit 110b, the threshold value data generation unit 125b writes the generated content threshold value data to the content threshold value data table 139 in the storage unit 108.

Upon receiving an abandon instruction to abandon the content threshold value data from the data processing unit 110b, the threshold value data generation unit 125b abandons the generated content threshold value data.

For example, content threshold value data 661 shown in FIG. 37 is generated using each value in the content trustability/threshold value data 653 shown in FIG. 36.

(3) Data Processing Unit 110b

The data processing unit 110b, upon receiving content data and a content ID from the reception processing unit 117b, temporarily stores the received content data and content ID.

Upon receiving a display prohibition instruction from the threshold value data generation unit 125b, the data processing unit 110b has the display unit 102b display a content display prohibition screen 655.

Figure 38:
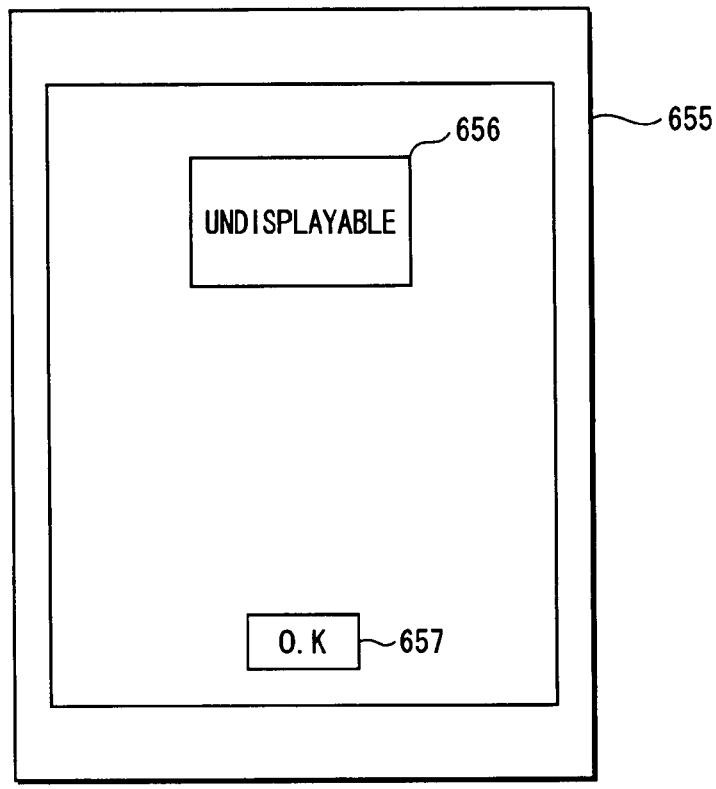
FIG. 38 shows one example of a content display prohibition screen 655.

As shown in FIG. 38, the content display prohibition screen 655 is made up of a message "undisplayable" 656 indicating that the content data cannot be displayed, and an OK button 657. The OK button 657 is selected when ending the display of the content display prohibition screen 655.

Upon receiving the selection of the OK button 657 on the content display prohibition screen 655 via the input unit 101b, the data processing unit 110b has the display unit 102b end the display of the content display prohibition screen 655, deletes the content data and content ID received from the reception processing unit 117b, and outputs an abandon instruction to the threshold value data generation unit 125b.

Upon receiving a binary image processing instruction from the threshold value data generation unit 125b, the data processing unit 110b performs binary image processing on the temporarily stored content data, and temporarily stores the content data on which the binary image processing has been performed.

Upon receiving an editing prohibition setting instruction from the threshold value data generation-unit 125b, the data processing unit 110b sets the temporarily stored content data as uneditable, and temporarily stores the content data which has been set as uneditable.

Upon receiving an image reduction instruction from the threshold value data generation unit 125b, the data processing unit 110b reduces the temporarily stored content data in size, and temporarily stores the content data which has been reduced in size.

Upon receiving a saving prohibition setting instruction from the threshold value data generation unit 125b, the data processing unit 110b sets the temporarily stored content data as unsavable, and temporarily stores the content data which has been set as unsavable.

Upon receiving a threshold value data generation completion instruction from the threshold value data generation unit 125b, the data processing unit 110b has the display unit 102b display a content display screen 658 including the temporarily stored content data. The content data displayed on the content display screen 658 has been decompressed by the image control unit 106.

Figure 39:
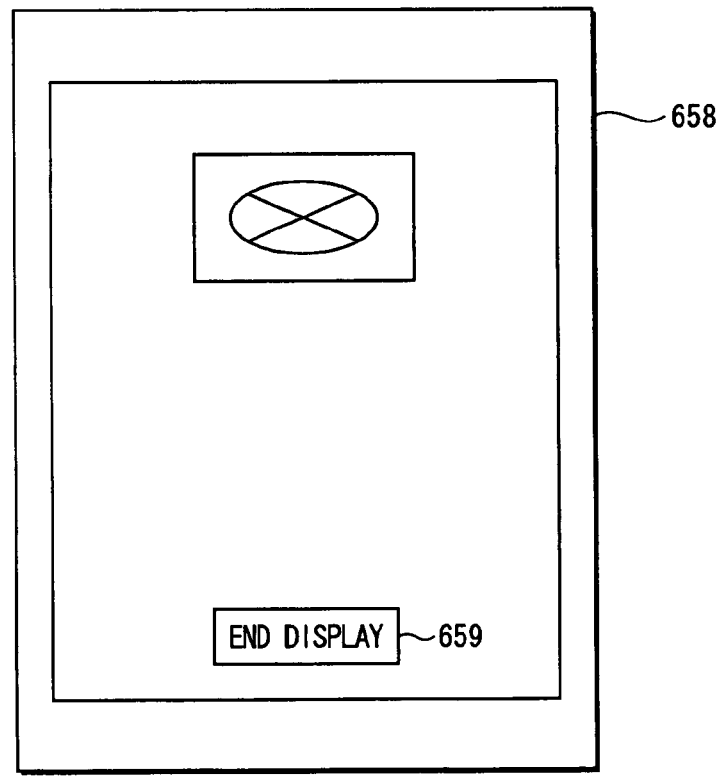
FIG. 39 shows one example of a content display screen 658.

As shown in FIG. 39, the content display screen 658 is composed of the content data and a display end button 659. The display end button 659 is selected when ending the display of the content display screen 658.

Upon receiving the selection of the display end button 659 on the content display screen 658 via the input unit 101b, the data processing unit 110b has the display unit 102b end the display of the content display screen 658. The data processing unit 110b judges whether or not the content data is set to be unsavable.

When judging that the content data is set to be unsavable, the data processing unit 110b deletes the temporarily stored content data and content ID, and outputs an abandon instruction to the threshold value data generation unit 125b.

When judging that the content data is not set to be unsavable, the data processing unit 110b writes the temporarily stored content data and content ID to the content information 132 in the storage unit 108 in correspondence with each other, and outputs a write instruction to the threshold value data generation unit 125b.

(4) Delivery Data Generation Unit 111*b*

The delivery data generation unit 111*b* generates the content trustability/threshold value data and the saving time generation data shown in the first embodiment.

The generation of the saving time generation data is the same as that in the first embodiment, so that its explanation has been omitted here.

The following describes the generation of the content trustability/threshold value data.

Upon receiving a content ID selected by the user from the delivery content selection unit 112, the delivery data generation unit 111*b* acquires content threshold value data corresponding to the received content ID from the content threshold value data table 139 in the storage unit 108.

Upon receiving one or more selected other terminal IDs from the delivery destination selection unit 116, the delivery data generation unit 111*b* acquires one other terminal ID from among the received one or more other terminal IDs.

The delivery data generation unit 111*b* judges whether or not a delivery trustability threshold value included in the read content threshold value data is "99".

When judging that the delivery trustability threshold value is "99", the delivery data generation unit 111*b* has the display unit 102*b* display the sending prohibition screen 252. Upon receiving a display end instruction from the input unit 101*b*, the delivery data generation unit 111*b* outputs a processing end instruction to the control unit 120, and ends the operation.

When judging that the delivery trustability threshold value is not "99", the delivery data generation unit 111*b* acquires trustability included in other terminal information corresponding to the acquired other terminal ID, from the other terminal information table 131.

The delivery data generation unit 111*b* generates content trustability/threshold value data from the acquired trustability and the content threshold value data, and outputs the generated content trustability/threshold value data and the other terminal ID to the delivery processing unit 118*b*.

Upon receiving a next data generation instruction from the delivery processing unit 118*b*, the delivery data generation unit 111*b* judges whether or not any of the one or more other terminal IDs received from the delivery destination selection unit 116 has not been acquired yet. When judging that any of the one or more other terminal IDs has not been acquired yet, the delivery data generation unit 111*b* acquires one unacquired other terminal ID from the one or more other terminal IDs, and performs the above operation. Otherwise, the delivery data generation unit 111*b* outputs a processing end instruction to the control unit 120, and ends the operation of the sending process.

(5) Delivery Processing Unit 118*b*

The delivery processing unit 118*b*, upon receiving content trustability/threshold value data and one other terminal ID from the delivery data generation unit 111*b*, reads content data corresponding to a content ID included in the received content trustability/threshold value data, from the content information 132 in the storage unit 108.

The delivery processing unit 118*b* acquires delivery destination information included in other terminal information corresponding to the received other terminal ID from the other terminal information table 131 in the storage unit 108, and delivers delivery data made up of the read content data and the received content trustability/threshold value data via the communication unit 119, based on the acquired delivery destination information.

After delivering the delivery data, the delivery processing unit 118*b* outputs a next data generation instruction to the delivery data generation unit 111*b*.

Here, the delivery processing unit 118*b* may display the delivery time confirmation screen as with the delivery processing unit 118 in the first embodiment. The display contents of the delivery time confirmation screen here may be the same as those in the first embodiment, or the trustability of the delivery destination user terminal may be added to the display contents in the first embodiment.

(6) Delivery Content Selection Unit 112*b*

The following describes only the difference from the delivery content selection unit 112 in the first embodiment.

The delivery content selection unit 112 in the first embodiment outputs a selected content ID to the data processing unit 110 and the delivery data generation unit 111. On the other hand, the delivery content selection unit 112*b* outputs a selected content ID to the delivery data generation unit 111*b*.

The delivery content selection unit 112*b* differs from the delivery content selection unit 112 in the above point. Other operations of the delivery content selection unit 112*b* are the same as those of the delivery content selection unit 112.

(7) Display Unit 102*b*

The display unit 102*b* performs the following operation in addition to the operations of the display unit 102 in the first embodiment.

The display unit 102*b* displays the content display prohibition screen 655 and the content display screen 6.58 when instructed by the data processing unit 110*b*.

(8) Input Unit 101*b*

The input unit 101*b* performs the following operations in addition to the operations of the input unit 101 in the first embodiment.

When the OK button 657 is selected while the content display prohibition screen 655 is displayed, the input unit 101*b* notifies the data processing unit 110*b* that the OK button 657 is selected.

When the display end button 659 is selected while the content display screen 658 is displayed, the input unit 101*b* notifies the data processing unit 110*b* that the display end button 659 is selected.

<2.3 Operations of the Portable Terminal 22*b*>

The portable terminal 22*b* differs from the portable terminal 10 in the first embodiment in the operation at the time of sending content data and the operation at the time of receiving content data.

The following describes the operation of the sending process and the operation of the reception process in the portable terminal 22*b*.

(1) Operation of the Sending Process

Figure 40:
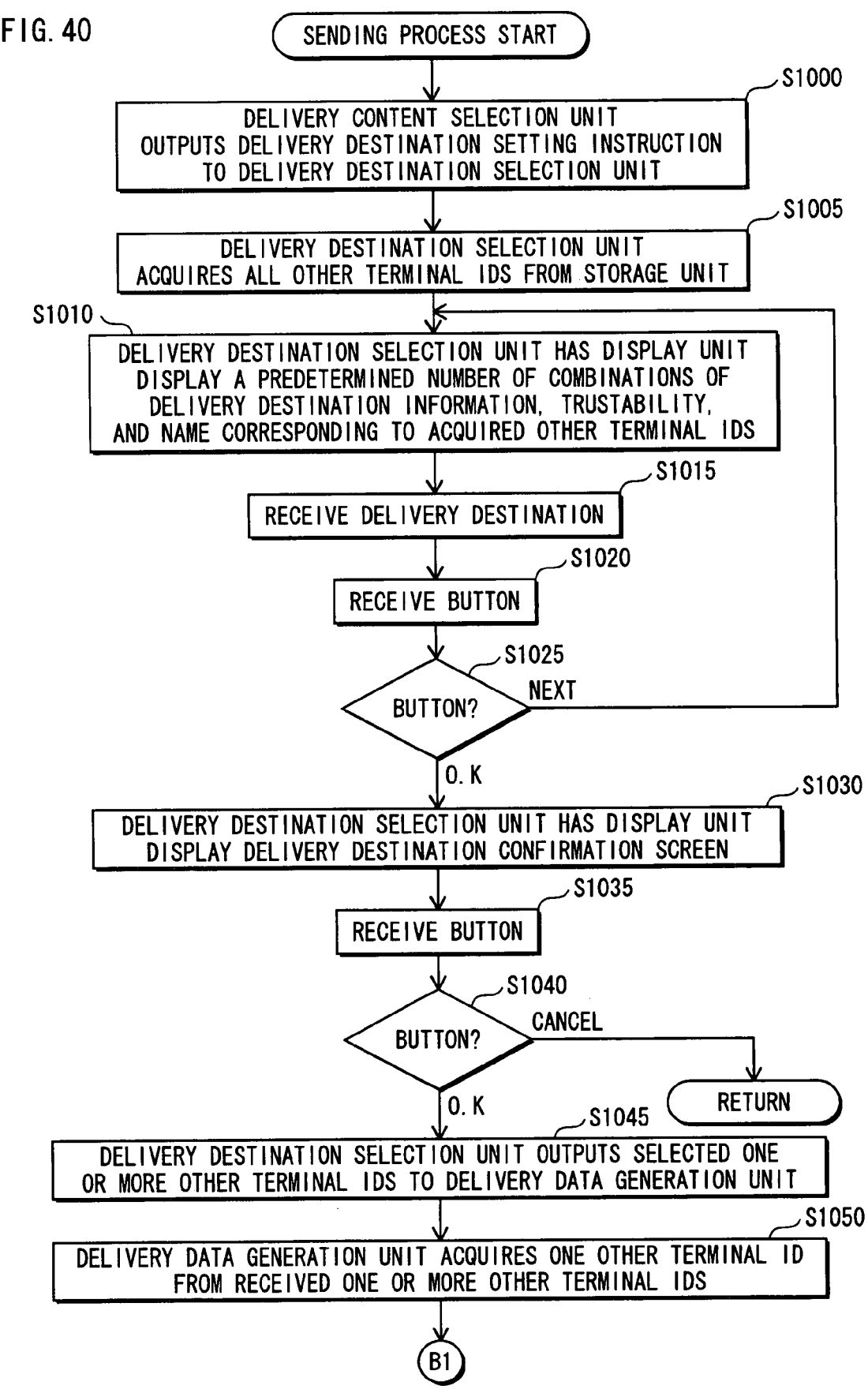
FIG. 40 is a flowchart showing an operation of a sending process, continuing to FIG. 41.
Figure 41:
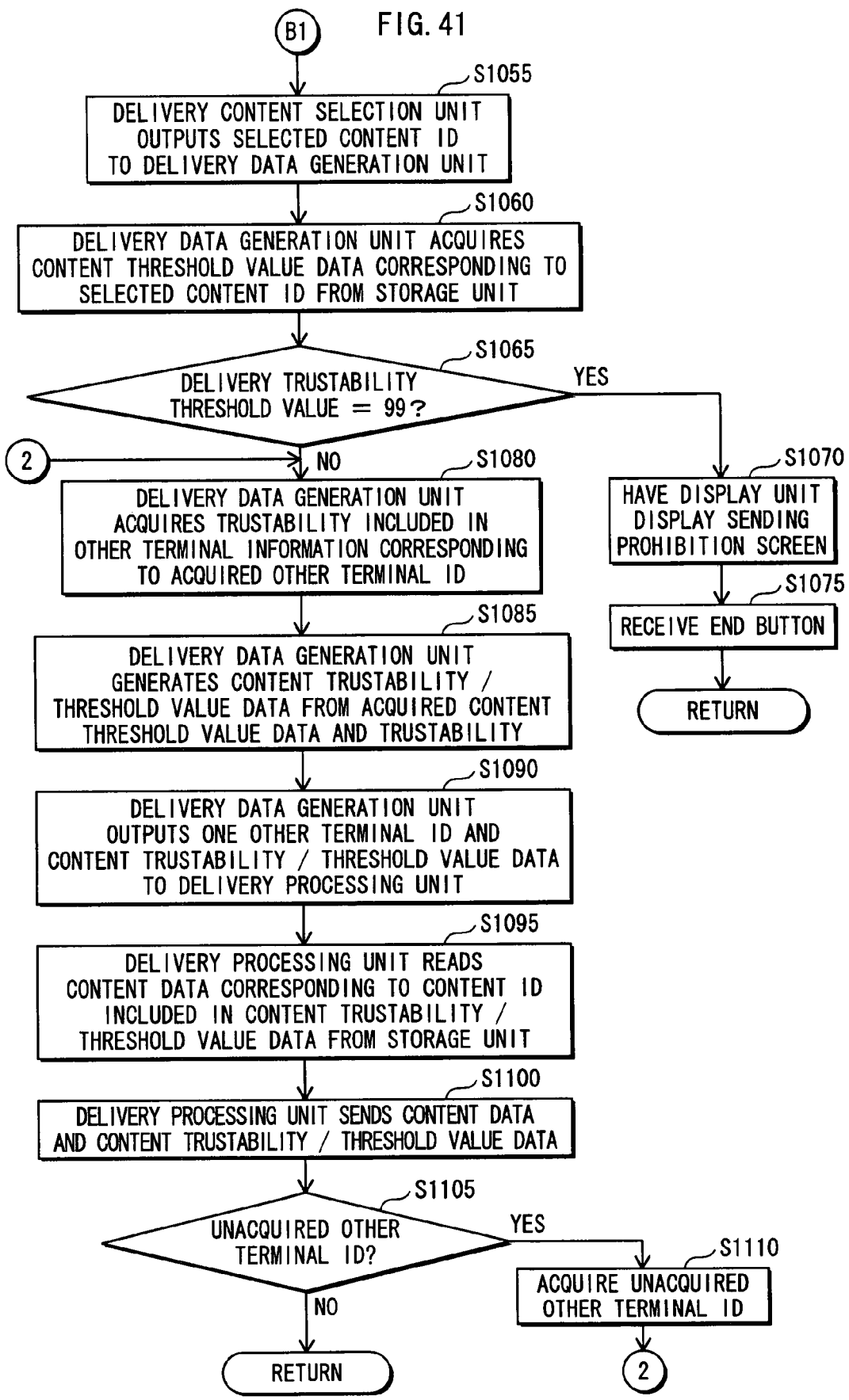
FIG. 41 is a flowchart showing the operation of the sending process, continuing from FIG. 40.

The operation of the sending process is described below, with reference to a flowchart shown in FIGS. 40 and 41.

The delivery content selection unit 112*b* sends a delivery destination setting instruction to the delivery destination selection unit 116 (step S1000).

The delivery destination selection unit 116 acquires all other terminal IDs from the other terminal information table 131 in the storage unit 108 (step S1005). The delivery destination selection unit 116 has the display unit 102*b* display the predetermined number of combinations of delivery destination information, trustability, and name corresponding to the acquired terminal IDs (step S1010).

The delivery destination selection unit 116 receives a delivery destination selected by the user via the input unit 101*b*, and temporarily stores the received delivery destination and its corresponding other terminal ID in the ID storage area (step S1015). The input unit 101*b* receives a button (step S1020).

When the next button 242 is selected (step S1025: "next"), the delivery destination selection unit 116 receives a next display instruction from the input unit 101*b*, returns to step S1010, and has the display unit 102*b* display the predetermined number of combinations of delivery destination information, name, and trustability which have not been displayed yet, using the delivery destination selection screen 240.

When the OK button 241 is selected (step S1025: "OK"), the delivery destination selection unit 116 has the display unit 102*b* display the delivery destination confirmation screen 243 that includes a name included in each of one or more delivery destinations stored in the ID storage area (step S1030). The input unit 101*b* receives a button (step S1035).

When the cancel button 245 is selected (step S1040: "cancel"), the delivery destination selection unit 116 receives a delivery destination cancel instruction from the input unit 101*b*, outputs a processing end instruction to the control unit 120, and ends the sending process.

When the OK button 244 is selected (step S1040: "OK"), the delivery destination selection unit 116 receives a sending destination determination instruction from the input unit 110*b*, and outputs the selected one or more other terminal IDs to the delivery data generation unit 111*b* (step S1045).

The delivery data generation unit 111*b* acquires one other terminal ID from the received one or more other terminal IDs (step S1050).

The delivery content selection unit 112*b* outputs a selected content ID to the delivery data generation unit 111*b* (step S1055).

The delivery data generation unit 111*b* reads content threshold value data corresponding to the selected content ID from the content threshold value data table 139 in the storage unit 108 (step S1060).

The delivery data generation unit 111*b* judges whether or not a delivery trustability threshold value included in the read content threshold value data is "99" (step S1065).

When judging that the delivery trustability threshold value is "99", (step S1065: "YES"), the delivery data generation unit 111*b* has the display unit 102*b* display the sending prohibition screen 252 (step S1070). The input unit 101*b* receives the end button 253 (step S1075). When the input unit 101*b* receives the end button 253, the delivery data generation unit 111*b* outputs a processing end instruction to the control unit 120, and ends the operation of the sending process.

When judging that the delivery trustability threshold value is not "99" (step S1065: "NO"), the delivery data generation unit 111*b* acquires trustability included in other terminal information corresponding to the acquired other terminal ID, from the other terminal information table 131 (step S1080).

The delivery data generation unit 111*b* generates content trustability/threshold value data from the acquired content threshold value data and trustability (step S1085), and outputs the generated content trustability/threshold value data and the acquired other terminal ID to the delivery processing unit 118*b* (step S1090).

The delivery processing unit 118*b* reads content data corresponding to the content ID included in the content trustability/threshold value data received from the delivery data generation unit 11*b*, from the content information 132 in the storage unit 108 (step S1095).

The delivery processing unit 118*b* acquires delivery destination information included in the other terminal information corresponding to the other terminal ID received from the delivery data generation unit 111*b*, from the other terminal information table 131 in the storage unit 108. The delivery processing unit 118*b* sends delivery data made up of the read content data and the received content trustability/threshold value data via the communication unit 119, based on the acquired delivery destination information (step S1100).

Following this, the delivery processing unit 118*b* outputs a next data generation instruction to the delivery data generation unit 111*b*. Upon receiving the next data generation instruction from the delivery processing unit 118*b*, the delivery data generation unit 111*b* judges whether or not any of the one or more other terminal IDs received from the delivery destination selection unit 116 has not been acquired yet (step S1105). When judging that any of the one or more other terminal IDs has not been acquired yet (step S1105: "YES"), the delivery data generation unit 111*b* acquires one unacquired other terminal ID from the one or more other terminal IDs (step S1110), and returns to step S1080. Otherwise (step S1105: "NO"), the delivery data generation unit 111*b* outputs a processing end instruction to the control unit 120, and ends the operation of the sending process.

(2) Operation of the Reception Process

Figure 42:
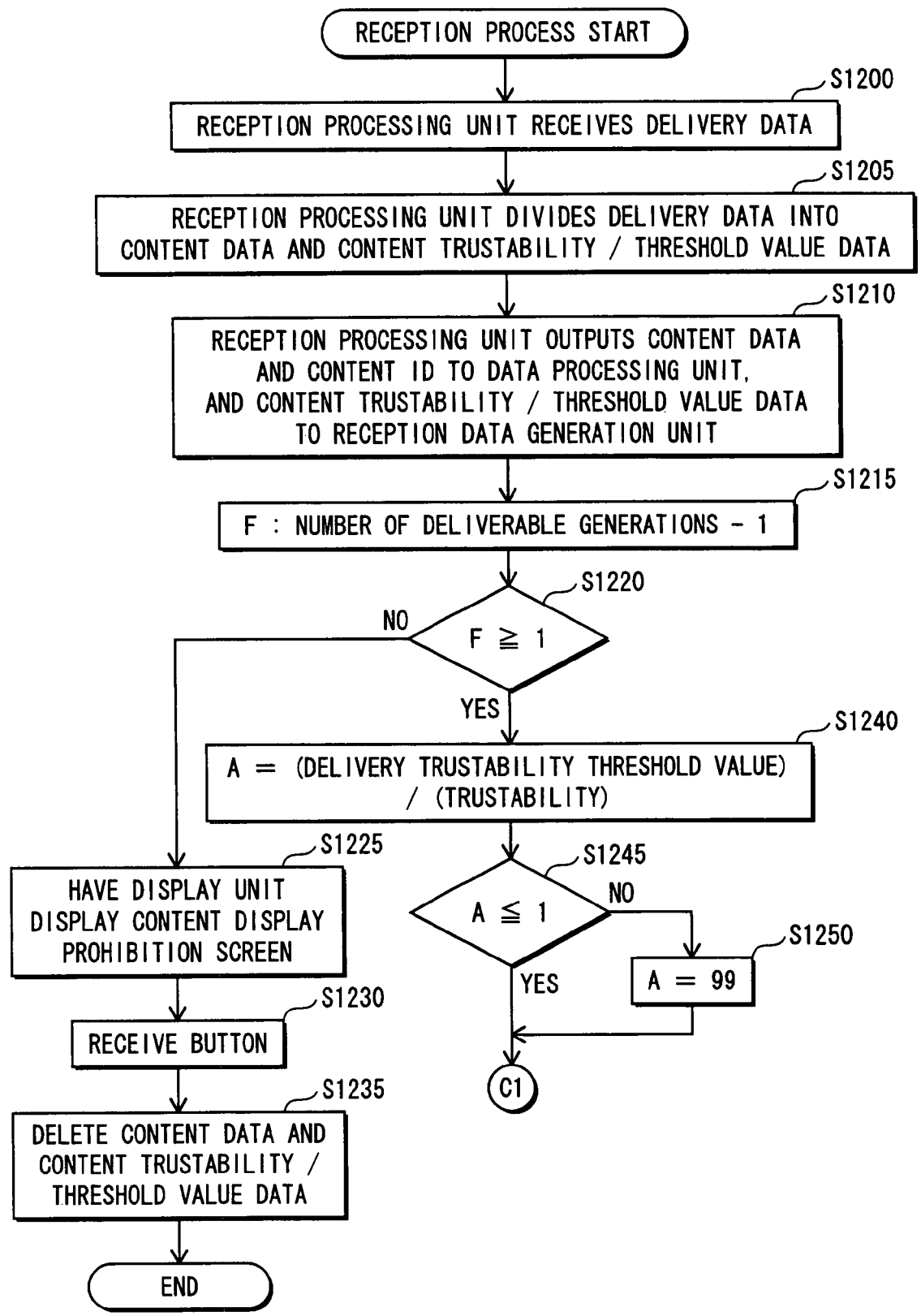
FIG. 42 is a flowchart showing an operation of a reception process, continuing to FIG. 43.
Figure 43:
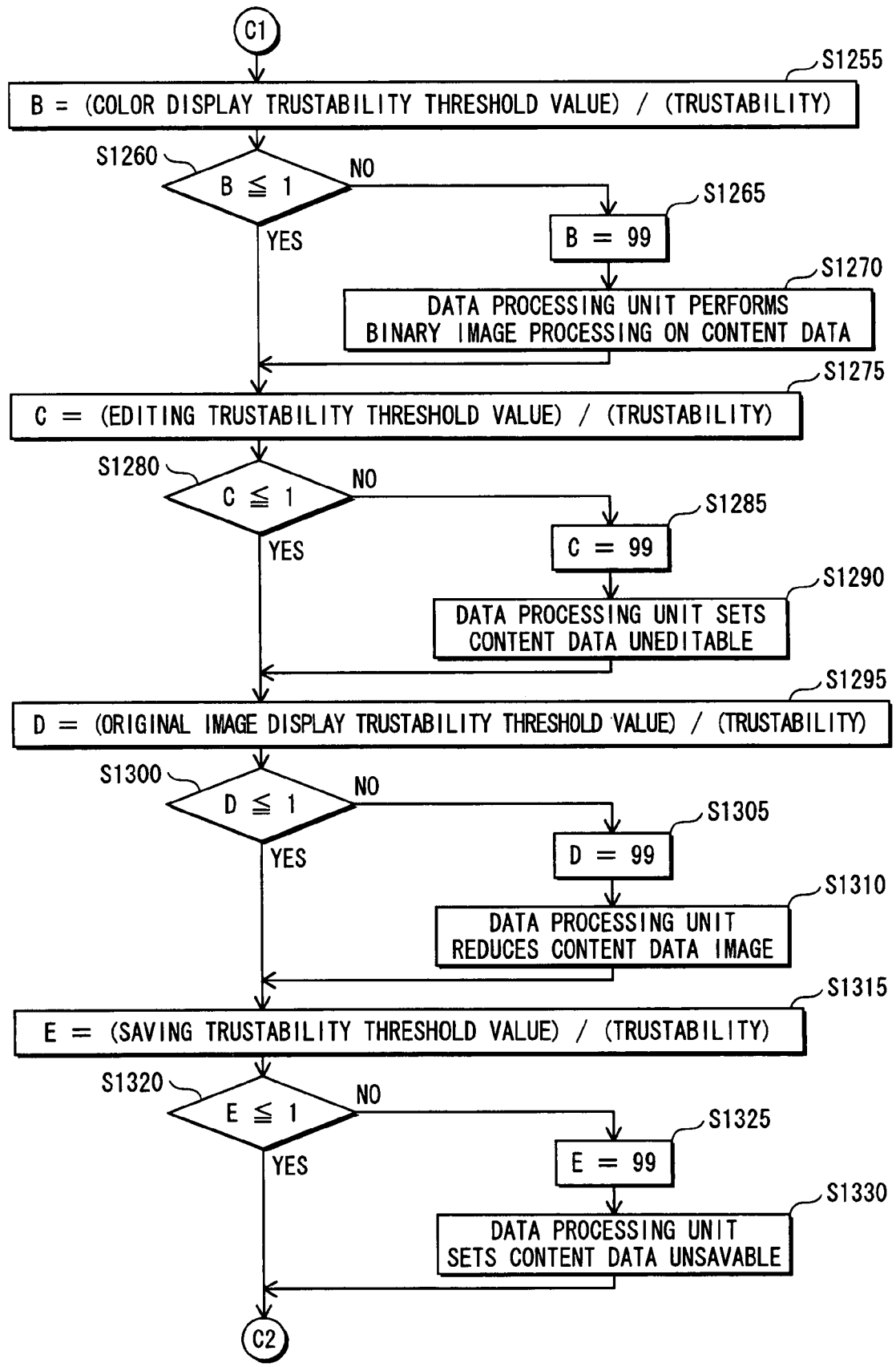
FIG. 43 is a flowchart showing the operation of the reception process, continuing from FIG. 42 to FIG. 44.
Figure 44:
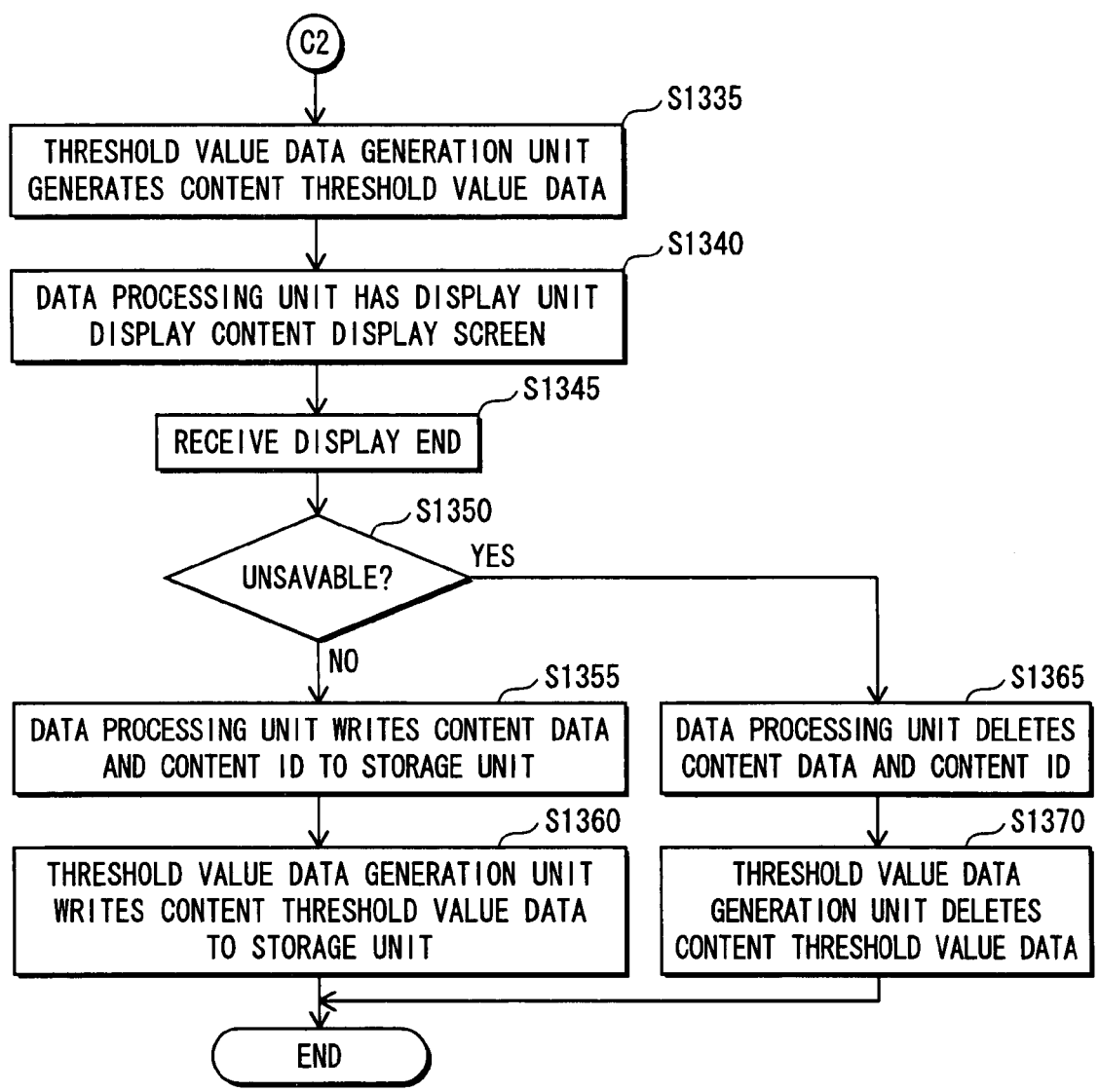
FIG. 44 is a flowchart showing the operation of the reception process, continuing from FIG. 43.

The operation of the reception process is described below, with reference to a flowchart shown in FIGS. 42 to 44. The reception processing unit 117*b* receives the delivery data 650 from an other user terminal via the communication unit 119 (step S1200).

The reception processing unit 117*b* divides the received delivery data 650 into the content trustability/threshold value data 651 and the content data 652 (step S1205). The reception processing unit 117*b* outputs the content trustability/threshold value data 651 to the threshold value data generation unit 125*b*, and the content data 652 and the content ID included in the content trustability/threshold value data 651 to the data processing unit 110*b* (step S1210).

The threshold value data generation unit 125*b* receives the content trustability/threshold value data from the reception processing unit 117*b*. The threshold value data generation unit 125*b* acquires a number of deliverable generations included in the content trustability/threshold value data, and calculates F (=(number of deliverable generations)−1) using the acquired number of deliverable generations (step S1215). The threshold value data generation unit 125*b* judges whether or not F is no less than 1 (step S1220).

When judging that F is less than 1 (step S1220: "NO"), the threshold value data generation unit 125*b* outputs a display prohibition instruction to prohibit from displaying the content data, to the data processing unit 110*b*. Upon receiving the display prohibition instruction from the threshold value data generation unit 125*b*, the data processing unit 110*b* has the display unit 102*b* display the content display prohibition screen 655 (step S1225).

The data processing unit 110*b* receives the selection of the OK button 657 on the content display prohibition screen 655 via the input unit 101*b* (step S1230). The data processing unit 110*b* has the display unit 102*b* end the display of the content display prohibition screen 655, and deletes the content data and content ID received from the reception processing unit 117*b*. The threshold value data generation unit 125*b* deletes the generated content threshold value data (step S1235).

When judging that F is no less than 1 (step S1220: "YES"), the threshold value data generation unit 125*b* calculates A (=(delivery trustability threshold value)/(trustability)), using the delivery trustability threshold value and trustability included in the content trustability/threshold value data (step S1240). The threshold value data generation unit 125*b* judges whether or not A is no more than 1 (step S1245).

When judging that A is more than 1 (step S1245: "NO"), the threshold value data generation unit 125*b* sets A to "99" (step S1250). When judging that A is no more than 1 (step S1245: "YES"), after step S1250 is executed, step S1255 onward is executed.

The threshold value data generation unit 125b calculates B (=(color display trustability threshold value)/(trustability)) using the color display trustability threshold value and the trustability (step S1255), and judges whether or not B is no more than 1 (step S1260).

When judging that B is no more than 1 (step S1260: "YES"), the threshold value data generation unit 125b calculates C (=(editing trustability threshold value)/(trustability)) using the editing trustability threshold value and the trustability (step S1275).

When judging that B is more than 1 (step S1260: "NO"), the threshold value data generation unit 125b sets B to "99" (step S1265). Next, the threshold value data generation unit 125b outputs a binary image processing instruction to the data processing unit 110b. Upon receiving the binary image processing instruction from the threshold value data generation unit 125b, the data processing unit 110b performs binary image processing on the temporarily stored content data, and temporarily stores the content data on which the binary image processing has been performed (step S1270). After this, the threshold value data generation unit 125b performs step S1275.

The threshold value data generation unit 125b judges whether or not C is no more than 1 (step S1280).

When judging that C is no more than 1 (step S1280: "YES"), the threshold value data generation unit 125b calculates D (=(original image display trustability threshold value)/(trustability)) using the original image display trustability threshold value and the trustability (step S1295). When judging that C is more than 1 (step S1280: "NO"), the threshold value data generation unit 125b sets C to "99" (step S1285). The threshold value data generation unit 125b then outputs an editing prohibition setting instruction to the data processing unit 110b. Upon receiving the editing prohibition setting instruction from the threshold value data generation unit 125b, the data processing unit 110b sets the temporarily stored content data as uneditable, and temporarily stores the content data which has been set as uneditable (step S1290) After this, the threshold value data generation unit 125b performs step S1295.

The threshold value data generation unit 125b judges whether or not D is no more than 1 (step S1300).

When judging that D is no more than 1 (step S1300: "YES"), the threshold value data generation unit 125b calculates E (=(saving trustability threshold value)/(trustability)) using the saving trustability threshold value and the trustability (step S1315). When judging that D is more than 1 (step S1300: "NO"), the threshold value data generation unit 125b sets D to "99" (step S1305). The threshold value data generation unit 125b then outputs an image reduction instruction to the data processing unit 110b. Upon receiving the image reduction instruction from the threshold value data generation unit 125b, the data processing unit 110b reduces the temporarily stored content data in size, and temporarily stores the content data which has been reduced in size (step S1310). After this, the threshold value data generation unit 125b performs step S1315.

The threshold value data generation unit 125b judges whether or not E is no more than 1 (step S1320).

When judging that E is no more than 1 (step S1320: "YES"), the threshold value data generation unit 125b sets E to "99" (step S1325). The threshold value data generation unit 125b outputs a saving prohibition setting instruction to the data processing unit 110b. Upon receiving the saving prohibition setting instruction from the threshold value data generation unit 125b, the data processing unit 110b sets the temporarily stored content data as unsavable, and temporarily stores the content data which has been set as unsavable (step S1330).

When judging that E is no more than 1 (step S1320: "YES") or after step S1330 is executed, step S1335 onward is executed.

The threshold value data generation unit 125b generates content threshold value data using the values (A, B, C, D, E, and F) and the content ID included in the content trustability/threshold value data (step S1335).

The threshold value data generation unit 125b outputs a threshold value data generation completion instruction indicating that the generation of the content threshold value data is completed, to the data processing unit 110b. Upon receiving the threshold value data generation completion instruction from the threshold value data generation unit 125b, the data processing unit 110b has the display unit 102b display the content display screen 658 including the temporarily stored content data (step S1340).

Upon receiving the selection of the display end button 659 on the content display screen 658 via the input unit 101b, the data processing unit 110b has the display unit 102b end the display of the content display screen 658 (step S1345). The data processing unit 110b judges whether or not the content data is set to be unsavable (step S1350).

When judging that the content data is not set to be unsavable (step S1350: "NO"), the data processing unit 110b writes the temporarily stored content data and content ID to the content information 132 in the storage unit 108 in correspondence with each other (step S1355). The data processing unit 110b outputs a write instruction to the threshold value data generation unit 125b. Upon receiving the write instruction to write the content threshold value data from the data processing unit 110b, the threshold value data generation unit 125b writes the generated content threshold value data to the content threshold value data table 139 in the storage unit 108 (step S1360).

When judging that the content data is set to be unsavable (step S1350: "YES"), the data processing unit 110b deletes the temporarily stored content data and content ID (step S1365).

The data processing unit 110b outputs an abandon instruction to the threshold value data generation unit 125b. Upon receiving the abandon instruction to abandon the content threshold value data from the data processing unit 110b, the threshold value data generation unit 125b abandons the generated content threshold value data (step S1370).

<3. Modifications>

The above embodiments are merely examples of embodiments of the present invention, and the present invention should not be limited to the above. The present invention can be implemented in main form within the range of its limitations. For example, the following modifications are applicable.

(1) In this specification, provision of a service includes sending content such as a still image, a moving image, and a movie film to an other device, and permitting an other device to perform a process such as viewing, editing, processing, and saving on provided content such as a still image, a moving image, and a movie film. Also, the present invention is not limited to the aforementioned content. Examples of content that can be provided include a computer program, document data, electronic sheet generated by spreadsheet software, a database, and the contents of e-mail.

Furthermore, provision of a service includes permitting an other device to use a resource, e.g. a storage unit, of the other device, and permitting an other device to use a computer program held by the other computer.

For example, the service provision includes instructing an other computer to execute a computer program held by the other computer, so that the other computer executes this computer program.

(2) Applications of the present invention are not limited to distribution controls of content data (personal content) For instance, when one user terminal provides a service to an other user terminal, the present invention can be applied to restrict a range of provision of the service (i.e. a range of user terminals that are allowed for service provision). Examples of this include restricting a range of provision of a file in file sharing, restricting a range of provision of a computer resource in grid computing, and restricting a copyable range (e.g. within a family) of paid software or commercial content.

A case where the present invention is applied to restrict a range of provision of a computer resource in grid computing is briefly described below.

In a system according to this case, a plurality of user terminals and a server device are connected via a network.

One user terminal delivers a use right of a computer resource of the server device as information (e.g. a CPU use right, a computer program use right, a storage resource use right, etc). When doing so, the user terminal calculates a secondary delivery trustability threshold value relating to secondary delivery of the use right according to the method shown in the first and second embodiments, and delivers the calculated secondary delivery trustability threshold value together with the use right. Since the secondary delivery trustability threshold value increases whenever the use right is delivered, the secondary delivery will eventually be prohibited.

This enables the range of provision of the computer resource in grid computing to be restricted.

(3) The first embodiment describes the case where the user terminals send/receive content data with each other, but the present invention is not limited to this. For example, the user terminals may send/receive data other than content data as right information (a conditional service use right, a service use right), and acquire content data in a separate way. In such a case, only content data corresponding to valid right information possessed by a user terminal is made to be displayable/deliverable. As one example, a user terminal may acquire content data from an external portable medium, from a communication path with a different timing from right information, or from a different communication path from the right information.

The same applies to the second embodiment.

(4) The first embodiment describes the case where JPEG image data, MPEG moving image data, and character data are mentioned as examples of content data, but the present invention is not limited to such. For instance, the content data may be image data or illustration data of another format (e.g. BMP or GIF), music data (e.g. Musical Instruments Digital Interface, MIDI), sound data (e.g. Mpeg1 Audio Layer 3, MP3), moving image data of another format (e.g. Moving Picture Experts Groups, MPEG), a text file (ASCII), software, or a program.

The same applies to the second embodiment.

(5) All of the screens shown in the first embodiment are mere examples, and the present invention should not be limited to such. Any screen can be used so long as it realizes the functions described above.

The same applies to the second embodiment.

(6) The first embodiment describes the case where the user terminal has the display unit that can display a screen externally. However, this is not a limit for the present invention. For example, a means for making an external notification by sound or a means for outputting to a storage unit and the like of an external portable medium or information device may be used. Also, the user terminal does not need to include the display unit, and may save received content data into a storage unit automatically or according to a user instruction.

The same applies to the second embodiment.

(7) The first embodiment describes the case where the communication path between user terminals is a communication network or an internet, but the present invention is not limited to this. For example, the communication path may be a short-range network (PAN, Personal Area Network) represented by a LAN (Local Area Network) and Bluetooth, a radio network represented by IEEE 802.11b, infrared radiation, a telephone line, a dedicated line, lamp wire communication, human body communication, and the like.

The same applies to the second embodiment.

(8) The first embodiment describes the case where the content acquisition unit in the user terminal reads content data from the external portable medium (memory card), acquires content data by character input, or acquires content data in which an external subject is photographed by a camera module, but the present invention is not limited to this. For example, the content acquisition unit may be wiredly or wirelessly connected to an external information device (a computer device such as a personal computer, a mobile phone, a PDA, a digital still camera, a digital video camera, a DVD recorder, an HDD recorder, a television, a dedicated portable terminal, etc.) and acquire content data from the information device.

Also, the content acquisition unit may output content data to an external portable medium or another information device. When doing so, the content acquisition unit may output content data unconditionally to a portable medium or information device that has been registered in advance.

The same applies to the second embodiment.

(9) The first embodiment describes the case where, when the user terminal delivers content data, the delivery destination user terminal is selected by the user. However, this is not a limit for the present invention. For instance, the user terminal may deliver the content data to user terminals corresponding to all other terminal IDs stored in the other terminal information table in the storage unit. Alternatively, when the communication path is a PAN (Personal Area Network), the content data may be delivered to only online user terminals which are being connected to the PAN.

The same applies to the second embodiment.

(10) The first embodiment describes the case where, when the user terminal delivers content data, the user selects one set of content data stored in the content information in the storage unit. However, this is not a limit for the present invention. For example, the user may select a plurality of sets of content data. Furthermore, all sets of content data or a part of the sets of content data may be automatically delivered with a timing designated by a manufacturer or user of the user terminal in advance (e.g. at daily intervals or according to the user's button operation). When doing so, the part of the sets of content data may be selected randomly or based, for example, on a date and time at which the content data is generated, a size of the content data, a degree of importance of the content data, a backup availability, and the like.

The same applies to the second embodiment.

(11) The first embodiment describes the case where the delivery data generation unit in the user terminal calculates the secondary delivery trustability threshold value by dividing the delivery trustability threshold value by the trustability, but the present invention is not limited to such. Also, the judgment criterion is not limited to "whether or not 1.0 is exceeded". Also, though the delivery trustability threshold value is increased constantly at each secondary delivery of content data, but this is not a limit for the present invention. As one example, the secondary delivery trustability threshold value may be calculated by dividing the delivery trustability threshold value by a value obtained by raising the trustability to a power of a (a is no less than 2), with the judgment criterion being, for example, "whether or not 1.0 is exceeded". In this way, the trustability threshold value gradually increases at each secondary delivery of content data, with it being possible to distribute the content data in a wider range. As another example, the secondary delivery trustability threshold value may be calculated by adding the delivery trustability threshold value and "1/(trustability)" which is an inverse number of the trustability, with the judgment criterion being, for example, "whether or not 5.0 is exceeded".

Also, the indicator for judging the criterion and the secondary delivery trustability threshold value that accompanies the content data need not be the same. Also, the indicator for judging the criterion and the secondary delivery trustability threshold value that accompanies the content data need not be the same.

Further, the method of obtaining the secondary delivery trustability threshold value, the method of obtaining the indicator when judging the criterion, and the judgment criterion may be set by the user terminal that delivers the content data.

The above embodiments describe the case where the delivery trustability threshold value increases at each secondary delivery of content data, but the present invention is not limited to this. Which is to say, the delivery trustability threshold value may increase or decrease at each secondary delivery of content data. As one example, the secondary trustability threshold value may be calculated by adding 0.2 to a value obtained by dividing the trustability threshold value by the trustability, with the judgment criterion being, for example, "whether or not 1.0 is exceeded". In this case, the trustability threshold value decreases for a user terminal whose trustability is 1.0. In this way, the content data can be distributed in a wider range.

The same applies to the threshold value data generation unit in the user terminal in the second embodiment.

(12) The first embodiment describes the case where the threshold values other than the delivery trustability threshold value and the trustability are used to judge whether or not to process content data, but the present invention is not limited to this.

For example, the data processing unit may process the content data in size when the judgment criterion is satisfied (the value obtained by dividing the delivery trustability threshold value by the trustability exceeds 1.0). Also, the content data may have an editing flag, where the original content data is delivered in an editable form but, when the judgment criterion is satisfied, the data processing unit processes the flag so as to prohibit editing of the content data.

Also, the content data may have a saving prohibition flag, where the original content data is delivered in a savable form but, when the judgment criterion is satisfied, the data processing unit processes the flag so as to prohibit saving of the content data.

Also, the content data may have savable period information, where the original content data is delivered in a form of being savable for an indefinite period or a long period (e.g. one year) but, when the judgment criterion is satisfied, the data processing unit processes the savable period information so as to enable the content data to be saved only for a short period (e.g. one day).

Also, the content data may include information about a number of times the content data can be re-delivered, where the original content data is delivered in a form of being re-derivable an indefinite number of times or a large number of times (e.g. 100) but, when the judgment criterion is satisfied, the data processing unit processes the information about the number of re-derivable times so as to enable the content data to be re-deliverable only a small number of times (e.g. 5).

Alternatively, the original content data is delivered in a form of a digital watermark (watermark, steganography) not being embedded but, when the judgment criterion is satisfied, the data processing unit embeds information about the secondary delivery source user terminal or the secondary delivery destination user terminal in the content data as a digital watermark (watermark, steganography). In this way, even when the content data is leaked, the source of the leakage can be identified.

As an alternative, when the judgment criterion is satisfied, the user terminal may notify the generator of the content data, the center, and the like of the content ID and information specifying the user terminal itself (e.g. the terminal ID). When notifying the generator of the content data, instead of direct notification, the notification may be performed in an opposite order to an order of distributing the content data, via the user terminal that receives the content data.

Also, a plurality of stages of trustability threshold values may be provided for one set of content data. These plurality of stages may have different judgment criteria. As one example, two trustability threshold values are set for one set of image data, where the image data is initially distributed in an original size, distributed in a VGA size once the first trustability threshold value exceeds "1.0", and distributed in a thumbnail size once the second trustability threshold value exceeds "1.0". Alternatively, three or more trustability threshold values may be set for one set of content data.

If a plurality of stages of trustability threshold values are provided for one set of content data, a different process may be performed when each trustability threshold value satisfies a judgment criterion. For instance, two trustability threshold values are set for one set of image data, where the image data is initially distributed in an original size, the image data in monochrome is distributed once the first trustability threshold value exceeds "1.0", and secondary delivery is prohibited once the second trustability threshold value exceeds "2.0". As mentioned above, three or more trustability threshold values may be set for one set of content data.

The same applies to the second embodiment.

(13) The first embodiment describes the case where the user terminal has all functions that are "primary delivery of content data", "secondary delivery of content data", and "reception of content data". However, the present invention is not limited to such. For example, the user terminal may have only one or two out of the functions "primary delivery of content data", "secondary delivery of content data", and "reception of content data".

The same applies to the second embodiment.

(14) The first embodiment describes the case where the other terminal information stored in the storage unit in the user terminal is externally input by the user via the other terminal information setting unit, but the present invention is not limited to this. For example, the user terminal may be wiredly or wirelessly connected to an external information device (a computer device such as a personal computer, a mobile phone, a PDA, a digital still camera, a digital video camera, a DVD recorder, a HDD recorder, a television, a dedicated portable terminal, etc.) and acquire part of or all other terminal information from the information device.

The same applies to the second embodiment.

(15) The first embodiment describes the case where, regarding the delivery trustability threshold value in the content information stored in the storage unit in the user terminal, "−99" denotes no setting and "99" denotes that the determined condition is satisfied (e.g. the value obtained by dividing the delivery trustability threshold value by the trustability exceeds 1.0), but the present invention is not limited to the values "−99" and "99". Also, though "−99" is set as an initial state for the content data input in the content acquisition unit, a default trustability threshold value (e.g. "0.5") may be set in advance, where the delivery trustability threshold value of the content data input in the content acquisition unit is the default trustability threshold value instead of "−99". Also, a plurality of default trustability threshold values may be set in advance depending on a type of content data, where, when the content data is input in the content acquisition unit, one of the plurality of default trustability threshold values is selected by the user or automatically selected by the user terminal. In the case of the automatic selection by the user terminal, for example, a date or time at which the content data is input, environment information when the content data is input (e.g. position information using a Global Positioning System, a neighboring IC tag, a temperature, a humidity, and the like), information read from a sensor equipped in the user terminal, automatic recognition of the content data (e.g. image recognition), and the like can be used.

The same applies to the second embodiment.

(16) In the delivery content selection unit in the user terminal in the first embodiment, when the delivery trustability threshold value of the content data selected by the user is unset ("−99"), a warning may be displayed to the user.

The same applies to the second embodiment.

(17) The delivery processing unit in the user terminal in the first embodiment may notify, whenever content data is delivered, the generator of the content data or the center of information regarding the delivery destination (e.g. the terminal ID). When notifying the generator of the content data, instead of direct notification, the notification may be performed in an opposite order to an order of distributing the content data, via the user terminal that receives the content data. This allows the generator of the content data to acknowledge a range where the content data generated by him/her is distributed.

The same applies to the second embodiment.

(18) The first embodiment describes the case where the content data and the other data (the content ID, the trustability threshold value, etc.) are defined separately from each other in the content information stored in the storage unit in the user terminal, but the other data may be included in the content data. As one example, when the content data is JPEG image data, the other data (the content ID, the trustability threshold value, etc.) may be held in an extension field of the image data.

The same applies to the second embodiment.

(19) In the user terminal in the first embodiment, when content data of the same content ID is received from a plurality of other user terminals, the user terminal may keep only the content data having a low delivery trustability threshold value and delete the other content data.

The same applies to the second embodiment.

(20) The first embodiment describes the case where the user terminal judges whether or not to save the received content data based on the information set for the content data, but the present invention is not limited to this.

The user terminal may display/save the received content data unconditionally.

Also, the user terminal may display/save only content data received from a user terminal whose trustability is no less than a predetermined level. For example, the user terminal may display/save content data received from a user terminal whose trustability is less than the predetermined level, after performing some kind of processing (size reduction and the like) on the content data.

The same applies to the second embodiment.

(21) In the user terminal in the first embodiment, the content data may be delivered to an other user terminal in an encrypted form. Key information used in this case may be stored in the other terminal information. In so doing, even if a third party eavesdrops the communication path, the third party cannot acquire the content data. Also, the content data may be stored in the content information in the storage unit in an encrypted form. As a result, even if a third party performs unauthorized access to the storage unit, the third party cannot acquire the content data easily. Further, a digital signature may be applied to the content ID for preventing falsification.

The same applies to the second embodiment.

(22) When the user terminal delivers the content data in the first embodiment, the user terminal does not need to deliver the content data directly to the delivery destination user terminal. As one example, the content data may be delivered to the delivery destination user terminal via a relay user terminal, a relay server, a router, and the like. In this case, measures for protecting the content data from leaking to the relay user terminal, the relay server, the router, and the like may be adopted. For example, the content data can be protected from leakage by encrypting the content data.

The same applies to the second embodiment.

(23) The content data delivered by the user terminal in the first embodiment may include a terminal ID which is included in a blacklist. The user terminal that receives the content data including the blacklist, upon re-delivering the content data (secondary delivery), refrains from delivering the content data to a user terminal corresponding to the terminal ID in the blacklist. The blacklist is not limited to a terminal ID, as positional information such as a company name and a school name and attribute information such as an age, a birthday, and a sex are equally applicable. Also, a whitelist may be used instead of a blacklist.

The same applies to the second embodiment.

(24) The first embodiment describes the case where the same communication path is used for delivering content data and receiving content data, but different communication paths may be used.

The same applies to the second embodiment.

(25) In the first embodiment, the content ID and the terminal ID do not need to be unique.

The same applies to the second embodiment.

(26) The first embodiment describes the case where the secondary delivery (re-delivery) of the content data is permitted when the secondary delivery trustability threshold value does not satisfy the judgment criterion (1.0 is exceeded) and prohibited when the secondary delivery trustability threshold value satisfies the judgment criterion, but the present invention is not limited to this. For instance, the display, viewing, and external output of the content data may be prohibited when the secondary delivery trustability threshold value does not satisfy the judgment criterion (1.0 is exceeded) and permitted when the secondary delivery trustability threshold value satisfies the judgment criterion.

This enables a user terminal of a user who is a close friend not to view the content data, and a user terminal of a user who is not a close friend to view the content data.

The same applies to the second embodiment.

(27) The first embodiment describes the case where the trustability is expressed by a decimal number from 0 to 1, where 1 represents highest trustability and 0 represents lowest trustability. However, the present invention is not limited to this. For example, the trustability may be expressed by a fractional number, or by a number from 0 to b (e.g. b=100). Also, highest trustability may be represented by 0, and lowest trust ability by 1. Furthermore, the trustability may be treated by approximation. One example is that 0.0 to 0.25 are approximated to 0.20, 0.25 to 0.5 are approximated to 0.4, 0.5 to 0.75 are approximated to 0.70, and 0.75 to 1.0 are approximated to 0.9. Also, the trustability may be defined in three levels (excellent, good, and normal) where 0.8 represents excellent trustability, 0.5 represents good trustability, and 0.3 represents normal trustability.

The first embodiment describes the case where the trustability is expressed by a decimal number from 0 to 1, where 1 represents highest trustability and 0 represents lowest trustability. However, the present invention is not limited to this. For example, the trustability may be expressed by a fractional number, or by a number from 0 to b (e.g. b=100). Also, highest trustability may be represented by 0, and lowest trustability by 1.

The same applies to the second embodiment.

(28) The first embodiment describes the use of "trustability", but any other value may be used so long as it can be used to judge permission/prohibition of a service. For instance, some kind of degree such as a degree of friendship strength, a degree of knowledge abundance, a degree of thinking speed, a degree of statement correctness, a degree of sincerity, a degree of gullibility, a degree of knowledge in a specific field (e.g. music), a degree of cheerfulness, and the like may be used. Also, the storage unit may hold a plurality of these degrees in combination, and use some of the degrees in accordance with a request from the user or the generator of the content data. Alternatively, a new evaluation value may be calculated by combining a plurality of degrees and submitted for use. A method of calculating such an evaluation value may be determined by the user or the generator of the content data.

The same applies to the second embodiment.

(29) The information distribution system according to the present invention is a system that distributes information.

In the first embodiment, the content data delivery corresponds to the information distribution.

The information distributed according to the present invention may be a use right of a service.

In this case, the service is provision of a computer resource by a computer system, and the use right is a right to use the computer resource.

Here, the computer resource may be a computer program in a computer means. In this case, the service is provision of an operation process by the computer program, and the use right is a right to use the computer program.

Also, the computer resource may be a storage resource in a computer system. In this case, the service is provision of the storage resource, and the use right is a right to use the storage resource.

The same applies to the second embodiment.

(30) The user terminal in the first embodiment may have a function of performing authentication with the delivery destination user terminal.

For example, when judging that the delivery destination user terminal is not authorized as a result of authentication, the delivery source user terminal updates the stored trustability of the delivery destination user terminal by decreasing it. When delivering the content data, the delivery source user terminal uses the updated trustability.

Also, when judging that the delivery destination user terminal is not authorized as a result of authentication, the delivery source user terminal may update the stored delivery trustability threshold value by increasing it. When delivering the content data, the delivery source user terminal uses the updated delivery trustability threshold value. Likewise, the delivery source user terminal may update the other trustability threshold values by increasing them when judging that the delivery destination user terminal is not authorized. The delivery source user terminal uses the updated values when delivering the content data.

The same applies to the second embodiment.

(31) The first embodiment describes the case where the trustability of an other user terminal stored in the user terminal is fixed unless changed in the setting process, but this is not a limit for the present invention.

The trustability may be changed in accordance with a state of connection with the delivery destination user terminal.

For example, the trustability may be updated by decreasing it in the case where the delivery source user terminal and the delivery destination user terminal are connected via a network, and updated by increasing it in the case where the delivery source user terminal and the delivery destination user terminal perform direct communication (e.g. Bluetooth, infrared communication, and the like). The delivery source user terminal uses the updated trustability when delivering the content data.

Also, the delivery trustability threshold value may be updated by increasing it in the case where the delivery source user terminal and the delivery destination user terminal are connected via a network, and updated by decreasing it in the case where the delivery source user terminal and the delivery destination user terminal perform direct communication (e.g. Bluetooth, infrared communication, and the like). The delivery source user terminal-uses the updated delivery trustability threshold value when delivering the content data. Likewise, the other trustability threshold values may be updated by increasing them when the delivery source user terminal and the delivery destination user terminal are connected via a network, where the delivery source user terminal uses the updated values when delivering the content data.

The same applies to the second embodiment.

(32) The first embodiment describes the case where the number of deliverable generations is counted where the user device that firstly delivers the content data is set as the first generation, but the present invention is not limited to this. The user device that firstly delivers the content data may be set as the 0-th generation.

The same applies to the second embodiment.

(33) The first embodiment may be modified so that the content threshold value data is made up of the content ID and the delivery trustability threshold value.

In this case, the delivery source user terminal does not process the content data.

Likewise, the second embodiment may be modified so that the content threshold value data is made up of the content ID and the delivery trustability threshold value.

In such a case, when delivering the content data, the delivery source user terminal delivers the content data and the content trustability/threshold value data made up of the content ID, the delivery trustability threshold value, and the trustability. The delivery destination user terminal does not process the content data.

(34) The first embodiment may be modified so that a display trustability threshold value showing a value that defines a boundary between prohibition and permission of viewing (display) of content may be added to the content threshold value data in accordance with a degree of trust in the primary delivery destination.

The user terminal that delivers the content data (hereafter "delivering user terminal") calculates a value G (=(display trustability threshold value)/(trustability)) using the display trustability threshold value and the trustability of the delivery destination user terminal. When G is no more than 1, the delivering user terminal adds G to the delivery time content threshold value data as a secondary display trustability threshold value. When G is more than 1, the delivering user terminal sets G to "99", and adds G to the delivery time content threshold value data as the secondary display trustability threshold value.

The user terminal that receives the content data displays the received content data when the secondary display trustability threshold value is no more than 1, and does not display the received content data when the secondary display trustability threshold value is "99".

Likewise, the second embodiment may be modified so that the display trustability threshold value is added to the content threshold value data.

In this case, G is calculated in the user terminal that receives the content data (hereafter "receiving user terminal"). When G is no more than 1, the receiving user terminal adds G to the content threshold value data as the display trustability threshold value. When G is more than 1, the receiving user terminal sets G to "99", and adds G to the content threshold value data as the display trustability threshold value. The receiving user terminal displays the received content data if the display trustability threshold value is no more than 1, and does not display the received content data if the display trustability threshold value is "99".

(35) The first embodiment describes the case where the delivering user terminal calculates the secondary saving trustability threshold value, the secondary original image display trustability threshold value, the secondary editing trustability threshold value, and the secondary color display trustability threshold value, and performs a process relating to setting of information for the content data to be delivered, based on the calculated threshold values. However, the present invention is not limited to this. A process relating to data processing referred to here is a process of performing binary image processing on the content data, a process of setting the content data as uneditable, a process of reducing the content data in size, and a process of setting the content data as unsavable.

The first embodiment may be modified so that the delivering user terminal only calculates the above threshold values and the receiving user terminal performs a process relating to information setting for the content data based on the threshold values and displays the content data. Also, while displaying the content data, the delivering user terminal may receive an instruction to perform a process relating to data processing of the content data from the user, and if a threshold value corresponding to the received instruction is in a range of 0 to 1, perform the process relating to data processing corresponding to the received instruction on the displayed content data. The process relating to data processing referred to here is a process of performing binary image processing on the content data, a process of editing the content data, and a process of reducing the content data in size.

The second embodiment may be modified so that the delivering user terminal receives, while the content data is being displayed, an instruction to perform a process relating to data processing of the content data from the user, and performs the process relating to data processing corresponding to the received instruction on the displayed content data if a threshold value corresponding to the received instruction is in a range of 0 to 1.

(36) The first embodiment describes the case where, when the delivery trustability threshold value is in a range of 0 to 1, the user terminal that delivers the content data sets the secondary delivery trustability threshold value to "99" and delivers the content data if the trustability of the delivery destination user terminal is less than the delivery trustability threshold value. However, the present invention is not limited to such.

The first embodiment can be modified so that the user terminal that delivers the content data does not deliver the content data to the delivery destination user terminal if the trustability of the delivery destination user terminal is less than the delivery trustability threshold value. This enables the user terminal that delivers the content data to restrict the primary delivery destination.

The second embodiment may be modified so that the user terminal that receives the content data and the delivery data, when the delivery trustability threshold value included in the received delivery data is in a range of 0 to 1, abandons the received content if the trustability included in the received delivery data is less than the delivery trustability threshold value. This enables the user terminal that delivers the content data to restrict the primary delivery destination.

(37) The first embodiment describes the case where, when the delivery trustability threshold value is in a range of 0 to 1, the user terminal that delivers the content data sets the secondary delivery trustability threshold value to "99" to prohibit secondary delivery if the trustability of the delivery destination user terminal is less than the delivery trustability threshold value. However, the present invention is not limited to this, as the following limitation is applicable.

When setting the secondary delivery trustability threshold value to "99", the user terminal that delivers the content data may set a data deletion instruction to delete the content data if the network is disconnected, in the content data to be delivered. If the data deletion instruction is set in the content data, the user terminal that receives the content data deletes the content data and the delivery time generation data when the network is disconnected, irrespective of the secondary saving trustability threshold value included in the delivery time generation data received together with the content data.

Instead of the data deletion instruction, the user terminal that delivers the content data may set a time elapse deletion instruction to delete the content data once a predetermined time period has elapsed after the network is disconnected. If the time elapse deletion instruction is set in the content data, the user terminal that receives the content data deletes the content data and the delivery time generation data when the predetermined time period has elapsed after the network is disconnected, irrespective of the secondary saving trustability threshold value included in the delivery time generation data received together with the content data.

Likewise, the second embodiment may be modified such that the user terminal that receives the content data sets the data deletion instruction or the data elapse deletion instruction in the content data.

(38) The first embodiment describes the case where, when the delivery trustability threshold value is in a range of 0 to 1, the user terminal that delivers the content data sets the secondary delivery trustability threshold value to "99" to prohibit secondary delivery if the trustability of the delivery destination user terminal is less than the delivery trustability threshold value. However, the present invention is not limited to this.

When setting the secondary delivery trustability threshold value to "99", the user terminal that delivers the content data may permit secondary delivery to a user terminal whose trustability is no less than a predetermined level.

In this case, when setting the secondary delivery trustability threshold value to "99", the user terminal that delivers the content data sets predetermined trustability (e.g. 0.9) for the content data. The user terminal that receives the content data performs secondary delivery of the content data if a secondary delivery destination user terminal has trustability no less than the predetermined trustability set for the content data.

Likewise, the second embodiment may be modified so that the user terminal that receives the content data sets predetermined trustability for the received content.

(39) The construction elements constituting each of the devices shown in the first and second embodiments may be partially or entirely implemented by a single system LSI (Large Scale Integration). The system LSI is an ultra-multifunctional LSI manufactured by integrating multiple components on a single chip, and can actually be realized by a computer system that includes a microprocessor, a ROM, a RAM, and the like. A computer program is stored on the RAM. Functions of the system LSI can be achieved by the microprocessor operating in accordance with this computer program.

Though the LSI is described here, the circuit may be called an IC, a system LSI, a super LSI, or an ultra LSI, depending on the degree of integration.

Also, the integration is not limited to the LSI, and may be performed using a dedicated circuit or a general processor. A FPGA (Field Programmable Gate Array) that can be programmed or a reconfigurable processor capable of reconfiguring connections and settings of circuit cells in an LSI may be used after producing the LSI.

Also, if an integrated circuit technique that replaces an LSI emerges from advancement of semiconductor technology or other derivative technology, such a technique can be used for the integration of the functional blocks. For instance, biotechnology may be adapted in this way.

(40) The construction elements constituting each of the devices shown in the first and second embodiments may be partially or entirely implemented by a removable IC card or a discrete module. The IC card or the module referred to here is a computer system that includes a microprocessor, a ROM, a RAM, and the like. The IC card or the module may contain the above ultra-multifunctional LSI. Functions of the IC card or the module can be achieved by the microprocessor operating in accordance with the computer program. Here, the IC card or the module may be tamper-resistant.

(41) The present invention also applies to the method described above. This method may be realized by a computer program that is executed by a computer. Such a computer program may be distributed as a digital signal. The present invention may be realized by a computer readable recording medium, such as a removable disk, a hard disk, a CD, an MO, a DVD, a BD (Blu-ray Disc), an SD memory card, or a semiconductor memory, on which the above computer program or digital signal is recorded. Conversely, the present invention may also be realized by the computer program or digital signal that is recorded on such a recording medium. The computer program or digital signal that achieves the present invention may also be transmitted via a communication network, such as an electronic communication network, a wired or wireless communication network, or an internet.

The present invention can also be realized by a computer system that includes a microprocessor and a memory. In this case, the computer program can be stored in the memory, with the microprocessor operating in accordance with this computer program. The computer program or the digital signal may be provided to an independent computer system by distributing a recording medium on which the computer program or the digital signal is recorded, or by transmitting the computer program or the digital signal via the aforementioned communication network. The independent computer system may then execute the computer program or the digital signal to function as the present invention.

(42) The above embodiments and modifications may be freely combined.

The technique according to the present invention is useful in a system of restricting, when one user terminal provides some kind of service to an other user terminal, a range of user terminals to which the service is permitted. Especially, the technique according to the present invention is useful, for example, in a service use control system that distributes content only in a restricted range.

The information distribution system described above can be used recurrently and continuously in an industry that delivers information (e.g. delivers content).

The invention claimed is:

1. A terminal device that delivers information to another terminal device, comprising:
   a condition storage unit that stores a primary delivery condition relating to whether delivery of information to a terminal device of a primary delivery destination is prohibited or permitted;
   a trustability storage unit that stores a delivery destination trustability value that indicates a degree of trust in a user who is an owner of the terminal device of the primary delivery destination, the delivery destination trustability value being kept confidential;
   a judgment unit that judges whether or not to deliver the information to the terminal device of the primary delivery destination, by using the primary delivery condition;
   a generation unit that generates, when the judgment unit judges to deliver the information, a secondary delivery condition by performing a calculation using the delivery destination trustability value based on the primary delivery condition, the secondary delivery condition relating to whether delivery of the information from the terminal device of the primary delivery destination to a terminal device of a secondary delivery destination is prohibited or permitted; and
   a sending unit that sends the generated secondary delivery condition to the terminal device of the primary delivery destination without sending the delivery destination trustability value, wherein
   the primary delivery condition stored in the condition storage unit includes a trustability threshold value that defines a boundary between prohibition and permission of the delivery of the information according to the degree of trust in a user who is an owner of the terminal device of the primary delivery destination, and
   the generation unit calculates the secondary delivery condition by dividing the trustability threshold value by a value obtained by raising the delivery destination trustability value to a power of a, where a is an integer of one or greater.

2. The terminal device of claim 1,
   wherein the information is content, and the terminal device delivers the content.

3. The terminal device of claim 1,
wherein the information is a use right relating to use of a service, and the terminal device delivers the use right.

4. The terminal device of claim 3,
wherein the service is regarding provisions of content for viewing, editing, or saving, the use right is a right to view, edit, or save the provided content, and the terminal device further delivers the content in correspondence with the use right.

5. The terminal device of claim 3,
wherein the service is regarding provisions of a computer resource in a computer system, and the use right is a right to use the computer resource.

6. The terminal device of claim 5,
wherein the computer resource is a computer program, the service is regarding provisions of an operation process by the computer program, and the use right is a right to use the computer program.

7. The terminal device of claim 5,
wherein the computer resource is a storage resource in the computer system, the service is regarding provisions of the storage resource, and the use right is a right to use the storage resource.

8. The terminal device of claim 1, further comprising:
an update unit that updates the delivery destination trustability value stored in the trustability storage unit.

9. The terminal device of claim 8,
wherein the update unit includes:
a judging unit that judges whether or not the terminal device of the primary delivery destination is authorized; and
a trustability update unit that updates the delivery destination trustability value by decreasing the delivery destination trustability value, when the judging unit judges that the terminal device of the primary delivery destination is not authorized.

10. The terminal device of claim 8,
wherein the update unit includes:
a judging unit that judges whether or not the terminal device is connected to the terminal device of the primary delivery destination via a network; and
a trustability update unit that updates the delivery destination trustability value by decreasing the delivery destination trustability value, when the judging unit judges that the terminal device is connected to the terminal device of the primary delivery destination via the network.

11. The terminal device of claim 8,
wherein the update unit includes:
a judging unit that judges whether or not the terminal device directly communicates with the terminal device of the primary delivery destination; and
a trustability update unit that updates the delivery destination trustability value by increasing the delivery destination trustability, when the judging unit judges that the terminal device directly communicates with the terminal device of the primary delivery destination.

12. The terminal device of claim 1,
wherein the primary delivery condition stored in the condition storage unit includes a trustability threshold value that defines a boundary between prohibition and permission of the delivery of the information according to the degree of trust in the primary delivery destination, and the terminal device further comprises:
an update unit that updates the trustability threshold value included in the primary delivery condition stored in the condition storage unit.

13. The terminal device of claim 12,
wherein the update unit includes:
a judging unit that judges whether or not the terminal device of the primary delivery destination is authorized; and
a trustability update unit that updates the trustability threshold value by increasing the trustability threshold value, when the judging unit judges that the terminal device of the primary delivery destination is not authorized.

14. The terminal device of claim 12,
wherein the update unit includes:
a judging unit that judges whether or not the terminal device is connected to the terminal device of the primary delivery destination via a network; and
a trustability update unit that updates the trustability threshold value by increasing the trustability threshold value, when the judging unit judges that the terminal device is connected to the terminal device of the primary delivery destination via the network.

15. The terminal device of claim 12,
wherein the update unit includes:
a judging unit that judges whether or not the terminal device directly communicates with the terminal device of the primary delivery destination; and
a trustability update unit that updates the trustability threshold value by decreasing the trustability threshold value, when the judging unit judges that the terminal device directly communicates with the terminal device of the primary delivery destination.

16. The terminal device of claim 1, further comprising:
a reception unit that receives the primary delivery condition; and
a write unit that writes the received primary delivery condition to the condition storage unit.

17. The terminal device of claim 1 that delivers information to another terminal device,
wherein the judgment unit judges whether or not to deliver the information to the terminal device of the primary delivery by using the primary delivery condition and the delivery destination trustability value.

18. The terminal device of claim 1, wherein the judgment unit makes the judgment by using the delivery destination trustability value, in addition to the primary delivery condition.

19. The terminal device of claim 18, wherein upon receiving the secondary delivery condition form another terminal device, the terminal device uses the received secondary delivery condition as the primary delivery condition to judge whether or not to deliver the information to the terminal device of the first delivery destination.

20. A terminal device that delivers information to another terminal device, comprising:
a condition storage unit that stores a primary delivery condition relating to whether delivery of the information to a terminal device of a primary delivery destination is prohibited or permitted;
a trustability storage unit that stores a delivery destination trustability value that indicates a degree of trust in a user who is an owner of the terminal device of the primary delivery destination, the delivery destination trustability value being kept confidential;
a generation unit that generates a secondary delivery condition by performing a calculation using the delivery destination trustability value based on the primary delivery condition, the secondary delivery condition relating to whether delivery of the information from the terminal device of the primary delivery destination to a terminal device of a secondary delivery destination is prohibited or permitted;

a judgment unit that judges whether or not to deliver the secondary delivery condition, by using the generated secondary delivery condition; and a sending unit that sends the generated secondary delivery condition to the terminal device of the primary delivery destination, when the judgment unit judges to deliver the secondary delivery condition destination without sending the delivery destination trustability value, wherein the primary delivery condition stored in the condition storage unit includes a trustability threshold value that defines a boundary between prohibition and permission of the delivery of the information according to the degree of trust in a user who is an owner of the terminal device of the primary delivery destination, and the generation unit calculates the secondary delivery condition by dividing the trustability threshold value by a value obtained by raising the delivery destination trustability value to a power of a, where a is an integer of one or greater.

21. An information distribution method used in a terminal device that delivers information to another terminal device, the terminal device including a condition storage unit that stores a primary delivery condition relating to whether delivery of the information to a terminal device of a primary delivery destination is prohibited or permitted, and a trustability storage unit that stores a delivery destination trustability value that indicates a degree of trust in a user who is an owner of the terminal device of the primary delivery destination, the delivery destination trustability value being kept confidential, the information distribution method comprising:

judging whether or not to deliver the information to the terminal device of the primary delivery destination, by using the primary delivery condition;

generating, when the judgment step judges to deliver the information, a secondary delivery condition by performing a calculation using the delivery destination trustability value based on the primary delivery condition, the secondary delivery condition relating to whether delivery of the information from the terminal device of the primary delivery destination to a terminal device of a secondary delivery destination is prohibited or permitted; and sending the generated secondary delivery condition to the terminal device of the primary delivery destination without sending the delivery destination trustability value, wherein the primary delivery condition stored in the condition storage unit includes a trustability threshold value that defines a boundary between prohibition and permission of the delivery of the information according to the degree of trust in a user who is the owner of the terminal device of the primary delivery destination, and in the generating, the secondary delivery condition is calculated by dividing the trustability threshold value by a value obtained by raising the delivery destination trustability value to a power of a, where a is an integer of one or greater.

22. A non-transitory computer-readable recording medium storing a computer program for information distribution used in a terminal device that delivers information to another terminal device, the terminal device including a condition storage unit that stores a primary delivery condition relating to whether delivery of the information to a terminal device of a primary delivery destination is prohibited or permitted, and a trustability storage unit that stores a delivery destination trustability value that indicates a degree of trust in a user who is the owner of the terminal device of the primary delivery destination, the delivery destination trustability value being kept confidential, the computer program causing the terminal device to perform steps comprising:

judging whether or not to deliver the information to the terminal device of the primary delivery destination, by using the primary delivery condition;

generating, when the judgment step judges to deliver the information, a secondary delivery condition by performing a calculation using the delivery destination trustability value based on the primary delivery condition, the secondary delivery condition relating to whether delivery of the information from the terminal device of the primary delivery destination to a terminal device of a secondary delivery destination is prohibited or permitted; and sending the generated secondary delivery condition to the terminal device of the primary delivery destination without sending the delivery destination trustability value, wherein the primary delivery condition stored in the condition storage unit includes a trustability threshold value that defines a boundary between prohibition and permission of the delivery of the information according to the degree of trust in a user who is an owner of the terminal device of the primary delivery destination, and in the generating, the secondary delivery condition is calculated by dividing the trustability threshold value by a value obtained by raising the delivery destination trustability value to a power of a, where a is an integer of one or greater.

23. An integrated circuit of a terminal device that delivers information to another terminal device, comprising:

a condition storage unit that stores a primary delivery condition relating to whether delivery of the information to a terminal device of a primary delivery destination is prohibited or permitted;

a trustability storage unit that stores a delivery destination trustability value that indicates a degree of trust in a user who is an owner of the terminal device of the primary delivery destination, the delivery destination trustability value being kept confidential;

a judgment unit that judges whether or not to deliver the information to the terminal device of the primary delivery destination, by using the primary delivery condition;

a generation unit that generates, when the judgment unit judges to deliver the information, a secondary delivery condition by performing a calculation using the delivery destination trustability value based on the primary delivery condition, the secondary delivery condition relating to whether delivery of the information from the terminal device of the primary delivery destination to a terminal device of a secondary delivery destination is prohibited or permitted; and a sending unit that sends the generated secondary delivery condition to the terminal device of the primary delivery destination without sending the delivery destination trustability value, wherein the primary delivery condition stored in the condition storage unit includes a trustability threshold value that defines a boundary between prohibition and permission of the delivery of the information according to the degree of trust in a user who is an owner of the terminal device of the primary delivery destination, and the generation unit calculates the secondary delivery condition by dividing the trustability threshold value by a value obtained by raising the delivery destination trustability value to a power of a, where a is an integer of one or greater.

24. An information distribution system including a plurality of terminal devices, each terminal device that delivers information to another terminal device comprising:

a condition storage unit that stores a primary delivery condition relating to whether delivery of the information to a terminal device of a primary delivery destination is prohibited or permitted;

a trustability storage unit that stores a delivery destination trustability value that indicates a degree of trust in a user who is an owner of the terminal device of the primary delivery destination, the delivery destination trustability value being kept confidential;

a judgment unit that judges whether or not to deliver the information to the terminal device of the primary delivery destination, by using the primary delivery condition;

a generation unit that generates, when the judgment unit judges to deliver the information, a secondary delivery condition by performing a calculation using the delivery destination trustability value based on the primary delivery condition, the secondary delivery condition relating to whether delivery of the information from the terminal device of the primary delivery destination to a terminal device of a secondary delivery destination is prohibited or permitted; and a sending unit that sends the generated secondary delivery condition to the terminal device of the primary delivery destination without sending the delivery destination trustability value, wherein the primary delivery condition stored in the condition storage unit includes a trustability threshold value that defines a boundary between prohibition and permission of the delivery of the information according to the degree of trust in a user who is an owner of the terminal device of the primary delivery destination, and the generation unit calculates the secondary delivery condition by dividing the trustability threshold value by a value obtained by raising the delivery destination trustability value to a power of a, where a is an integer of one or greater.

25. A terminal device that delivers information to another terminal device, comprising:

a condition storage means for storing a primary delivery condition relating to whether delivery of information to a terminal device of a primary delivery destination is prohibited or permitted;

a trustability storage means for storing a list including a plurality of delivery destination trustability values of terminal devices of the primary delivery destination, each delivery destination trustability value indicating a degree of trust in a user who is an owner of a corresponding one of the terminal devices of the primary delivery destination, the list of the delivery destination trustability values being kept confidential;

a judgment means for judging whether or not to deliver the information to the terminal device of the primary delivery destination, by using the primary delivery condition;

a generation means for generating, when the judgment means judges to deliver the information, a secondary delivery condition by performing a calculation using a delivery destination trustability value based on the primary delivery condition, the secondary delivery condition relating to whether delivery of the information from the terminal device of the primary delivery destination to a terminal device of a secondary delivery destination is prohibited or permitted; and a sending means for sending the generated secondary delivery condition to the terminal device of the primary delivery destination without sending the list of the delivery destination trustability values, wherein the primary delivery condition stored in the condition storage means includes a trustability threshold value that defines a boundary between prohibition and permission of the delivery of the information according to the degree of trust in a user who is an owner of the terminal device of the primary delivery destination, the judgment means makes the judgment by using the delivery destination trustability value, in addition to the primary delivery condition, and upon receiving the secondary delivery condition form another terminal device, the terminal device uses the received secondary delivery condition as the primary delivery condition to judge whether or not to deliver the information to the terminal device of the first delivery destination, and the generating means calculates the secondary delivery condition by dividing the trustability threshold value by a value obtained by raising the delivery destination trustability value to a power of a, where a is an integer of one or greater.

* * * * *